United States Patent Office 3,699,117
Patented Oct. 17, 1972

3,699,117
2-[(5'-(3'-AND/OR 4'-SUBSTITUTED) ISOXAZOLYL) AMINOETHYL] - 3,4,10 - TRIOXO-1,2,3,4,4,9,9,10-OCTAHYDROANTHRACENES AND RELATED COMPOUNDS
Kenneth Butler, Old Lyme, and Lloyd H. Conover, Quaker Hill, Conn., and Robert B. Woodward, Belmont, Mass., assignors to Pfizer Inc., New York, N.Y.
No Drawing. Division of application Ser. No. 608,730, Jan. 12, 1967, now Patent No. 3,502,660, which is a continuation-in-part of application Ser. No. 484,723, Sept. 2, 1965, now abandoned, which is a division of application Ser. No. 209,268, July 11, 1962, now abandoned, which in turn is a continuation-in-part of application Ser. No. 133,011, Aug. 18, 1961. This application July 29, 1969, Ser. No. 845,872
Int. Cl. C07d *85/22*
U.S. Cl. 260—307.5                      7 Claims

ABSTRACT OF THE DISCLOSURE

A multi-route process for the synthesis of tetracycline-type antibiotics involving (1) the aldol condensation of a 3,4,10 - trioxo - 1,2,3,4,4a,9,9a,10-octahydroanthracene and a 3- and/or 4-substituted-5-formylisoxazole; (2) dehydration of the aldol condensation products to a 2-[(5'-(3'- and/or 4'-substituted)isoxazolyl)methylidene] - 3,4, 10-trioxo - 1,2,3,4,4a,9,9a,10 - octahydroanthracene; followed by (3) Michael addition of an amine to produce 2-[(5'-(3'- and/or 4' - substituted)isoxazolyl)substituted aminomethyl] - 3,4,10 - trioxo-1,2,3,4,4a,9,9a,10-octahydroanthracenes; (4) chemical or catalytic reduction of the [(isoxazolyl)aminomethyl]-3,4,10-trioxo-octahydroanthracenes to 3-hydroxy-4,10-dioxo- and 4,10-dioxo derivatives, respectively; (5) cleavage of the isoxazole ring of the reduced compounds to the corresponding 4,10-dioxo - 1,2,3,4,4a,9,9a,10 - octahydroanthracene - 2 - [α-(amino)acetonyl-α-nitriles]; (6) followed by cyclization of 12a-deoxytetracycline or tetracycline derivatives; or, alternatively, (7) cyclization of [(isoxazolyl)aminomethyl]-4,10-dioxo-octahydroanthracenes to naphthaceno(3, 2-D)isoxazoles with subsequent cleavage of the isoxazole ring to produce 12a-deoxytetracyclines; and (8) 12a-hydroxylation of a tetracycline. The intermediate compounds of the process are limited to the following classes: 2-[(5'-(3'- and/or 4'-substituted)isoxazolyl)methylidene]-3,4, 10-trioxo-1,2,3,4,4a,9,9a,10-octahydroanthracenes; 2-[5'-(3'- and/or 4'-substituted isoxazolyl)aminomethyl]-4, 10 - dioxo-1,2,3,4,4a,9,9a,10-octahydroanthracenes, the 3-oxo, the 3-hydroxy, the 3-lower alkanoyloxy and the 3,4-cyclic carbonates thereof; 4,10-dioxo-1,2,3,4,4a,9,9a,10-octahydroanthracene-2-[α-(amino)acetonyl - α - nitriles]; and naphthaceno (3-2-D)-isoxazoles all of which are useful as bactericides and/or chelating agents.

CROSS-REFERENCES TO RELATED APPLICATIONS

This application is a divisional application of copending application Ser. No. 608,730, filed Jan. 12, 1967, now U.S. Pat. 3,502,660, which in turn is a continuation-in-part of application Ser. No. 484,723, filed Set. 2, 1965, now abandoned, which in turn is a divisional of application Ser. No. 209,268, filed July 11, 1962, now abandoned, said latter application being a continuation-in-part of application Ser. No. 133,011, filed Aug. 18, 1961, now abandoned.

BACKGROUND OF THE INVENTION

This invention relates to a process of preparation of antibacterial agents. More particularly, it is concerned with the discovery of new and novel synthetic routes for the preparation of known as well as new tetracycline products. It is also concerned with the new and useful tetracycline products obtained thereby, as well as with the new intermediates of the processes.

The tetracycline antibiotics comprise a group of biologically active hydronaphthacene derivatives having the following essential structural features. The number system indicated is that employed by "Chemical Abstracts."

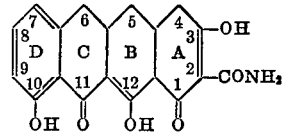

Among the biologically active members of this group are those containing the following substituent groups:

| Substituents | Common name |
|---|---|
| 4-N(CH₃)₂, 6-OH, 6-CH₃, 12a-OH | Tetracycline. |
| 4-(CH₃)₂, 5-OH, 6-OH, 6-CH₃, 12a-OH. | 5-oxytetracycline. |
| 4-N(CH₃)₂, 6-OH, 6-CH₃, 7-Cl, 12a-OH. | 7-chlorotetracycline. |
| 4-H(CH₃)₂, 5-OH, 6-CH₃, 12a-OH | 6-deoxy-5-oxytetracycline. |
| 5-OH, 6-CH₃, 12a-OH, 6-OH | 4-desidmethylamino-5-oxytetracycline. |
| 4-N(CH₃)₂, 6-CH₃, 12a-OH | 6-deoxytetracycline. |
| 4-N(CH₃)₂, 12a-OH | 6-deoxy-6-demethyltetracycline. |
| 4-N(CH₃)₂, 6-OH, 6-CH₃, 7-Br, 12a-OH. | 7-bromotetracycline. |
| 4-N(CH₃)₂, 6-OH, 7-Cl, 12a-OH | 6-demethyl-7-chlorotetracycline. |
| 6-OH, 6-CH₃, 12a-OH | 4-desdimethylaminotetracycline. |
| 6-OH, 6-CH₃, 7-Cl, 12 a-OH | 4-desdimethylamino-7-chlorotetracycline. |
| 4-N(CH₃)₂, 6-OH, 12a-OH | 6-demethyltetracycline. |
| 12a-OH | 6-deoxy-6-demethyl-4-desdimethylaminotetracycline. |

SUMMARY OF THE INVENTION

The present new processes utilize 3,4,10-trioxo-1,2,3, 4,4a,9,9a,10-octahydroanthracenes (Formula I) as starting materials to produce both known and new tetracyclines having the formulae

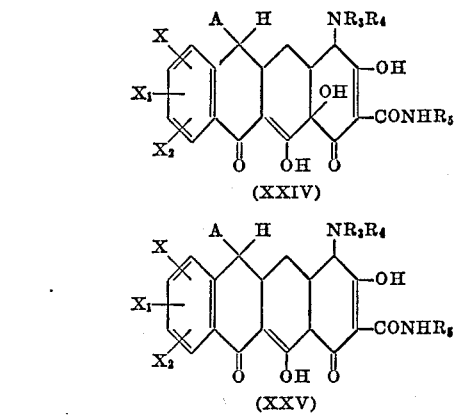

wherein the various terms are as defined below, by the reaction sequences illustrated in Flow Sheets I and II. It will be appreciated by those skilled in the art that several alternative routes exist for the conversion of compounds of Formula I to the final products of Formulas XXIV and XXV. The particular route adopted for the preparation of a given tetracycline is largely dependent upon economic factors, such as availability of materials, and yields of reaction products throughout the sequence. Further, the conditions for any reaction in the sequence can, unless otherwise indicated, be varied within the skill of the art. The actual conditions employed are determined by the above listed factors as well as by type and availability of equipment.

3,699,117
FLOW SHEET I
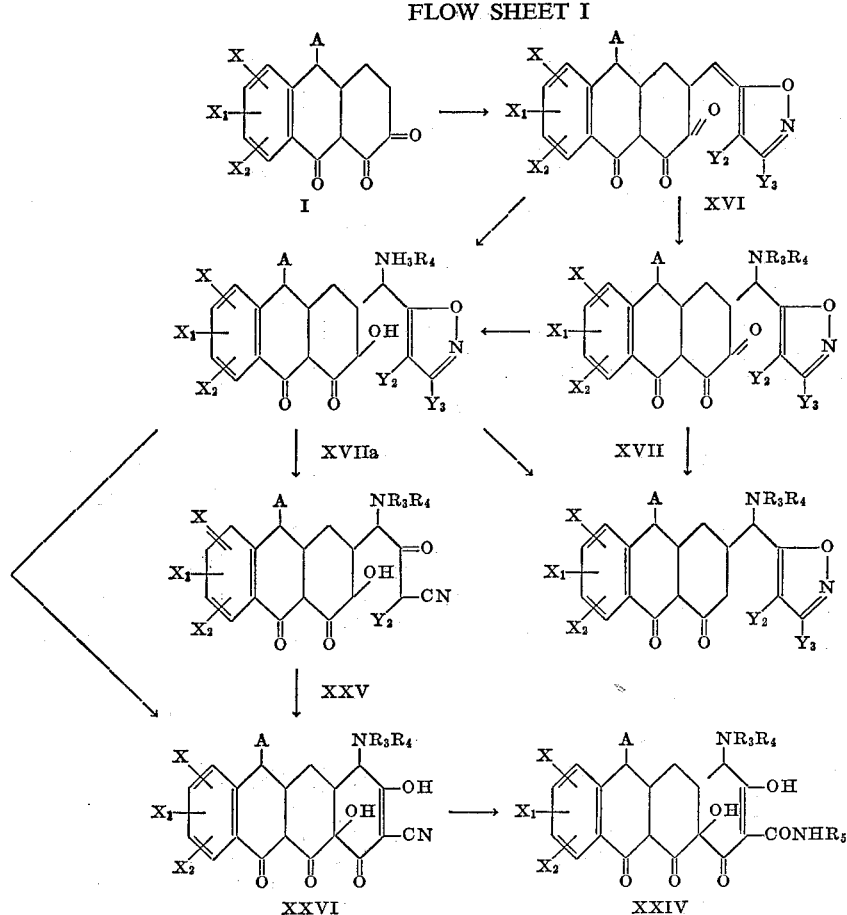
FLOW SHEET II
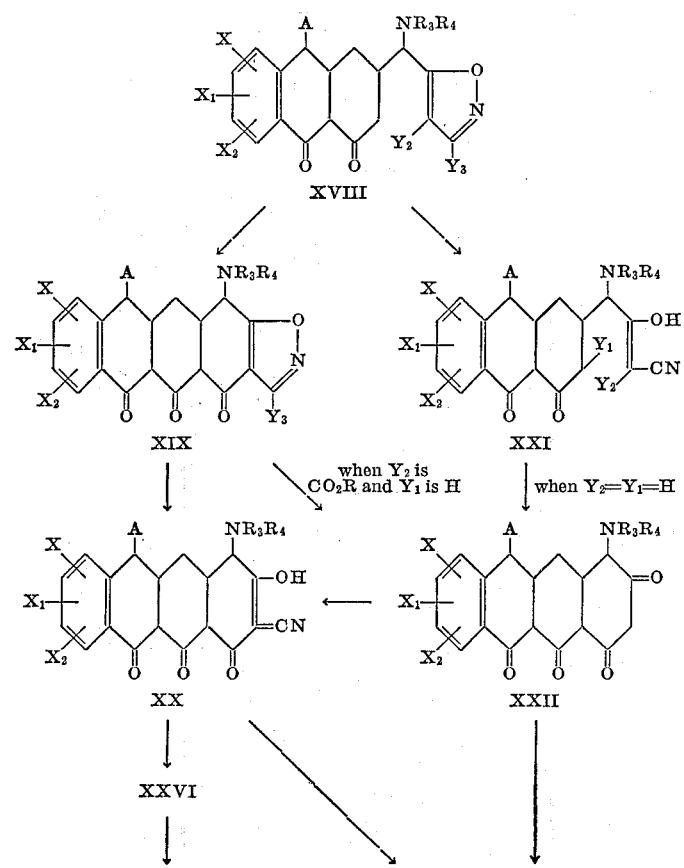

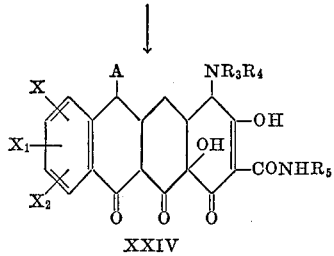 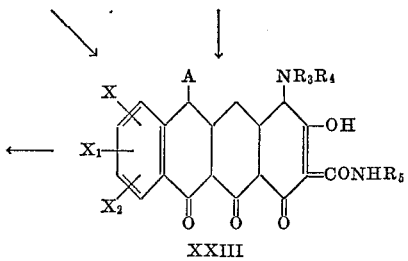

In the compounds of this sequence, X is selected from the group consisting of hydrogen, hydroxy, trifluoromethyl, amino, mono and di-lower alkylamino, alkanoylamino containing 2 to 4 carbon atoms, lower alkyl, alkanoyloxy containing 2 to 4 carbon atoms; and OR wherein R is selected from the group consisting of lower alkyl and benzyl;

$X_1$ is selected from the group consisting of hydrogen, chloro, lower alkyl and trifluoromethyl;

$X_2$ is selected from the group consisting of hydrogen, hydroxy, and OR in which R is as previously defined;

A is selected from the group consisting of hydrogen, lower alkyl, and $B_2OCH(B_3)$— wherein $B_2$ is lower alkyl and $B_3$ is selected from the group consisting of hydrogen and lower alkyl;

$R_3$ and $R_4$ when taken together with the nitrogen atom to which they are attached form a nitrogen heterocyclic ring selected from the group consisting of piperazyl, N-(lower alkyl)piperazyl, piperidyl and morpholinyl;

$R_3$ is selected from the group consisting of hydrogen, alkanoyl containing 1 to 4 carbon atoms, and methyl;

$R_4$ is selected from the group consisting of alkyl containing 1 to 4 carbon atoms;

$R_5$ is selected from the group consisting of hydrogen and lower alkyl;

$Y_1$ is selected from the group consisting of hydrogen, formyloxy and lower carbalkoxy;

$Y_2$ is selected from the group consisting of hydrogen, carbobenzoxy, carboxy, lower carbalkoxy, and $$CONH(CH_3)$$

$Y_3$ is selected from the group consisting of lower carbalkoxy, carbobenzoxy, carboxy, $CONH_2$ and $$CONH(CH_3)$$

and, when $Y_2$ is hydrogen, $CON(CH_3)_2$.

It should be noted that although the X, $X_1$ and $X_2$ terms in the benzenoid moiety of the above generic structures appear in the same sequence, they need not be present in this sequence in actual practice. This representation is for convenience only and is not to be taken to indicate, for example, that $X_2$ always represents the 5-substituent, or that $X_1$ represents the 6- or the 7-substituent. They can occur in any sequence in the benzenoid moiety.

A wide variety of 4-aminotetracylines are, of course, prepared according to the present processes by substituting various primary or secondary alkyl amines for dimethylamine. Suitable amines include other dialkylamines, e.g., methyl, ethyl, propyl, etc., amines; heterocyclic amines, e.g., pyrrolidine, morpholine and ammonia.

Of the present new compounds of particular value are those containing the following benezenoid moiety:

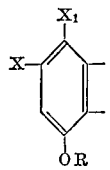

in which X, $X_1$ and OR are as described above since these compounds are suitable for the preparation of known tetracycline compounds, i.e., and in addition, new and useful tetracycline compounds not previously described.

In the above sequence of reactions many of the indicated steps are carried out by standard procedures known to those in the art, e.g., hydrolysis, esterification, acylation, reduction, ring closure, Mannich reaction, Michael addition, etc.

The above sequences of reaction may be summarized as follows: From I to XVI is an aldol condensation (followed by dehydration) with a 5-formyl isoxazole, generally a lower carbalkoxy derivative. The reaction is catalyzed by acids or metals, e.g., metal salts, such as magnesium chloride in acetic acid, and preferably by metal alkoxide. It is advantageously conducted in an inert atmosphere, e.g., nitrogen, at a temperature of from about 80°–120° C. for from ¼ to about 24 hours.

The acid catalyzed condensation is conveniently carried out in glacial acetic acid as solvent. Non-hydroxylic solvents such as benzene, xylene, toluene, dioxane, dimethoxyethane, diethyleneglycoldimethylether and dimethylformamide are useful solvents for the metal catalyzed condensation, especially when using metal alkoxides. Magnesium methoxide and aluminum t-butoxide are especially useful in this condensation. Of course, when active hydrogen is present in the reactant, one extra equivalent of the alkoxide is used per active hydrogen. The α-hydroxy ester, wherein the elements of water are added to the unsaturated ester, may also be obtained in small yield. Its production is favored by short reaction periods and low temperatures. Dehydrating agents, such as p-toluenesulfonic acid in benzene permit dehydration and regeneration of the unsaturation.

The conversion of XVI to XVII is a Michael reaction with an amine $HNR_3R_4$. The reaction is conducted at a temperature of from about —70° C. to about 10° C. preferably in the lower temperature range e.g. below —50°. An excess of the amine is employed; a sufficiently large excess frequently being used to serve both as solvent and as reactant. A variety of other solvents can be used and are actually necessary when the amine is a solid at the temperature of the reaction. Such solvents include tetrahydrofuran, ethylene glycol ethers, diethyleneglycol ethers and chloroform. The only criteria essential for the solvent are adequate solubility for the reactants, inertness and a sufficiently low freezing point.

The reaction is run for periods of from 15 minutes to 24 hours depending upon the reactants and temperature employed. Oxygen should be excluded during the period when the product is in contact with the excess amine. The order of addition of the reactants appears in general, to be immaterial to the outcome of the reaction.

The products are unstable unless kept cold; that is, below 0° C., and desirably at or below —15° C. In spite of their thermal instability they can, if desired, be isolated by working up the reaction mixtures at low temperatures, e.g., in a cold box. The products must, of course, be stored at a low temperature. However, they need not be isolated for utilization in the hereindescribed reaction sequences.

From XVII to XVIIA is a selective reduction with a suitable chemical reducing agent, such as metal hydrides, especially sodium borohydride. The reaction is carried out by dissolving the Mannich base in a suitable reaction-inert solvent such as 1,2-dimethoxyethane, ethyleneglycol ethers, diethyleneglycol ethers and liquid amines. Reaction periods of from about 10 minutes to about 24 hours are required. Of course, when active hydrogen is present in the reactants in addition to the β-diketone system, one additional equivalent of sodium borohydride is required per active hydrogen.

The reduction is advantageously conducted by adding the sodium borohydride all at once to a vigorously stirred solution of the Mannich base (XVII) in one of the aforementioned solvents at —70° C. followed by gradual increase in the temperature to 0° C. In this process, as above, 0.25 to 6.0 moles of reducing agent per mole of Mannich base is used. As much as 20 moles of reducing agent may be used. A ratio of 4–6 is, however, preferred. In the case of liquid amine solvents, the reduction is most conveniently conducted by addition of the sodium borohydride to the reaction mixture obtained in the conversion of XVI–XVII.

From XVI to XVIIA is a selective reduction with a suitable chemical reducing agent, such as sodium borohydride, of the Mannich reaction product XVII. It is represented as a one-step conversion since the Michael reaction product need not be separated prior to reduction.

The Michael addition reaction with an amine $HNR_3R_4$ as applied in the above steps wherein the $Y_2$ and/or $Y_3$ substituents of the isoxazolyl moiety of compounds of Formula XVI are lower carbalkoxy concomitantly effects, to some extent at least, conversion of the lower carbalkoxy group(s) to an amide $CONR_3R_4$. While conversion of the lower carbalkoxy group(s) to amide appears to be the predominating reaction, except where $R_3$ and $R_4$ are both alkyl, the presence of unchanged lower carbalkoxy groups is detectable by such means as infrared spectroscopy. When $Y_2$ is hydrogen, substantial conversion of $Y_3$ (lower carbalkoxy) to an amide occurs even when $R_3$ and $R_4$ are both alkyl.

The lower carbalkoxy groups, $Y_2$ and $Y_3$, of compounds of Formula XVI are readily converted to amide groups ($CONR_3R_4$) by treatment of the isoxazolyl esters or a metal chelate thereof, e.g., aluminum chelates, with the desired amine at low temperatures. The thermal instability of the amine addition products of Formula XVII permits their facile conversion to the isoxazolyl amides of Formula XVI by removal of the —$NR_3R_4$ groups via heating in vacuo.

The thus produced isoxazolyl amides of Formula XVI ($Y_2$ and/or $Y_3$=$CONR_3R_4$) are then subjected to the Michael addition reaction with the same or a different amine to give products of Formulae XVII and XVIIa.

The addition of secondary amines may be facilitated by first converting the ester functions ($Y_2$, $Y_3$) to amides with primary amines. It appears that in the conversion of the unsaturated tricyclic triketone isoxazolyl amides (XVI) to the amine addition products (XVII) the equilibrium is shifted in favor of the amine addition product by the presence of amide functions, possibly because of the low solubility of the products in the reaction medium.

The amide groups of structures XVI, XVII, XVIIa and other structures in the sequences of Flow Sheets I and II can, if desired, be converted to ester groups by refluxing in concentrated hydrochloric acid followed by re-esterification of the acid. In general, it is preferred to employ the isoxazolyl esters rather than the amides in the reaction sequences of Flow Sheets I and II. Diamides are converted to their half-lower carbalkoxy esters in this manner. Monoamides can, of course, be transformed to esters by this process.

XVIIa→XXVI: Formation of the cyclic carbonate at the 3,4-positions of the octahydroanthracene moiety by reaction with phosgene or preferably ethyl chlorocarbonate, or other alkyl chlorocarbonate, or carbonyldiimidazole in the presence of pyridine or triethylamine or 1,4-diaza[2,2,2]bicyclooctane. The reaction is conducted at a temperature of from about —10° C. to about 10° C. in reaction-inert solvents such as acetonitrile, dioxane, chloroform, benzene, toluene, and ethers of ethylene- and diethylene-glycol for periods of from about 5 minutes to 24 hours. The phosgene or alkyl chlorocarbonate is generally mixed with the base and added to the octahydroanthracene reactant. Alternatively, the base and octahydroanthracene moiety are mixed together and the phosgene or alkyl chlorocarbonate added thereto. The base may be present in amounts ranging from one equivalent to a large excess. However, 2–3 equivalents is preferred.

The cyclic carbonate is then cyclized to the fused isoxazole structure and the cyclic carbonate hydrolyzed under mild acid conditions.

The cyclic carbonate intermediates afford a particularly advantageous avenue for the utilization of the tricyclic triketones (I) in the synthesis of tetracyclines since they direct the ring closure reaction in a stereo-specific manner to provide the desired configuration of the 12a-hydroxy group. This represents a simplification over the other routes exemplified in Flow sheets I and II wherein a hydroxy group is removed then reintroduced at the 12a-position at a late stage in the sequence.

The cyclization reaction is carried out using 1–3 equivalents of a basic condensing agent, such as sodium hydride, sodium alkoxides, sodium amide and magnesium alkoxides, in a reaction-inert solvent diethyleneglycol dimethyl ether, toluene, anisole, benzene, dimethyl sulfoxide, dimethylformamide, dimethoxyethane, and in the case of sodium amide, liquid ammonia. Temperatures of up to 100° C. may be used in solvents of appropriate boiling point. However, temperatures below about 45° C. are generally preferred, for reaction periods of from 0.5 hour to 24 hours.

XVIIa→XVIII: Conversion to the diketone compound is accomplished by reaction with acetoformic anhydride according to known procedures followed by removal of the 3-formyloxy group generally by treatment with finely divided zinc metal in an organic acid (e.g. formic acid) or with zinc dust in an organic acid in the presence of a metal which forms a chelate with the substrate (zinc chloride in acetic acid). A diluent such as methanol may be employed. Alternatively, zinc chloride in acetic acid, catalytic hydrogenation (5% Pd-C) in tetrahydrofuran or formic acid at elevated pressures is used. Care must be taken to avoid over reduction, that is reduction of the 4,10-keto group. For this reason mild conditions are required. When using zinc dust-formic acid, for example, reaction is effected at room temperature with contact times of brief duration.

XVII→XVIII: Reduction of the 3-oxo function of the starting compound which may be carried out by standard methods, e.g., catalytic hydrogenation at low temperatures in ethyl acetate (e.g. —70° C.) over palladium to produce the corresponding alcohol which is, as the free alcohol or ester, e.g. acetate, susceptible to further reduction at low temperatures by either catalytic or chemical means, e.g. zinc in acetic or formic acid.

XVIII→XIX: Ring closure of compounds in which $Y_2$ is carbalkoxy is conducted in the presence of a base, for example, sodium hydride. Generally speaking, the ring closure is accomplished under conditions similar to those described above under the cyclic carbonate cyclization. However, somewhat more vigorous conditions may be necessary to form the requisite dianion of the β-diketone system. This may be generally recognized by a color change to a deep reddish color. When using sodium hydride and dimethylformamide, this change occurs, for the most part, upon heating to approximately 80° C. Prolonged reaction times of several days at room temperature also effect the reaction.

Where $Y_2$ is a carboxamide function, a modified ring closure reaction sequence is utilized. Compounds of Formula XVIII are treated with 2–3 moles of a trialkyl oxonium salt, such as trimethyl-oxonium fluoborate or trialkyl-oxonium fluoborate (for other such salts see Meerwein et al., Ber. 89, 2060–2079 (1956)) in a solvent (chloroform, methylene chloride, tetrachloroethane) at about 40°–70° C. for from about 6 to about 48 hours under dry nitrogen. (The reaction temperature is, of course, conditioned by the boiling point of the solvent used.) Following this, 3–6 equivalents of sodium hydride is added and the mixture refluxed for from about 5 minutes to one hour after which an additional 2–3 equivalents of sodium hydride followed by 1–3 equivalents of methanol is added. The vigorous exothermic reaction, the cyclization stage, which usually occurs is complete in from 5 to 15 minutes. The crude reaction products appear to be enol ethers which are readily hydrolyzed by gentle warming with dilute acid to the fused isoxazoles of Formula XIX.

XIX→XX: Methods for cleavage of the isoxazole ring vary depending upon the nature of the $Y_3$ substituent. When $Y_3$ is carbalkoxy standard alkaline hydrolysis of XIX in the form of a metal chelate of an alkaline earth metal or heavy metal such as calcium, magnesium, cadmium copper, nickel, and preferably zinc, using alkali or alkaline earth metal hydroxides, or acid hydrolysis using mineral acids is employed. Temperatures of from 30° to 100° C. for periods of about 0.5 hour to 12 hours are operative when using 0.5% to 5% of alkaline or acid hydrolyzing agent.

In the case of alkaline hydrolysis cleavage of the isoxazole ring follows conversion to the carboxylate anion. In the case of acid hydrolysis it is usually necessary to convert the acid to an alkali or alkaline earth metal salt and warm to 50°–80° C. to effect decarboxylation and cleavage. Treatment with aqueous ammonia in the presence of copper powder also cleaves an ester or acid isoxazole derivative.

When $Y_3$ is carboxamido or mono-substituted carboxamido treatment with at least 2 equivalents of sodium hydride or other strong base, e.g. sodium or lithium amide, at 80°–110° C. in a reaction-inert solvent, dimethyl sulfoxide, dimethylformamide, ethylene- and diethylene-glycol ethers, for from 5 minutes to one hour is used.

XXVI→XXIV and XX→XXIII: Conversion of the 2-cyano group to a carboxamido group by the method described in U.S. Pat. 3,029,284, issued Apr. 10, 1962, wherein is described the conversion of tetracycline nitriles to the corresponding N-alkylated carboxamide (e.g. t-butyl, isopropyl) by the Ritter Reaction followed by dealkylation of the resulting N-alkylated carboxamide with concentrated mineral acid and water. An alternative method of converting the nitrile to the amide is by hydration with mineral acid such as sulfuric or 48% hydrobromic acid preferably at elevated temperatures, e.g. between 50° and 100° C., for from 5–30 minutes or with excess polyphosphoric acid at room temperature for prolonged reaction periods such as 12 to 24 hours. Still another method, especially applicable to the preparation of acid stable tetracyclines from the corresponding nitriles, involves reaction of said nitriles with hydrogen fluoride or boron trifluoride complexes in an aqueous medium at a temperature of from 0–100° C. as is described in U.S. Pat. 3,069,467, issued Dec. 18, 1962.

XXI→XX and XXI→XXII: Represent ring closure by base catalyzed acylation using, for example, sodamide, sodium triphenyl methyl, potassium amide, alkali metal alkoxides or preferably sodium hydride. This is essentially a reaction of the type described by Hauser and Harris, J. Am. Chem. Soc. 80, 6360 (1958) who described acylation reactions of dianions derived from β-diketones.

A ratio of at least 4 equivalents of base and desirably a great excess of up to 10 equivalents is employed. A variety of reaction-inert solvents can be used, e.g. benzene, xylene, toluene, anisole, dimethylformamide and, in the case of alkali metal amides, liquid ammonia. Dimethylformamide containing a small amount of methanol is the preferred solvent. Reaction is conducted under nitrogen at a temperature of from about 80° to about 150° C., preferably 120° C., for periods of from about 3 minutes to up to 24 hours depending upon the reactants. A period of 5–7 minutes is adequate, indeed preferred, in most instances.

XXV→XXVI: This cyclization is advantageously conducted by first converting the hydroxy ketones (structure XXV compounds) to their acetates, formates or the cyclic carbonates. The cyclizing procedure is the same as that described above in connection with the isoxazole cyclic carbonate except that one extra equivalent of sodium hydride is used.

It is noted that in compounds of Formula XXV wherein $Y_2$ is a carboxamide function, e.g.

reaction leading to formation of the cyclic carbonate of the hydroxy ketone also causes cyclization of the side chain:

XXV →
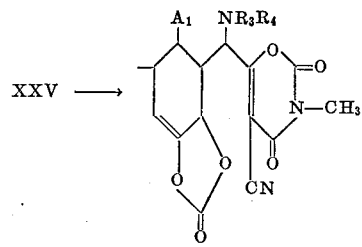

The resulting products are well suited for cyclization reactions.

Compounds of structure XIX according to accepted chemical nomenclature are naphthaceno (3,2-D)isoxazole derivatives with the following nucleus:

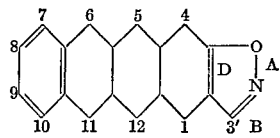

For convenience, these compounds are designated herein as 2,3-tetracycline-4',5'-isoxazole derivatives with the 1,2 and 3-isoxazole positions designated as 1', 2' and 3'. This permits the use of the tetracycline numbering of the ring positions. For example, 1,11,12-trioxo-10-hydroxy-4-dimethylamino-1,4,4a,5,5a,6,11,11a,12,12a - decahydro-naphthaceno (3,2-D)isoxazole - 3 - carboxylic acid ethyl ester is conveniently designated as ethyl 6,12a-dideoxy-6-demethyl-2,3-tetracycline-4',5'-isoxazole-3'carboxylate.

XVIII→XXI and XVIIa→XXV: Cleavage of the isoxazole ring by aforementioned procedures. XX→XXVI and XXIII→XXIV-12a-hydroxylation.

The compounds of structure XXIII and XXIV are biologically active tetracycline products, the latter being 12a-deoxytetracyclines which are converted to tetracycline compounds XXIV by introduction of a 12a-hydroxy group by known procedures such as described in the J. Am. Chem. Soc., 81, 4748 (1959).

A preferred method of 12a-hydroxylation is the method described in U.S. Pat. 3,188,348, issued June 8, 1965, wherein is described the hydroxylation of certain metal chelates of the 12a-deoxytetracyclines. The advantage of this latter process lies in the fact that the hydroxy group is introduced cis- to the hydrogen at position 4a.

The ring closure reactions are carried out by the general methods as hereinafter described.

The requisite isoxazole-5-aldehydes having the formula

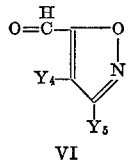

VI wherein $Y_4$ is selected from the group consisting of hydrogen, cyano, $CONH_2$, carboxy, carbobenzoxy and lower carbalkoxy; and $Y_5$ is selected from the group consisting of cyano, carboxy, $CONH_2$, carbobenzoxy and lower carbalkoxy, can be prepared by any one of several methods. For example, ozonolysis of the corresponding 5-styryl isoxazole obtained by the known procedure (J.C.S. 3663, 1956) which comprises reaction of the appropriate 2,4-diketo-6-phenyl-hex-5-enoic acid derivative ($C_6H_5$—CH=CH—CO—$CH_2$CO—$CO_2Y$) with hydroxylamine.

3,4-dicarbalkoxy - 5 - formylisoxazoles are obtained by the reaction of the desired alkyl-$\gamma,\gamma$-dialkoxyacetoacetate with ethyl-$\alpha$-chloro-$\alpha$-oximinoacetate in the presence of a base, e.g. sodium hydride, followed by cyclization of the thus produced oxime of ethyl-$\alpha,\gamma$-diketo-$\beta$-carbethoxy-$\delta,\delta$-dialkoxy valerate by treatment with p-toluene sulfonic acid or other suitable dehydrating agent in a non-polar solvent, e.g., benzene, for from 15 minutes to 24 hours at 0°–30° C. and preferably at room temperature, with continuous removal of water. The acetal of 5-formyl-3,4-dicarbalkoxy-isoxazole is converted to the 5-formyl derivative by acid hydrolysis.

Alternatively, isoxazoles are prepared by the reaction of an enamine of alkyl-$\gamma,\gamma$-dialkoxy acetoacetate with $\alpha$-chloroximino acetate.

By ester interchange other alkyl groups or the benzyl group are conveniently introduced into $Y_5$ or $Y_4$ and $Y_5$. The carbobenzoxy derivatives are of value since they afford easy access to the corresponding carboxy acids by catalytic hydrogenolysis. Further, the esters can be converted to amides and thence to nitriles by reaction with ammonia followed by dehydration of the amide with, for example, benzenesulfonyl chloride.

Utilization of a $\gamma,\gamma$-dialkoxyaceto acetamide in lieu of an alkyl-$\gamma,\gamma$-dialkoxyacetoacetate in the above described reaction with ethyl $\alpha$-chloro-$\alpha$-oximinoacetate produces the corresponding acetal of 3-carbethoxy-4-carboxamido-5-formylisoxazole. Acid hydrolysis of the acetal by HCl or preferably 48% HBr for about 10 minutes at room temperature yields the 5-formyl derivative.

When the substituents of the present compounds are hydroxy or amino, the use of a blocking group is sometimes advantageous in obtaining high yields during their preparation. Especially useful blocking groups are acyl, benzyl, tetrahydropyranyl, methoxymethyl, methyl and ethyl radicals. Benzyl ethers are particularly easily reduced to hydroxyl groups. Tetrahydropyranyl ethers are easily removed under mildly acidic conditions. Acyl groups which may be used include the acetyl, propionyl and butyryl, as well as the benzoyl, succinyl, phthaloyl, and the like. The lower alkyl blocking groups are preferred since these compounds are readily preparable.

In the octahydroanthracene compounds in which the 4a-substituent (11a-substituent in tetracycline compounds) is hydrogen, the reactive 4,10$\beta$-diketone system (11,12$\beta$-diketone system of tetracycline compounds) may be blocked by formation of derivatives of said system, e.g., 4-enol derivatives. It is understood, of course, that enol formation may occur at the 10-position but for the sake of convenience such derivatives will be designated herein as 4-enol derivatives. The enol methyl ethers are prepared by reaction with excess diazomethane in methanol solution at room temperature. Such reactions usually require several days for completion.

The enol radicals are hydrolyzed by treatment with aqueous acid as is well known by those skilled in the art. When the ether radical is benzyl, hydrogenolysis over a noble metal catalyst may also be used.

The new compounds described herein are useful as chelating, complexing or sequestering agents. The complexes formed with polyvalent metal ions are particularly stable and usually quite soluble in various organic solvents. These properties, of course, render them useful for a variety of purposes wherein metal ion contamination presents a problem; e.g. stabilizers in various organic systems, biological experimentation, metal extraction. They are further useful in analysis of polyvalent metal ions which may be complexed or extracted by these materials and as metal carriers. Other uses common to sequestering agents are also apparent for these compounds.

In addition, the compounds of Flow Sheets I and II are especially valuable as intermediates in chemical synthesis particularly in the synthesis of 6-deoxytetracycline, 6-deoxy-6-demethyltetracycline and other novel antimicrobial agents bearing structural similarities to the tetracycline antibiotics. Many of the herein described compounds, especially those containing one or more hydroxy groups in the benzenoid moiety, are useful as antibacterial agents in their own right.

In the present new process, particularly as applied to the synthesis of known-tetracyclines, it is preferred to employ intermediates in which the hydrogen atoms at the 9a and 2-positions of the anthracene ring (corresponding to the 4a and 5a-positions of the tetracycline nucleus) are in the cis arrangement. For example, preferred compounds are depicted by the following formula (syn. compounds)

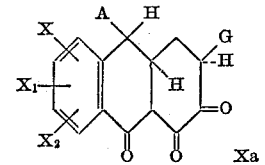

in which G is a substituent other than hydrogen, as contrasted with anti-compounds of the formula:

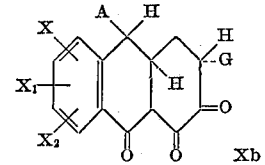

In general, syn and anti compounds are separable by virtue of differences in physical properties, e.g. differences in solubility in various solvents. Usually, fractional crystallization or adsorption chromotography permits ready separation. Both the syn and anti compounds are diastereoisomers.

It is a particular advantage of the novel triketo octahydroanthracenes of the present invention that, by virtue of the activating influence of the keto oxygen at C–3, they equilibrate to the predominately cis configuration in the course of preparation. This enables the synthesis to proceed in stereo specific fashion without the loss of material that would otherwise be entailed in the separation of syn and anti compounds.

However, since in the production of compounds of this type, the product may consist of a mixture comprised of compounds differing in position 2 of the anthracene nucleus, i.e. the hydrogen being both cis and trans to the hydrogen at position 9a, the mixture can be converted to the predominately cis arrangement by equilibrating using extended periods for the amine addition reaction.

It is recognized by those in the art that, when such compounds have an asymmetric center in the substituent G, they exist as two diastereoisomers which, as previously mentioned, may be separated by fractional crystallization for each of the syn and anti compounds. Of course, as is known, diastereoisomers are racemic modifications consisting of two structures which are mirror images (optical antipodes). The racemic modifications may be resolved according to standard procedures. In the present process it is preferred, however, to utilize the diastereoisomers of the syn compounds since changes in configuration may occur during the various procedural steps of the total synthesis to tetracycline compounds, thus necessitating costly and time-consuming resolution procedures. The syn diastereoisomers are converted to tetracycline products which consist of the normal tetracyclines and their 4-epimers which are separable by known procedures. Of course, the 4-epitetracyclines are useful in that they are converted to normal tetracyclines by known procedures.

The starting compounds of structure I are prepared according to the following procedure:

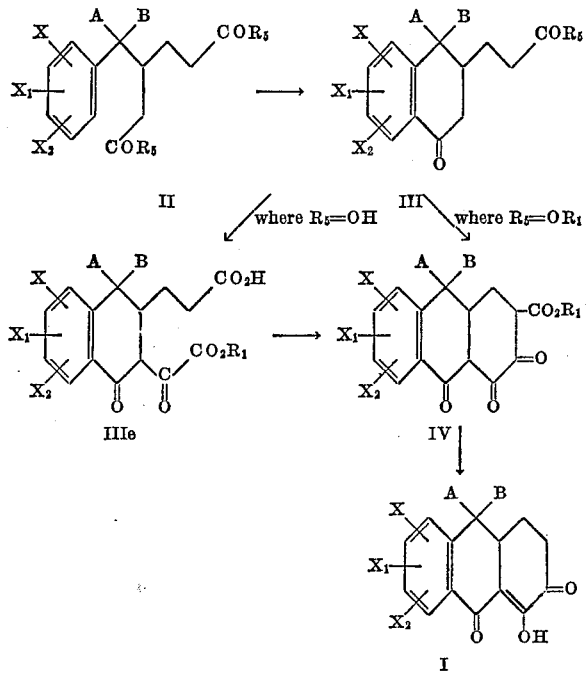

in the above formulae, X, $X_1$, $X_2$, and A are as previously described with the exception that substituent X is preferably not a nitro group since this group deactivates the ring of compounds of structure II in the ring closure reaction to those of structure III; ($R_1$ is lower alkyl or benzyl) and $R_5$ is hydroxyl, benzyloxy, lower alkoxy or halogen (Cl, F, Br, or I). Alternatively, the corresponding nitriles (e.g. where $COR_5$ is replaced by CN) may be used. Further, at least one of the two positions of the benzenoid ring ortho to the diester side chain must be available for the ring closure of structure III compounds. If desired, halogen, (Cl or Br) may be introduced into compounds of structure I, II, III and IV in which at least one of the benzenoid substituents is hydrogen by direct halogenation with a chlorinating or brominating agent by methods generally employed for halogenation of an aromatic ring. A variety of such agents are known to those in the art and include phosphorus pentachloride and pentabromide, sulfuryl chloride, N-chloro or bromoalkanoamides, e.g. N-chlor- and N-bromoacetamide; N-chloro (or bromo) alkanedioic acid imides, e.g. N-halosuccinimide; N-halophthalimide; chlorine; bromine; N-haloacylanilides, e.g. N-bromoacetanilide propioanilide and the like; 3-chloro-, 3-bromo, 3,5-dichloro and 3,5-dibromo-5,5-dimethylhydantoin, pyridinium perbromide and perchloride hydrohalides, e.g. pyridinium perbromide hydrobromide; and lower alkyl hypochlorites, e.g. tertiary butylhypochlorite.

The ring closure of compound II to III is accomplished by any of the commonly employed methods for such reactions which generally involve the use of a dehydrating or dehydrohalogenating cyclization agent. With compounds of structure II, a preferred method when $R_5$ is OH or alkoxy involves treatment of the starting compound with such ring closure agents as hydrogen fluoride or polyphosphoric acid. When $R_5$ in the starting compound is hydroxyl it is usually preferred to use hydrogen fluoride; when $R_5$ is lower alkoxy, polyphosphoric acid. When $R_5$ is halogen, a Friedel-Craft's catalyst, of course, should be employed, e.g. aluminum chloride. m-Hydroxy- or alkoxybenzyl compounds of structure II having CN in place of $COR_5$ lend themselves to the Hoesch synthesis (Berichte, 48, 1122 and 50, 462) wherein treatment with dry hydrogen chloride in the presence of zinc chloride leads to imine formation, and hydrolysis of the latter provides the tetralone keto group.

The condensation of compounds II or III in which $R_5$ is OR, with oxalic ester as well as ring closure of compounds IIIa (after esterification of the free acid with $R_1OH$) are effected by the general methods for ester condensation reactions of this type. Usually the reaction is carried out in the presence of a strong base such as alkali, metal, alkali metal alkoxides and hydrides, sodamide and the like. If the starting compound in the oxalate condensation contains free hydroxyl or amino groups, it is preferred to block such groups by alkylation or acylation by known procedures. After the reaction is completed, the blocking groups may be removed, if desired. The resulting product from structure II, i.e. the corresponding 2-carbalkoxy or carbobenzyloxy compound of structure IV, on hydrolysis and decarboxylation yields compounds of structure I. Cleavage of the ether linkage or other blocking groups by any of the general methods, e.g. treatment with mineral acid such as concentrated hydrobromic or hydriodic acid, or when R is benzyl, hydrogenolysis, gives free hydroxy groups in the benzenoid portion.

The starting compounds of the above described processes, i.e. compounds of structure II are prepared by the following sequence of reactions:

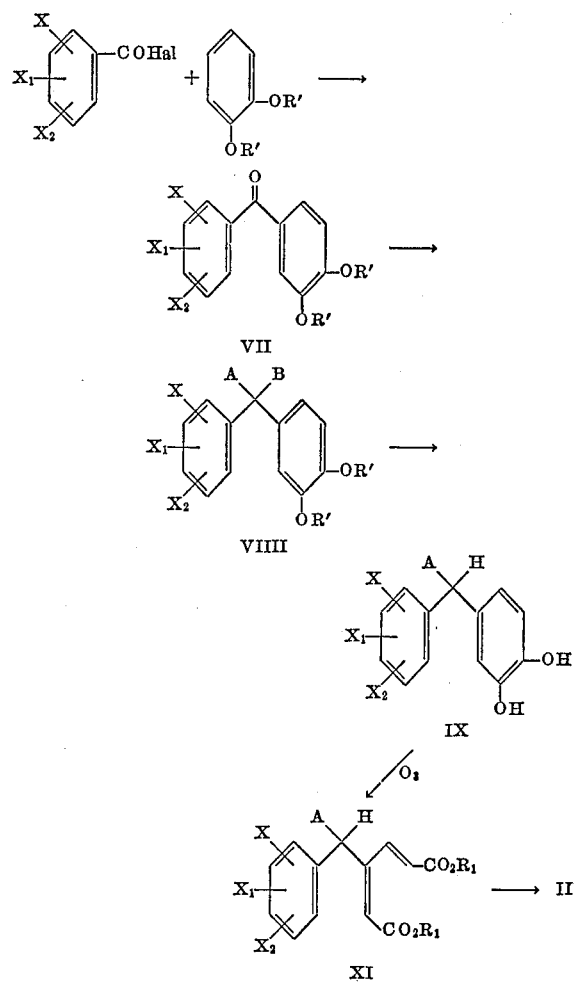

In the above sequence, R' is lower alkyl or benzyl; and B is hydrogen or hydroxy.

FLOW SHEET III

The first of these reactions for the preparation of compounds of structure VII is by means of Friedel-Craft's reaction, e.g. AlCl₃ in carbon disulfide. The conversion of compounds of structure VII to those of VIII in which A and B are hydrogen is by catalytic reduction, e.g. over copper chromium oxide or noble metal, e.g. palladium, catalyst at from atmospheric to superatmospheric pressures of hydrogen gas; where A is alkyl and B hydroxyl, by reaction with a suitable Grignard reagent, e.g. AMg halogen; where A is alkyl or hydrogen and B is hydrogen, by reduction, i.e. hydrogenolysis, of corresponding compounds in which B is hydroxyl.

From VIII to IX is a standard ether hydrolysis, e.g. concentrated hydrobromic acid.

From IX to XI is an oxidation reaction (ozonolysis or hydrogen peroxide) giving rise to the dienedioic acid which on hydrogenation over a noble metal catalyst, e.g., palladium, palladium on carbon, platinum oxide, etc., gives compounds of structure II. In the ozonolysis reactions to form compounds of structure XI it is not possible to employ as starting compounds those of structure IX in which there are adjacent hydroxyl groups in the benzene ring containing X, $X_1$ and $X_2$ as substituents, since such structures are susceptible to the oxidation reaction.

Further, in the ozonolysis reaction compounds of structure IX in which X, $X_1$ and $X_2$ are adjacent ether groups or adjacent ether and hydroxy groups cannot be used since they, too, are susceptible of oxidation. The ozonolysis reaction is applicable to compounds of structure VIII, subject of course, to the above limitation, wherein $OR^1$ represents an ether group. In such cases the ester (XI) is obtained. In the hydrogenation reaction, compounds of structure XI may be used as the free acids or corresponding benzyl or lower alkyl esters to provide corresponding products of structure II. Of course, benzyl esters may undergo hydrogenolysis to the free acid.

In addition, appropriate methods are available for reduction of the benzoyl keto group to a secondary alcohol. For example, IIa and VII can be reduced with sodium borohydride, or by hydrogenation with palladium catalyst in non-acidic media. By other well-known replacement procedures such as the following, the secondary alcohol may be converted to a readily replaceable sulfonic ester group, e.g. the tosylate, mesylate, etc., followed by reaction with an amine, a malonic ester, or the like, thus affording means for introduction of an amino or —$CH(CO_2B_2)_2$ group in the 6-position of the final tetracycline.

In the sequence of reactions, when X and/or $X_1$ are halogen, care should be taken to avoid prolonged hydrogenations which may result in the removal of the halogen atom. The possibility of halogen removal may be minimized by the use of a lower alkanoic acid, e.g. acetic or propionic as solvent for the reaction. Of course, if removed, halogen may be reintroduced if desired by the method hereinbefore described.

In those compounds of structure IX in which there are amino or adjacent hydroxy groups in the benzenoid moiety, such groups must be protected by suitable blocking groups, e.g. amino groups acylated; hydroxy groups etherified with lower alkyl or benzyl groups. Of course, the etherifying radical of the hydroxy group may differ from that represented by R'. If the etherifying radical is benzyl it may subsequently be removed by hydrogenolysis. Alternatively, all ether groups can be removed by hydrogen iodide treatment.

As will be appreciated from the preceding reaction sequence it is most convenient to introduce the benzenoid substituents, X, $X_1$ and $X_2$ by employing the appropriately substituted benzoic acid derivative as starting material. Many of these benzoic acid derivatives are commercially available, and others may be readily obtained by those skilled in the art.

It will be noted that a number of the later steps of the preceding sequences involve reaction conditions which may affect certain of the substituent groups signified by X, $X_1$ and $X_2$. For instance, in catalytic hydrogenation, e.g. VII→VIII, halo groups are subject to hydrogenolysis and nitro groups are subject to reduction to amino. Therefore, where halo or nitro groups are desired in the final product, these are best introduced subsequent to the hydrogenation by an appropriate substitution reaction. In the case of nitro groups, these are preferably introduced subsequent to ring closure [II→III] since the nitro group is a deactivating group for aromatic substitution and may cause difficulty in effecting cyclization. When an aromatic amino group is present, it may be replaced by nitro by standard diazotization procedures followed by Sandmeyer reaction. This is most conveniently carried out on compound XVIII (Flow Sheet I) preferably as the enol ether or a later stage in the synthetic sequence. If the nitro group is present in the starting benzoyl succinate XIII and is reduced during the course of the process to an amino group, the latter may subsequently be alkylated or acylated in conventional fashion to provide desirable products.

If the aromatic ring carries an acetylamino group, the latter will be hydrolyzed, e.g. in the reaction VIII→IX, and subsequent reacylation is called for.

On commencing the sequence with a substituted benzoyl succinate, it is essential that an ortho ring position be unsubstituted, since cyclization to form the center ring of the hydroanthracene occurs at this position. For the preparation of the preferred compounds of structure I, which bear an OR substituent in the 5 position, the position of the benzene ring between the OR group and the keto group in the starting benzoyl succinate should be unsubstituted, to provide for the subsequent ring closure. On the other hand, it is preferred to have a substituent in what corresponds to the 8-position of compound I, since this precludes cyclization to that position in competition with the desired cyclization [II→III]. An alkoxy, alkyl, or acylamino group can be conveniently carried in this position from the outset. Alternatively, an 8-substituent may be introduced during the reaction sequence, prior to the cyclization. For example, compound II may be halogenated at this position, e.g., by treatment with chlorine in the presence of a catalytic amount of iodine or ferric chloride.

Compounds of structure II are also prepared by the following sequences of reactions.

FLOW SHEET IV

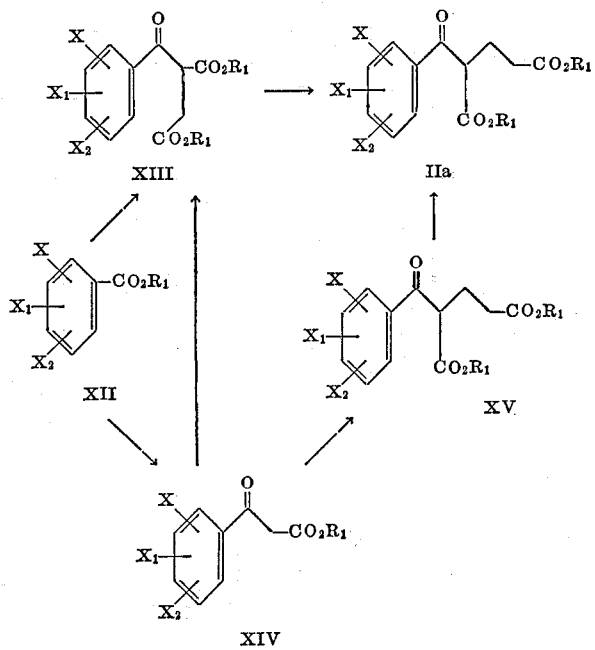

The conversion of compounds of Formula XII to those of XIII is a Claisen-type condensation of the lower alkyl ester of XII with succinic acid diesters to provide Formula XIII compounds. The conversion of compounds of Formula XII to XIV is similarly a Claisen condensation using acetic acid esters. The conversion of compounds of Formula XIV to XIII is by alkylation reaction with a monohaloacetic acid ester, and the conversion of XV to IIa is such an alkylation followed by hydrolysis and decarboxylation. The preparation of compounds of Formula XV from those of Formula XIV is by standard alkylation procedures preferably using $H_2C=CHCO_2R_1$ or corresponding nitrile. The conversion may also be effected by alkylation with a $\beta$-halo acid derivative halogen-$CH_2CH_2CO_2R_1$ or the corresponding nitrile. Each of these reactions are effected under standard conditions known to those skilled in the art, e.g., in a reaction-inert solvent in the presence of a base such as Triton B (benzyltrimethylammonium hydroxide), sodamide, sodium hydride and their obvious equivalents.

The conversion of compounds of Formula XIII to those of IIa is by known standard reactions, e.g. by reaction of Formula XIII compounds with corresponding acrylic acid esters of the formula $H_2C=CH_2CO_2R_1$ in which $R_1$ is as previously described under the conditions of the Michael reaction. It may also be effected by alkylation with $\beta$-halo-alkanoic acids of the formula halogen-$CH_2CH_2CO_2R_1$ or of the corresponding nitriles. Hydrolysis and decarboxylation of these compounds gives structure IIa compounds. The conversion of structure IIa compounds to those of structure II is brought about by reactions as previously described for preparing structure VIII compounds.

The present invention additionally is adaptable for the preparation of other tetracycline molecules, as follows.

For compounds in which substituent X is nitro, the tetralone of structure II is nitrated by standard procedures, e.g., such as nitric-acetic anhydride-acetic acid mixtures or nitric acid-sulfuric acid mixtures. Those in which X is halogen, nitro or other such groups, are prepared by a Sandmeyer reaction of the corresponding diazonium salt with suitable salt reagents ($Cu_2Cl_2$, $Cu_2Br_2$, KI, etc.). The diazonium salt is obtained by diazotization of the amino compound, prepared from compounds of structure II in which X is amino or produced by the reduction of the corresponding nitro compound by conventional means, e.g., chemical means, such as, active metals (Sn) and mineral acids (HCl) or by catalytic hydrogenation, e.g., nickel catalyst and superatmospheric pressure.

The amino group may also be introduced into the benzenoid ring by coupling of aryldiazonium salts, e.g., benzene diazonium chloride or the diazonium salt of p-aminobenzenesulfonic acid, with compounds of structure II or III containing a free hydroxy substituent in the 5-position of the 4-tetralone ring (3-position of the benzene ring) followed by reduction of the resulting phenylazo compound, e.g., catalytic reduction over noble metal catalysts. An amino group may also be introduced in place of the keto carbonyl oxygen of compounds of structure VII and XV by reduction of the corresponding oxime or hydrazone, by reductive ammonolysis of the keto carbonyl group over noble metal catalysts or by reduction of the keto group to a secondary hydroxy group by sodium borohydride followed by conversion to the tosylate and replacement of the tosylate group by an amino group. The benzoyl keto group of compounds of structure IIa may be subjected to the Wittig reaction as described in Angewandte Chemie 71, 260–273 (1959) to produce the alkylidene derivatives IIc.

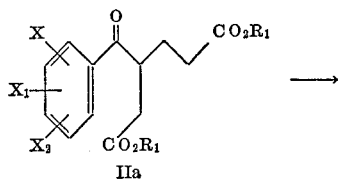

IIa

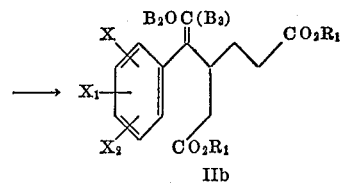

IIb by treatment with the ylid prepared from a chloroether of the formula $(B_3)CHClOB_2$ (where $B_2$ is lower alkyl and $B_3$ is hydrogen or lower alkyl). The necessary chloroethers are obtained by standard treatment of aldehyde acetals of the formula $(B_3)CH(OB_2)_2$ with an acid chloride (J. Org. Chem. 1, 231, 1936).

Treatment of compounds IIa in this fashion with the ylid from chloromethyl ether, for example, converts the keto group to a methoxymethylene group, which may be reduced to methoxymethyl. The latter group may be carried through the subsequent steps herein described to the 6-methoxymethyltetracycline. At this point, the elements of methanol may be split out by standard procedures to obtain the 6-methylene-6-deoxy-6-demethyltetracycline.

The products of the above reaction may in turn be hydrogenated with noble metal catalysts:

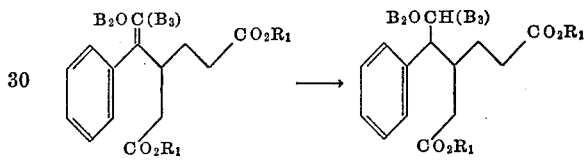

Subjecting the reduction products to the further synthetic sequences illustrated herein yields tetracyclines having a 6-$CH(B_3)OB_2$ substituent. Treatment of such tetracyclines with liquid hydrogen fluoride results in the elimination of a mole of alcohol $B_2OH$ and provides tetracyclines having a -$CH(B_3)$ at the 6-position. The latter treatment is, for example, conveniently effected after the introduction of the 12a-hydroxyl group. Alternatively, treatment of such tetracyclines having a 6-$CH(B_3)OB_2$ group converts this group to $CH(B_3)OH$ with concurrent hydrolysis of any ether groups in the aromatic D-ring.

The products of the Wittig reaction IIb may also be hydrolyzed to aldehydes and the resulting aldehyde group in turn converted by catalytic hydrogenation to a hydroxymethyl group. The latter may be carried through the subsequent reactions of synthetic sequence with its free hydroxyl group, or preferably, in the form of a lower alkyl ether.

As has been previously pointed out, normal discretion must be employed in subjecting certain of the substituted intermediates to the herein described reaction steps. In the base condensation reactions, the presence of a substituent having an active hydrogen (e.g., a hydroxyl or amino group) will necessitate the use of an additional mole of the sodium hydride or other base. The presence of more than one such substituent per mole is preferably avoided in these reactions, e.g. by the use of protective ether groups as previously described. The same considerations apply to Grignard reactions and hydride reductions. Hydroxyl groups can be subsequently regenerated from their ethers by conventional hydrolytic procedures such as treatment with hydrogen bromide. Similarly, protective benzyl ether groups can subsequently be hydrogenolyzed to obtain hydroxyl groups where desired.

In addition, alternative routes or procedures can be selected. Thus, in the reduction of benzoyl adipate IIa to corresponding benzyl derivative II, the three-step procedure previously referred to is an appropriate alternative to direct reduction; i.e. (1) conversion of the keto group to hydroxyl, e.g. with sodium borohydride or by mild reduction at room temperature with palladium on carbon in alcohol or other neutral solvent; (2) conversion of the resulting alcohol to the unsaturated compound by dehydration in anhydrous hydrogen fluoride; and (3) rapid hydrogenation of the resulting double bond, e.g. with palladium at room temperature and moderate hydrogen pressure, until one mole of hydrogen has been consumed. An alternative reduction procedure which is suitable is the Wolf-Kishner reaction (Annalen, 394, 90, 1912 and J. Russ. Phys. Chem. Soc. 43, 582, 1911) wherein the benzoyl derivative is converted to a hydrazone, and the latter is in turn reduced to the corresponding benzyl derivative by heating with a base such as sodium ethoxide.

Of particular value are compounds of the following formula:

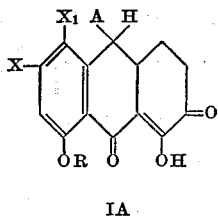

IA in which X, $X_1$, R and A are as described above, since these compounds are suitable for the preparation of known tetracycline compounds, i.e. where OR is OH, and homologs and analogs thereof.

These compounds are prepared from the corresponding starting compounds of structure II represented by structure IIC.

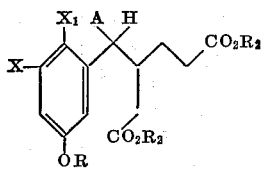

IIC through the sequence represented by II→III→IV→I. In the ring closure reaction to corresponding structure III compounds, it is preferred that one of the benzenoid substituents (X or $X_1$) be para to substituent OR so that the ring closure reaction proceed in the position ortho to substituent OR to afford corresponding structure III compounds. If there is no substituent para to OR a halogen group may be introduced by direct halogenation by conventional methods as hereinbefore described. The para halogen substituent may be removed if desired, by hydrogenolysis, under the usual conditions, of the tetralone resulting from the ring closure.

The ring closure of compounds of structure IIA that have no substituent in the position para to OR, results principally in compounds of the following structure:

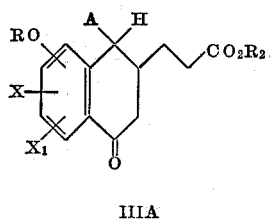

IIIA

Structure IIA compounds are suitable for conversion to corresponding compounds of structure IV. They also provide an elegant method of introducing a variety of substituents into the position para to substituent OR as follows. The oxime of the tetralone (IIIA) is prepared by conventional methods and then subjected to the Beckman rearrangement ($BF_3$ in HOAC) to the carboxamide:

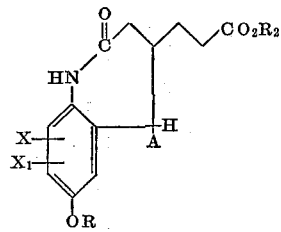

which, on hydrolysis, provides structure IIA compounds with an amino group para to substituent OR. If desired, other substitutents may be substituted for the amino group by diazotization and replacement of the diazonium group as previously described.

The present invention provides a means of synthesizing tetracycline compounds including new tetracyclines, not previously described, which are therapeutically useful by virtue of their antimicrobial activity.

Those skilled in the art will appreciate that the following examples provide a basis for preparing the listed tetracyclines and the corresponding 12a-deoxy derivatives thereof.

Some of the new tetracyclines of the present invention are homologs, isomers or closely related analogs of known tetracyclines. Many of the new tetracyclines are distinguished from prior art compounds by their possession of important and desirable properties, such as extended in vitro and in vivo antibacterial spectra, activity against organisms which have inherent or acquired resistance to known antibiotics, rapid absorption, sustained blood levels, freedom from serum binding, preferential tissue distribution at various parts of the body (e.g. kidney, lung, bladder, skin, etc.) which are sites for infection, sustained stability in a variety of dosage forms, resistance to metabolic destruction, broad solubility, and freedom from objectionable acute and cumulative side-effects. The new tetracyclines are useful in therapy, in agriculture, and in veterinary practice both therapeutically and as growth stimulants. In addition, they may be employed as disinfectants and bacteriostatic agents, in industrial fermentations to prevent contamination by sensitive organisms, and in tissue culture, e.g. for vaccine production.

The various new tetracyclines of the present invention which do not share the antibacterial activity of the known tetracyclines are valuable intermediates in the preparation of other compounds of classes known to contain biologically active members. Thus, the D-ring can be nitrated directly and the nitro derivative reduced catalytically to an aminotetracycline. Further, the tetracycline products of this invention can be halogenated by known methods at the 11a-, or in the case of a 7-unsubstituted tetracycline, in the 7,11a-positions by treatment with such halogenating agents as perchloryl fluoride, N-chlorsuccinimide, N-bromsuccinimide and iodobromide.

The present invention embraces all salts, including acid-addition and metal salts, of the new antibiotics. Such salts are formed by well known procedures with both pharmaceutically acceptable and pharmaceutically unacceptable acids and metals. By "pharmaceutically acceptable" is meant those salt-forming acids and metals which do not substantially increase the toxicity of the antibiotic.

The pharmaceutically acceptable acid addition salts are of particular value in therapy. These include salts of mineral acids such as hydrochloric, hydriodic, hydrobromic, phosphoric, metaphosphoric, nitric and sulfuric acids, as well as salts of organic acids such as tartaric, acetic, citric, malic, benzoic, glycollic, gluconic, gulonic, succinic, arylsulfonic, e.g. p-toluenesulfonic acids, and the like. The pharmaceutically unacceptable acid addition salts, while not useful for therapy, are valuable for isolation and purification of the new substances. Further, they are useful for preparation of pharmaceutically acceptable salts. Of this group, the more common salts include those formed with hydrofluoric and perchloric acids. Hydrofluoride salts are particularly useful for the preparation of the pharmaceutically acceptable salts, e.g. the hydrochlorides, by solution in hydrochloric acid and crystallization of the hydrochloride salt formed. The perchloric acid salts are useful for purification and crystallization of the new products.

Whereas all metal salts may be prepared and are useful for various purposes, the pharmaceutically acceptable metal salts are particularly valuable because of their utility in therapy. The pharmaceutically acceptable metals include more commonly sodium, potassium and alkaline earth metals of atomic number up to and including 20, i.e., magnesium and calcium and additionally, aluminum, zinc, iron and manganese, among others. Of course, the metal salts include complex salts, i.e. metal chelates, which are well recognized in the tetracycline art. The pharmaceutically unacceptable metal salts embrace most commonly salts of lithium and of alkaline earth metals of atomic number greater than 20, i.e., barium and strontium, which are useful for isolating and purifying the compounds.

It will be obvious that, in addition to their value in therapy, the pharmaceutically acceptable acid and metal salts are also useful in isolation and purification.

The new tricyclic intermediates of the present invention, in addition to their value in synthesis, exhibit valuable antimicrobial activity. They may be employed as bacteriostatic agents, and are further useful in separation and classification of organisms for medical and diagnostic purposes. These new intermediates, by virtue of their $\beta$-diketone structure, are also valuable chelating, complexing or sequestering agents, and form particularly stable and soluble complexes with polyvalent cations. They are therefore useful wherever removal of such polyvalent ions is desired, e.g., in biological experimentation and in analytical procedures. Of course, as is well known to those skilled in the art, such $\beta$-diketones may exist in one or more of several tautomeric forms as a result of their ability to enolize. It is fully intended that the $\beta$-diketone structures herein employed embrace such tautomers.

The starting compounds of the present invention are readily preparable by known procedures. Many of these compounds, including both benzoic acid esters and benzophenone starting compounds, have been described in the literature.

The following examples are given by way of illustration and are not to be construed as limitations of this invention, many variations of which are possible within the scope and spirit thereof.

EXAMPLE I

Monoethyl ester of 3-(3-methoxybenzyl)adipic acid

METHOD A

Five grams of diethyl 3-(3-methoxybenzoyl)adipate and 2 g. of 5% palladium on carbon in 30 ml. of acetic acid are treated in a conventional Parr shaker at a pressure of 40 p.s.i. of hydrogen gas at 50° C. until 2 moles of hydrogen are taken up. The first mole of gas is taken up rapidly and the second more slowly over a total reaction time of up to about 30 hours. The mixture is filtered, concentrated under reduced pressure to an oil which is vacuum-distilled to obtain the product.

METHOD B

The $\gamma$-lactone of the enol form of the monoethyl ester of the starting compound is hydrogenated over palladium on carbon by this same method to obtain this product,
B.P. 190–1° C. (0.3 mm.). Elemental analysis gives the following results:

Calcd. for $C_{16}H_{22}O_5$ (percent): C, 65.29; H, 7.53. Found (percent): C, 65.25; H, 7.68.

The corresponding diethyl ester is prepared by refluxing this product in ethylene dichloride containing ethanol and sulfuric acid. The diester is obtained by diluting the reaction mixture with water, separating, drying and concentrating the ethylene dichloride layer, and vacuum-distilling the residual oil, $n_D^{25}=1.4973$. Elemental analysis gives the following results:

Calcd. for $C_{18}H_{26}O_5$ (percent): C, 67.06; H, 8.13. Found (percent): C, 67.02; H, 8.31.

The starting compound together with the corresponding $\gamma$-lactone are prepared by hydrolysis and decarboxylation of diethyl 3-carbo-t.butoxy-3-(3-methoxybenzoyl)adipate (Example L) by refluxing in dry xylene containing p-toluenesulfonic acid. The products are separated by fractional distillation or may be used together as starting compound for this hydrogenation reaction.

EXAMPLE II 3-(3-methoxybenzyl)adipic acid

METHOD A

Amalgamated zinc is prepared by shaking for 5 minutes a mixture of 120 g. of mossy zinc, 12 g. of mercuric chloride, 200 ml. of water and 5 ml. of concentrated HCl in a round-bottomed flask. The solution is decanted and the following reagents added: 75 ml. of water and 175 ml. of conc. HCl, 100 ml. of toluene and 52 g. of 3-(3-methoxybenzoyl)adipic acid. The reaction mixture is vigorously boiled under reflux for 24 hours. Three 50 ml. portions of concentrated HCl are added at intervals of 6 hours during reflux.

After cooling to room temperature, the layers are separated, the aqueous layer diluted with 200 ml. of water and extracted with ether. The ether extract is combined with the toluene layer, dried and concentrated under reduced pressure to obtain the product.

METHOD B

A solution of 6254.4 grams (22.1 mole) 3-(3-methoxybenzoyl)adipic acid in 38.5 liters of glacial acetic acid is hydrogenated in a 15 gal. stirred autoclave in the presence of 2.5 kg. 5 percent palladium-on-carbon catalyst at 1000 p.s.i.g. and 50° C. until the theoretical amount of hydrogen has been absorbed. The catalyst is filtered off and the solvent removed from the filtrate by distillation at reduced pressure. This gives 5432 grams of product in the form of an oil. It is further purified by conversion to the dimethyl ester, fractional distillation, and hydrolysis, as follows:

A solution of 5432 grams (20.4 moles) of the crude 3 - (3 - methoxybenzyl)adipic acid, 3410 grams (106.6 moles) methanol, 10.6 liters ethylenedichloride and 106 ml. concentrated sulfuric acid is stirred and refluxed for 15 hours. The mixture is cooled and washed with water ($3 \times$ 5 l.), 5 percent aqueous sodium hydroxide ($1 \times 2$ l.) and again with water ($3 \times 5$ l.). The ethylenedichloride solution is dried over 3 lbs. anhydrous magnesium sulfate (with 2 lbs. Darco G60 activated carbon). The drying agent and carbon are filtered off and the filtrate concentrated at reduced pressure to remove solvent. The residue is distilled through a 3″ x 6″ vacuum-jacketed fractionating column packed with porcelain saddles. After a forerun of 934.1 grams, the product is collected at 172.0° C./0.2 mm. to 183° C./0.35 mm. This amounts to 3076.6 g. of 95 percent pure ester.

The ester, 2943.4 grams (10.00 moles) is hydrolyzed by heating over a steam bath for 19 hours with 1 kg. (25.0 moles) sodium hydroxide in 6 liters of water. The hydrolysis mixture is acidified to pH ca. 1.0 by addition of concentrated hydrochloric acid and the product is extracted into methylene chloride ($1 \times 4$ l. and $2 \times 2$ l.). The methylene chloride extract is washed with water (1× 4 l. and 1× 8 l.), dried over magnesium sulfate, filtered and freed of solvent by distillation at reduced pressure. This gives 2506 grams of 3-(3-methoxybenzyl)adipic acid in the form of a very sticky oil.

METHOD C

A solution of dimethyl 3-(3-methoxybenzyl)adipate (0.01 mole) in 280 ml. of 1:1 tetrahydrofuran: 1,2-dimethoxyethane at a temperature of about −10° C. is treated with a solution of sodium borohydride (0.005 mole) in 30 ml. of 1,2-dimethoxyethane and 10 ml. of water. After 15 minutes, 5 ml. of glacial acetic acid is added and the mixture stirred for 5 minutes. Hydrochloric aicd (3 ml. of 6 N) is then added, the mixture stirred for an additional 0.5 hour, then poured into water. The product, 3 - [α - hydroxy - (3 - methoxybenzyl)]adipic acid dimethyl ester, is recovered by evaporation.

The hydroxy ester is placed in 150 ml. of anhydrous hydrogen fluoride and allowed to stand overnight. The hydrogen fluoride is then evaporated and the thus produced dimethyl 3 - (3 - methoxy benzylidene)adipate dissolved in dioxane (300 ml.), treated with 0.3 g. of palladium on charcoal (5%) and subjected to 50 p.s.i. at room temperature until an equimolar proportion of hydrogen is consumed. The mixture is filtered and the filtrate evaporated to dryness under reduced pressure to give the desired compound as the methyl ester. It is hydrolyzed to the acid by the procedure of Method B.

EXAMPLE III

Dimethyl 3-(2-chloro-5-methoxybenzyl)adipate

METHOD A

A mixture of 3.2 g. of dimethyl 3-(3-methoxybenzyl)adipate and 1.4 g. of N-chlorosuccinimide in 30 ml. of trifluoracetic acid is stirred and heated on a steam bath of 30 minutes. The reaction mixture is then poured into 5% aqueous sodium bicarbonate with stirring, and the mixture extracted with ether. The combined extracts are dried over anhydrous sodium sulfate and then concentrated under reduced pressure to an oil which is vacuum-distilled to obtain the product, B.P. 200° C. (1.1 mm. Hg).

METHOD B

A mixture of 3.2 g. of dimethyl 3-(3-methoxybenzyl)adipate and 2.1 g. of phosphorus pentachloride in 100 ml. of dry benzene is refluxed for 30 minutes. The reaction mixture is carefully poured into ice and water, the benzene layer separated, washed with water and dried. Concentration of the dried benzene solution under reduced pressure yields an oil which is vacuum-distilled to obtain the product.

Similarly, the diethyl, dibenzyl and dipropyl esters are prepared.

METHOD C

A solution of 1688 g. of 3-(3-methoxybenzyl)adipic acid and 50 mg. of iodine in 9 liters of glacial acetic acid is stirred while a soution of 450 g. of chorine in 8 liters of glacial acetic acid is added during about 2 hours. The mixture is kept in the dark during the procedure and the temperature maintained at 10°–15° C. The solvent is then removed by concentration under reduced pressure to give 1902 g. of a dark amber oil.

This procedure is repeated with ferric chloride in lieu of iodine with comparable results.

METHOD D

A mixture of 30.4 g. of diethyl 3-(3-methoxybenzyl)adipate and 12.75 g. of sulfuryl chloride in 250 ml. of benzene is allowed to stand for 3 days at room temperature. At the end of this period, the reaction mixture is concentrated under reduced pressure to a gummy residue which is vacuum-distilled to obtain the product.

METHOD E

The procedure of Method B is repeated using as starting compound the corresponding dicarboxylic acid to obtain 3-(2-chloro-5-methoxybenzyl)adipic acid dichloride.

EXAMPLE IV

Diethyl 3-(2-chloro-5-ethoxybenzyl)adipate

This product is obtained by the procedure of Method A of Example III employing diethyl 3-(3-ethoxybenzyl)adipate in lieu of dimethyl 3-(3-methoxybenzyl)adipate.

EXAMPLE V 2-(2-carbethoxyethyl)-5-methoxy-8-chloro-4-tetralone

METHOD A

A mixture of 2 g. of diethyl-3-(2-chloro-5-methoxybenzyl)adipate (Example III) and 30 g. of polyphosphoric acid is heated on a steam bath for 30 minutes and then poured into ice water. The oil then separates and is collected.

METHOD B

A mixture of 2.0 g. of the di-acid chloride of 3-(2-chloro-5-methoxybenzyl)adipic acid in 30 ml. of carbon disulfide is cooled to 0° C. and 4 g. of aluminum chloride added portionwise to the cooled mixture. The mixture is stirred for 30 minutes and then allowed to warm to room temperature where a vigorous reaction ensues. After the vigorous reaction subsides the mixture is warmed on a steam bath, cooled, diluted with water and the carbon disulfide steam distilled. The mixture is extracted with chloroform and the product obtained by drying and concentrating the chloroform extract. The product is the free acid which, if desired, is converted to the desired lower alkyl ester by conventional methods. For example, the methyl ester is prepared as follows:

A mixture of 2002 g. (7.1 moles) of the tetralone acid, 3 l. chloroform, 682 g. (21.3 moles) methanol and 21.2 ml. conc. sulfuric acid is refluxed with stirring on a steam bath for 20 hours. The reaction mixture is then chilled and 2 l. each of chloroform and water are added. The organic phase is separated and washed successively with 2× 2 l. water, 1× 11.2% aqueous sodium hydroxide and 3× 4 l. of water to a final pH of about 7.5. After drying over anhydrous sodium sulfate and treatment with Darco KB activated carbon the solution is filtered and concentrated to a dark oil at reduced pressure. The oil is taken up in 6 l. hot ethyl acetate and 11 l. hexane added. The solution is chilled to −5° C. with stirring and 1404 g. 2 - (2-carbomethoxyethyl)-5-methoxy-8-chloro-4-tetralone recovered by filtration, hexane-washing and air-drying. The product melts at 101.0–102.4° C.

EXAMPLE VI 2-(2-carboxyethyl)-5-methoxy-8-chloro-4-tetralone

A polyethylene container is charged with 1809 g. (6.03 moles) 3-(2-chloro-5-methoxybenzyl)adipic acid and chilled in an ice bath while 7 kg. liquid hydrogen fluoride is introduced from an inverted, chilled tank. The mixture is swirled to make homogeneous and then left to evaporate partially overnight in a hood. Most of the hydrogen fluoride that remains is removed by placing the polyethylene container in warm water to cause rapid evaporation. The remainder is removed by quenching in about 10 l. water. The product is then extracted into chloroform, washed with water and dried over magnesium sulfate. Removal of the drying agent by filtration and the solvent by distillation gives a gum that is triturated with ether and filtered. This gives 1031 g. of crude product that is recrystallized from a mixture of 16 l. ethanol, 2 l. acetone and 1 l. ethylene dichloride, with activated carbon treatment. The first two crops amount to 863.9 grams of white crystalline product melting at 175.0–180.5° C.

Elemental analysis gives the following results:

Calcd. for $C_{14}H_{15}O_4Cl$ (percent): C, 59.47; H, 5.35; Cl, 12.54. Found (percent): C, 59.51; H, 5.42; Cl, 12.60.

Ultraviolet absorption shows $\lambda_{max}$ at 223 m$\mu$ ($\epsilon$=24,650)

255 m$\mu$ ($\epsilon$=7,900) and 326 m$\mu$ ($\epsilon$=4,510). Infrared absorption maxima appear at 5.76 and 5.99$\mu$.

This product is also obtained by hydrolysis of the product of Method A, Example V, by treatment with HCl in acetic acid.

The methyl ester, ethyl ester (m. 57–59° C.) and benzyl ester (m. 84–85° C.) are prepared by conventional methods.

3-(3-methoxybenzyl)adipic acid, treated with HF as described, yields 2-(2-carboxyethyl)-7-methoxy-4-tetralone, which melts at 158–9° C. after two recrystallizations from benzene-hexane and exhibits ultraviolet absorption maxima at 225 m$\mu$ ($\epsilon$=13,500) and 276 m$\mu$ ($\epsilon$=16,000) in methanolic HCl and NaOH.

*Analysis.*—Calcd. for $C_{14}H_{16}O_4$ (percent): C, 67.73; H, 6.50. Found (percent): C, 67.67; H, 6.48.

EXAMPLE VII

2-(2-carboxyethyl)-6-chloro-7-methoxy-4-tetralone

This substance is a byproduct of the cyclization of the products of Example III. It is separated from the crude 2-(2-carboxyethyl)-5-methoxy-8-chloro-4-tetralone of Example VI by virtue of its chloroform insolubility. 2900 g. of the crude tetralone are leached six times with 8 liter portions of hot chloroform. 170 g. of white solid remain, melting at 236–239° C. The methyl ester is prepared by the procedure of Example V, Method B.

EXAMPLE VIII

2-(2-carbomethoxyethyl)-5-benzyloxy-8-chloro-4-tetralone 2-(2-carboxyethyl)-5-methoxy-8-chloro-4-tetralone (25 g.), glacial acetic acid (200 ml.) and 48% hydrobromic acid (50 ml.) are heated at 90° under nitrogen for twenty-four hours. The cooled solution deposits a crystalline solid. The mixture is poured over two parts ice and the total solid crop isolated by filtration and thoroughly washed with water. The crude 2-(2-carboxyethyl)-5-hydroxy-8-chloro-4-tetralone obtained in this way is recrystallized from acetonitrile to obtain 18.8 g. melting at 164–8° C.

Elemental analysis.—Calcd. for $C_{13}H_{13}ClO_4$ (percent): C, 58.11; H, 4.88; Cl, 13.20. Found (percent): C, 57.99; H, 4.87; Cl, 12.73.

14.5 g. of this product is placed in 200 ml. dry methanol and the mixture refluxed for 30 minutes as anhydrous HCl is passed through. The now clear yellow solution is allowed to stand overnight, and the methanol is then removed in vacuo. The residual gum is extracted exhaustively with hexane and the combined extracts are concentrated and cooled. 11.8 g. of the white, crystalline methyl ester separates and is filtered off and recrystallized from hexane. The ester melts at 68–69.5° C. and analyzes as follows:

Calcd. for $C_{14}H_{15}ClO_4$ (percent): C, 59.45; H, 5.35; Cl, 12.6%. Found (percent): C, 59.16; H, 5.38; Cl, 12.6.

5.6 g. (0.02 mole) of this substance is dissolved in 500 ml. anhydrous methanol and to this is added 0.02 mole sodium methoxide and 500 ml. benzene. The mixture is concentrated to dryness in vacuo at room temperature, then heated at 100° C. and 0.1 mm. for 10 minutes. The residue is maintained under high vacuum at room temperature for 16 hours, and the dry solid added to 50 ml. benzyl bromide together with sufficient demethyl formamide to solubilize. The mixture is heated at 100° C. for 48 hours with stirring, then cooled and filtered. The filtrate is concentrated at reduced pressure and the residual oil chromatographed on acetone-washed and dried silicic acid in chloroform. The first effluent fraction consists of unchanged starting material. The main fraction, recognized by a negative ferric chloride test, deposits crystalline 2-(2-carbomethoxy ethyl)-5-benzyloxy-8-chloro-4-tetralone on standing.

EXAMPLE IX

2-carbomethoxy-5-methoxy-8-chloro-3,4,10-trioxo-1,2,3,4,4a,9,9a,10-octahydroanthracene 30 grams of 2-(2-carbomethoxyethyl)-5-methoxy-8-chloro-4-tetralone (0.1 mole), prepared as described in Example V, Method B, is dissolved together with 24 grams dimethyloxalate (0.2 mole) by warming with 135 ml. freshly distilled dimethyl formamide in a well dried two liter flask which has been flushed with dry nitrogen. The solution is cooled to 20° C. and to it is added all at one time 0.4 mole sodium hydride in the form of a 50% oil dispersion which has been exposed to the atmosphere for 24 hours in order to produce a deactivating coating. The reaction mixture is maintained at 20–25° C. with an ice bath. 0.1 mole dry methanol is now added, and the temperature rises spontaneously to 40–50° C. When the temperature begins to fall (about 5 minutes after addition of the methanol) the reaction vessel is removed from the ice bath and quickly placed in an oil bath at 110° C. The reaction temperature is brought with dispatch to 90° C. and maintained there for a maximum of 10 minutes, or until active bubbling ceases.

The flask is now immediately transferred back to the ice bath, and when the temperature reaches 15° C., 100 ml. of glacial acetic acid is added at such a rate that the temperature does not exceed 30° C. At this point, a golden yellow precipitate appears. 150 ml. methanol and 50 ml. water are added and the mixture is digested at 45° C. for 15 minutes and then stirred in an ice bath for an hour. If only a scanty crop of crystals is present at this time the mixture may be stored in the refrigerator overnight before proceeding. It is now transferred to a separatory funnel to permit separation of the oil from the sodium hydride oil dispersion. The suspension is then filtered with suction, and the filter cake triturated three times with 100 ml. portions of hot hexane to extract impurities. The wash solid is next stirred with 200 ml. water, filtered, and then digested with 500 ml. refluxing methanol for 20 minutes, to effect further purification. 15–16 grams of bright yellow needles are obtained. The product melts at 200–205° C. and exhibits no carbonyl absorption below 6$\mu$. In 0.01 N methanolic HCl it exhibits ultraviolet absorption maxima at 406 m$\mu$ ($\epsilon$=14,200) and at 275–290 m$\mu$ ($\epsilon$=5,940). In 0.01 N methanolic NaOH it exhibits maxima at 423 m$\mu$ ($\epsilon$=13,950) and at 340 m$\mu$ ($\epsilon$=7,120).

EXAMPLE X

2-carbomethoxy-6-chloro-7-methoxy-3,4,10-trioxo-1,2,3,4,4a-9,9a-10-octahydroanthracene 2 - (2 - carbomethoxyethyl) - 6 - chloro - 7 - methoxy-4-tetralone, prepared in Example VII, 30 g., is dissolved in 24 g. dimethyl oxalate in 300 ml. dry distilled dimethyl formamide by warming. The solution is then cooled under nitrogen in an ice-salt bath and 19.86 g. sodium hydride (51.2% in oil) added all at once as the temperature is maintained below 20° C. The ice bath is removed and the temperature rises spontaneously to 30° C., whereupon the bath is replaced briefly to control the vigorous reaction The reaction mixture is then heated to 70–80° C. for 5–8 minutes, cooled to below 0° C., and treated with 100 ml. acetic acid, added at such rate that the temperature does not reach 25° C. The reaction mixture is now poured into four volumes of chloroform. The chloroform solution is washed with water, then with saturated brine, and dried over anhydrous sodium sulfate. The solvent is removed in vacuo, and the residue is treated with 350 ml. methanol. After standing for several hours at room temperature the slurry is filtered to obtain 12.5 g. yellow crystalline product, melting at 228–231° C. with decomposition and gas evolution. Recrystallization from chloroform-methanol raises the melting point to 235.6–236.8° C.

*Analysis.*—Calcd. for $C_{17}H_{15}O_6Cl$ (percent): C, 58.21; H, 4.31; Cl, 10.11. Found: C, 58.53; H, 4.43; Cl, 10.10.

EXAMPLE XI 2-carbobenzyloxy-5-methoxy-8-chloro-3,4,10-trioxo-1,2,3,4,4a,9,9a,10-octahydroanthracene 2 - (2 - carboxyethyl) - 5 - methoxy - 8 - chloro - 4-tetralone, 0.02 mole, is combined with 500 ml. anhydrous methanol and to this is added 0.02 mole sodium methoxide and 500 ml. benzene. The mixture is concentrated to dryness in vacuo at room temperature, then heated at 100° C. and 0.1 mm. for 10 minutes. The residue is maintained under high vacuum at room temperature for 16 hours, and the dry solid added to 50 ml. benzyl bromide together with sufficient dimethyl formamide to solubilize. The mixture is heated at 100° C. for 48 hours with stirring, then cooled and filtered. The filtrate is concentrated under reduced pressure to obtain the benzyl ester as residue. Purification is effected by washing of a chloroform solution with aqueous sodium bicarbonate.

This substance is dissolved together with 0.04 mole dibenzyl oxalate in 50 ml. dry, distilled dimethyl formamide. To this is added 0.08 mole sodium hydride in the form of a 50% oil dispersion, while maintaining the temperature at about 20–25° C. Benzyl alcohol, 0.02 mole, is added, and the mixture is heated to 80° C. for 5 minutes, then cooled to 20° C. and slowly acidified with glacial acetic acid. The reaction mixture is next evaporated to dryness under reduced pressure and the residue is taken up in chloroform. The chloroform solution is washed with water, then with brine, dried over sodium sulfate, treated with activated carbon and filtered. The filtrate is evaporated at reduced pressure to obtain the product as residue. It is purified by evaporation of the highly fluorescent, less polar eluate fraction from silicic acid chromatography in chloroform.

EXAMPLE XII 2-carbomethoxy-5-methoxy-8-chloro-3,4,10-trioxo-1,2,3,4,4a,9,9a,10-octahydroanthracene Clean sodium metal (3.68 g.) is dissolved in methanol (50 ml.) and the solution evaporated to a dry white solid in vacuo (this is most successfully carried out by using rotary vacuum equipment). Dimethyloxalate (9.44 g.) and benzene (100 ml.) are then added to the flask and refluxing is carried out for about 10 minutes under nitrogen (not all of the solids dissolve but the cake is broken up). The solution is cooled and dimethylformamide (50 ml.) then added followed by the dropwise addition of a solution of 2-(2-carboxyethyl)-5-methoxy - 8 - chloro-4-tetralone (Example VI) (11.3 g.) in dimethylformamide (100 ml.) during one hour at 20° under $N_2$ with stirring, and stirring at room temperature under $N_2$ is continued overnight. The solution is then poured into cold water (1 l.) and extracted twice with chloroform. The chloroform extract is discarded and the aqueous solution acidified with 10% HCl solution. The product is obtained by extraction with chloroform (3 × 200 ml.), backwashing once with water, drying over anhydrous $Na_2SO_4$, treatment with charcoal, filtration and evaporation of the solvent in vacuo to give a red gum (16.4 g.) which is 2-(2-carboxyethyl)-3-methyloxalyl-5-methoxy - 9 - chloro - 4-tetralone.

U.V. absorption:
 Maxima in 0.01 N NaOH at 258 and 363 m$\mu$
 Maximum in 0.01 N HCl at 347 m$\mu$, minimum at 277 m$\mu$ The gum gives a deep red color with ferric chloride in methanol and liberates $CO_2$ from a saturated $NaHCO_3$ solution.

The acid is esterified by disolving in chloroform (1 l.), methanol (50 ml.) and conc. $H_2SO_4$ (10 ml.) and refluxing gently for 15 hours. The solution is cooled, poured into excess water and the chloroform layer separated. The aqueous layer is extracted with chloroform (250 ml.) and the combined chloroform extracts are backwashed twice with cold water. The extract is then dried over anhydrous sodium sulphate, treated with activated charcoal, filtered and evaporated to a red gum in vacuo. This gum does not liberate $CO_2$ from saturated bicarbonate solution, and gives a deep red color with ferric chloride in methanol.

The ester product, 3.825 grams, and 1.275 g. of sodium hydride (56.5% solution in oil) are dissolved in 25 ml. of dimethylforamide. An exothermic reaction sets in with the evolution of hydrogen gas. After the evolution of gas ceases the mixture is warmed at 40° C. for ½ hour where further evolution of hydrogen gas occurs and the reaction mixture darkens. The reaction mixture is finally digested on a steam bath for 10 minutes after which it is cooled and acidified with glacial acetic acid (15 ml.). The product is then obtained by dilution of the mixture with water followed by extraction with chloroform. The dried chloroform solution is concentrated under reduced pressure to obtain a gummy residue which crystallizes on trituration in methanol. The orange-yellow crystalline product, 2-carbomethoxy-5-methoxy-8-chloro-3,4,10 - trioxo - 1,2,3,4,4a,9,9a,10 - octahydroanthracene (1.2 g.), melts at 196–201.5° C.

EXAMPLE XIII 2-carbomethoxy-5-hydroxy-8-chloro-3,4,10-trioxo-1,2,3,4,4a,9,9a,10-octahydroanthracene Dimethyl oxalate, 0.84 g., and 2-(2-carbomethoxyethyl)-5-hydroxy-8-chloro-4-tetralone, 2.0 g., are added to a suspension of 0.34 g. sodium hydride in 10 ml. dimethyl formamide and the mixture is heated to 70° C. for three minutes. After cooling, the reaction mixture is treated with 10 ml. acetic acid and evaporated to dryness at reduced pressure. The residual gum is triturated with water to remove sodium acetate and chromatographed on silicic acid in chloroform. The main effluent fraction is dried to a bright yellow solid which is crystallized from chloroform-hexane to provide 380 mg. product melting at 218–219.5° C.

*Elemental analysis.*—Calculated for $C_{16}H_{13}O_6Cl$ (percent): C, 56.7; H, 3.9; Cl, 10.5. Found (percent): C, 56.86; H, 3.89; Cl, 10.8.

EXAMPLE XIV

Diethyl 3-($\alpha$-hydroxy-3-methoxybenzyl)adipate

This product is obtained by treating 5 g. diethyl 3-(3-methoxybenzoyl) adipate and 2 g. 5% palladium on carbon in ethanol with 40 p.s.i. hydrogen gas at room temperature until one molar equivalent of hydrogen is consumed. The reaction mixture is filtered and concentrated at reduced pressure to obtain the product.

It is further converted to diethyl 3-($\alpha$-N,N-dimethylamino-3-methoxybenzyl)adipate in the following manner:

The $\alpha$-hydroxy benzyl adipate ester, 0.01 mole in 15 ml. dimethoxyethane, is added to a stirred mixture of 1.9 g. (0.01 mole) p-toluenesulfonyl chloride and 2.5 ml. dry pyridine in an ice bath. When the reaction subsides the mixture is permitted to warm to room temperature, stirred for three hours, and poured into 50 ml. water. The pH is adjusted to 5 and the resulting tosyl ester recovered by filtration.

The tosylate (0.0025 mole) is combined with 25 ml. dimethoxyethane and added dropwise to a stirred solution of 0.015 mole dimethylamine in 50 ml. dimethoxyethane at 0° C. After addition is complete, stirring is continued for an hour at 0° and the reaction mixture is then heated at 60° for three hours under a Dry Ice condenser. The mixture is next evaporated in vacuo and the residue washed with water to remove dimethylammonium toluenesulfonate. The product is recovered by filtration from the water. Substitution of monomethylamine for dimethylamine in this procedure provides the corresponding α-N-methylamino derivative.

EXAMPLE XV 2-(2-carbomethoxyethyl)-5-methoxy-4-tetralone

2 - (2-carbomethoxyethyl)-5-methoxy-8-chloro-4-tetralone (1.5 g.) is combined with 5% palladium-on-charcoal (0.37 g.), triethylamine (0.5 g.) and methanol 270 ml. in a standard Parr hydrogenation bottle and subjected to fifty pounds of hydrogen pressure. The absorption of hydrogen levels off at approximately one molar equivalent. The catalyst is filtered off, the solution taken to dryness, and triethylamine hydrochloride is removed by washing with water. The residual white solids weigh 1.1 g. and melt at 63–66° C. After two recrystallizations from hexane and one from ether the product melts at 85–87°.

Analysis.—Calcd. for $C_{15}H_{18}O_4$ (percent): C, 68.68; H, 6.92. Found (percent): C, 68.59; H, 6.98.

EXAMPLE XVI 2-(2-carboxyethyl)-7-hydroxy-4-tetralone 3-(3-methoxybenzyl)adipic acid, 22.46 g., is heated at reflux with hydriodic acid (specific gravity 1.5) for 3 hours and the methyl iodide formed is separated. The solution is evaporated in vacuo and the resulting gum triturated with cold water to yield 14.7 g. of yellow crystalline product. Dried and recrystallized from aqueous acetone the product is obtained in the form of white crystals melting at 183.5–185.5° C.

Analysis.—Calcd. for $C_{13}H_{14}O_4$ (percent): C, 66.65; H, 6.02. Found (percent): C, 66.60; H, 6.02.

The same product is obtained by refluxing a mixture of 0.5 g. of the 3-(3-methoxybenzyl)adipic acid with 25 ml. 48% HBr for 18 hours, then pouring the reaction mixture into 3 volumes of water, and filtering the resulting 0.4 g. of crystalline precipitate.

EXAMPLE XVII 2-(2-carbomethoxyethyl)-5-methoxy-8-nitro-4-tetralone

One gram of the Example XV product is slowly added to 10 ml. of concentrated sulfuric acid containing 2 ml. of 70% nitric acid at a temperature of 0–5° C. The solution is stirred for 15 minutes and allowed to warm to room temperature. The mixture is poured into ice-water mixture and extracted with chloroform, the chloroform layer separated, dried and concentrated to obtain the product.

EXAMPLE XVIII 2-(2-carboxyethyl)-5-hydroxy-8-amino-4-tetralone

One molecular proportion of aniline is dissolved in 2 N HCl, employing about 20 ml. thereof per gram of aniline, and the solution treated with one molecular proportion of $NaNO_2$ at 0° to 10° C. The benzenediazonium chloride solution is then mixed with stirring at 0° to 20° C. with an aqueous solution of 2-(2-carboxyethyl)-5-hydroxy-4-tetralone sodium salt and sufficient sodium carbonate to neutralize the excess HCl in the diazotised aniline solution. The pH of the solution is in the range 8–10. Stirring is continued at 0° C. for approximately two hours after which careful neutralization of the reaction mixture yields the 8-phenylazo compound. The product is collected on a filter, washed and dried.

One part by weight of 2-(2-carboxyethyl)-5-hydroxy-8-phenylazo-4-tetralone is mixed with 20 parts by weight of methanol and ⅕ part by weight of 5% palladium-on-carbon catalyst is added to the mixture which is then hydrogenated at 30–45 p.s.i. of hydrogen gas in a conventional shaker apparatus at 30° C. until two molar equivalents of hydrogen are taken up.

After filtration, the product is recovered by high vacuum distillation of the residue obtained by removal of the solvent in vacuo. Care must be exercised to protect the amino phenol from air. It can be stabilized by acetylation, as follows:

The crude amine is placed in 20 parts water containing one molar equivalent of HCl, and 2.2 molar equivalents of acetic anhydride are added. Sufficient sodium acetate is then added to neutralize the HCl and the solution is warmed to 50° C. After 5 minutes the mixture is cooled and the crude acetate separated by filtration. The solid is then dissolved in cold 5% sodium carbonate solution and reprecipiated with 5% HCl. The 2-(2-carboxyethyl)-5-hydroxy-8-N-acetylamino-4-tetralone obtained in this manner is a preferred form of the amino compound for further reaction sequences.

EXAMPLE XIX 3-(2-amino-5-hydroxybenzyl)adipic acid

The procedure of Example XVIII is repeated using 3-(3-hydroxybenzyl)adipic acid as starting compound to obtain this product. It may be converted to the product of Example XVIII by the ring closure procedure of Example VI.

EXAMPLE XX 3-(2-chloro-5-hydroxybenzyl)adipic acid

Three parts by weight of the product of Example XIX (obtained by evaporating the methanol) is protected from air, immediately mixed with 10 parts by weight of 10% aqueous hydrochloric acid at 0° C., and diazotized by gradual addition of 20% aqueous sodium nitrite solution. Addition of sodium nitrite is continued until a positive starch iodide test on a few drops of the reaction mixture is obtained in the conventional fashion. The resulting solution is then added to 15 parts of a boiling 10% solution of cuprous chloride in aqueous hydrochloric acid. The mixture is boiled for 10 minutes and allowed to cool. The product separates from the cooled mixture and is collected in the conventional manner.

This procedure is used for the preparation of 3-(2-substituted-5-hydroxy-benzyl) adipic acid compounds such as 2-bromo (using $Cu_2Br_2$ and HBr), 2-iodo (using KI and $H_2SO_4$) and 2-fluoro compounds (decomposing the dry diazonium fluoborate salt by careful heating).

EXAMPLE XXI

3-[α-hydroxy-α-(2-chloro-5-methoxy-phenyl)ethyl] adipic acid diethyl ester

To a solution of 3-(2-chloro-5-methoxybenzoyl)adipic acid diethyl ester in dimethoxyethane is added dimethoxyethane solution containing a molar equivalent of methyl magnesium bromide. After standing for 30 minutes, the reaction mixture is acidified cautiously with ice and aqueous 6 N HCl, and extracted with methylene chloride. The extracts are combined, washed with water, dilute aqueous sodium bicarbonate and water, dried and concentrated under reduced pressure to obtain the product.

EXAMPLE XXII

3-[α-(2-chloro-5-methoxyphenyl)ethyl]adipic acid diethyl ester

The product of Example XXI, 2 g., is dissolved in 150 ml. of glacial acetic acid and hydrogenated at a pressure of 40 p.s.i. of hydrogen gas for 24 hours at room temperature in the presence of 2 g. of 5% palladium-in-carbon catalyst. The mixture is filtered and then concentrated. The product is obtained by vacuum distillation of the residue.

EXAMPLE XXIII 3,3',4-trimethoxybenzophenone

A mixture of 40 g. of 3-methoxybenzoyl chloride, 32 g. of veratrole and 230 ml. of carbon disulfide in a 3 neck round bottom flask fitted with reflux and stirrer is cooled to 0° C. Then 40 g. of aluminum chloride is added portionwise to the cooled mixture and the mixture stirred for 45 minutes, after which it is allowed to warm to room temperature. A vigorous reaction ensues with the separation of a yellow precipitate. The mixture is carefully warmed on a steam bath and stirred for 1½ hours. Water is then added to the cooled mixture and the carbon disulfide is steam distilled off. The resultant mixture is then extracted with chloroform and the chloroform layer separated, washed with dilute hydrochloric acid, followed by dilute sodium hydroxide and then dried and concentrated under reduced pressure. The residual oil is distilled to obtain the product, B.P. 216–218° C. at 1.5 mm. mercury. A 65% yield of product is obtained. The viscous product is stirred in absolute methanol and crystallizes, 85–86° C.

EXAMPLE XXIV 3,3′,4-trimethoxydiphenylmethane

METHOD A

A solution of 5 g. of 3,3′,4-trimethoxybenzophenone in 200 ml. of ethanol containing 1 g. of copper chromium oxide is hydrogenated at 180° C. and 100 atmospheres of hydrogen gas for 1.5 hours. The resultant solution is filtered and concentrated under reduced pressure. The residual oil is distilled to obtain the product B.P. 192–194° C. at 2.5 mm. mercury. The product crystallizes on standing, the melting point of the crystals being 45–46° C. Elemental analysis gives the following results:

Calcd. for $C_{16}H_{18}O_3$ (percent): C, 74.39; H, 7.02. Found (percent): C, 74.50; H, 7.18.

METHOD B

This product is also obtained by hydrogenation of the starting compound of Method A using 10% palladium on carbon in ethanol at 50° C. and 40 p.s.i. of hydrogen gas. The hydrogenation procedure is also carried out at room temperature, although the uptake of hydrogen is considerably slower than at 50° C. The product is obtained by filtration and concentration of the hydrogenation mixture.

EXAMPLE XXV 3,3′,4-trihydroxydiphenylmethane

Two grams of 3,3′,4-trimethoxydiphenylmethane are dissolved in 10 ml. of acetic acid and 10 ml. of 48% hydrobromic acid and the mixture refluxed for 5 hours. The reaction mixture is concentrated under reduced pressure to obtain a residual gum which is vacuum-distilled (B.P. 230° C. at 0.5 mm. of mercury). The distillate, a colorless gum, crystallizes. A 62% yield of product is obtained, m. 103.5–104° C.

EXAMPLE XXVI

A mixture of 3.5 g. of 3,3′,4-trihydroxydiphenylmethane in 50 ml. of acetone and 50 ml. of 10% aqueous sodium hydroxide is cooled to 0° C. Thirty ml. of 35% aqueous hydrogen peroxide solution is then added dropwise, the mixture turning pale pink after 5 to 10 minutes. An exothermic reaction occurs with considerable boiling and foaming. The mixture is allowed to stand for 1 hour and is then extracted with ethyl acetate, the extract being discarded. The aqueous solution is then acidified and extracted with ethyl acetate. Concentration of the ethanol acetate extract after drying gives the product as a gummy residue.

EXAMPLE XXVII 3-(3-hydroxybenzyl)adipic acid

The product of the preceding example (105 mg.) is dissolved in 13 ml. of ethanol containing 1 drop of concentrated hydrochloric acid and hydrogenated over platinum oxide at 1 atmosphere of hydrogen gas at room temperature. The hydrogen uptake is exactly 2 molecular equivalents. Filtration and concentration of reaction mixture gives the product.

EXAMPLE XXVIII 3-(3-methoxybenzyl)adipic acid dimethyl ester

The acid product of the preceding example is dissolved in aqueous sodium hydroxide (4 molar equivalents) and agitated with 3 molar equivalents of dimethyl sulfate at 40° C. for 6 hours. The resultant solution is then diluted with water and extracted with chloroform. The chloroform layer is separated, dried and concentrated under reduced pressure to yield an oil, B.P. 205 to 210° C. at 0.2 mm. mercury. This product is also obtained by treatment of the starting compound with diazomethane in diethyl ether.

In a similar manner the corresponding ethyl and propyl esters are prepared.

EXAMPLE XXIX 3-(3-methoxybenzyl)hexa-2,4-dienedioic acid

Five grams of 3,3′,4-trimethoxydiphenylmethane are dissolved in 50 ml. of acetic acid containing about 10 drops of water and ozonized air containing about 4% $O_3$ is then passed into the mixture for 1.5 hours (total of about 6 moles of ozone). The resultant yellow solution is poured into 1 liter of water and extracted with chloroform. The chloroform layer is separated, washed with aqueous sodium bicarbonate solution and concentrated under reduced pressure. The residue is dissolved in ethanol containing 2 g. of KOH and the mixture allowed to stand at room temperature for 2 days after which it is diluted with water and extracted with chloroform. After separation of the chloroform layer the aqueous alkaline solution is acidified with dilute hydrochloric acid and extracted with chloroform. Concentration of the chloroform extract gives the acid product.

The methyl, ethyl and propyl diesters of this acid are prepared by refluxing the acid for 3 days in ethylene dichloride containing the appropriate alcohol and sulfuric acid.

EXAMPLE XXX 3-(3-methoxybenzyl)adipic acid dimethyl ester

The ester of the preceding example is hydrogenated in ethanol over 10% palladium on carbon at 1 atmosphere of hydrogen gas at room temperature. The theoretical uptake of hydrogen gas (2 molar equivalents) is very rapid. The product is obtained by filtration and concentration of the hydrogenation mixture.

In similar fashion the corresponding free acid is obtained by hydrogenation of the free acid of the preceding example.

EXAMPLE XXXI

The following monoester compounds are prepared by reduction of corresponding benzoyl diesters according to the methods of Example I. The free adipic acid derivatives are prepared by the methods of Example II from the corresponding benzoyl adipic acids. The products are subsequently converted to the corresponding diesters by conventional procedures, e.g. Example II, Method B.

3-benzyladipic acid monoethyl ester
3-(2-ethyl-5-hydroxybenzyl)adipic acid monoethyl ester
3-(2-chloro-5-methoxybenzyl)adipic acid monomethyl ester
3-(2-dimethylamino-5-methoxybenzyl)adipic acid monomethyl ester
3-(2-amino-5-methoxybenzyl)adipic acid
3-(2-acetamido-5-methoxybenzyl)adipic acid
3-(3-hydroxy-benzyl)adipic acid monoethyl ester
3-(3-methyl-5-hydroxybenzyl)adipic acid monoethyl ester
3-(2,3-dimethyl-5-hydroxybenzyl)adipic acid monoethyl ester 3-(2-methyl-5-hydroxybenzyl)adipic acid monoethyl ester
3-(3-dimethylamino-5-hydroxybenzyl)adipic acid monoethyl ester
3-(2,3-dimethylbenzyl)adipic acid monomethyl ester
3-(3,5-dimethoxybenzyl)adipic acid monoethyl ester
3-(3-hydroxybenzyl)adipic acid monoethyl ester
3-(3-isopropyl-5-hydroxybenzyl)adipic acid monoethyl ester
3-(2,3-diethyl-5-hydroxybenzyl)adipic acid monoethyl ester
3-(5-benzyloxybenzyl)adipic acid monoethyl ester
3-(2-chloro-5-benzyloxybenzyl)adipic acid monoethyl ester
3-(3-propionyloxybenzyl)adipic acid monoethyl ester
3-(3-acetyloxybenzyl)adipic acid nonoethyl ester
3-(2-amino-5-benzyloxybenzyl)adipic acid monobenzyl ester
3-(2-propyl-5-propoxybenzyl)adipic acid monomethyl ester
3-(5-methoxy-2,3-ditrifluoromethylbenzyl)adipic acid monomethyl ester
3-(2-trifluoromethyl-3,5-dibutoxybenzyl)adipic acid monoethyl ester
3-(2-trifluoromethyl-3-ethylamino-5-methoxybenzyl)adipic acid monoethyl ester
3-(3-butyrylamidobenzyl)adipic acid monoethyl ester
3-(2-trifluoromethyl-5-hydroxybenzyl)adipic acid monobenzyl ester
3-(2-chloro-5-hydroxybenzyl)adipic acid monobenzyl ester
3-(2-chloro-3-methyl-5-hydroxybenzyl)adipic acid monoethyl ester
3-(2-chloro-3-isopropyl-5-hydroxybenzyl)adipic acid monoethyl ester
3-(2-chloro-3-amino-5-methoxybenzyl)adipic acid monoethyl ester
3-(2-chloro-3-methyl-5-methoxybenzyl)adipic acid monobenzyl ester
3-(2-chloro-3-ethyl-5-methoxybenzyl)adipic acid monobenzyl ester
3-(2-chloro-3-dimethylamino-5-hydroxybenzyl)adipic acid
3-(3,5-di-ethoxybenzyl)adipic acid monoethyl ester
3-(2-methylamino-5-propoxybenzyl(adipic acid monoethyl ester
3-(2-methyl-5-hydroxybenzyl)adipic acid
3-(2-amino-5-benzyloxybenzyl)adipic acid monomethyl ester
3-(3-acetamido-5-hydroxybenzyl)adipic acid monoethyl ester
3-(2-chloro-3,5-dihydroxybenzyl)adipic acid monoethyl ester
3-(3-trifluoromethyl-5-hydroxybenzyl)adipic acid monoethyl ester
3-(3-hydroxybenzyl)adipic acid monoethyl ester The corresponding diesters are prepared by esterification of these compounds with the selected alcohol by the usual method.

Those compounds having a benzyloxy substituent are reduced by the procedures of Methods A or C of Example II. Of course, the procedure of Example II, Method A, results in hydrolysis of the ester groups and necessitates re-esterification.

EXAMPLE XXXII

Alpha-hydroxybenzyladipic acid compounds corresponding to the products of Example XXXI are prepared by hydrogenation of corresponding benzoyladipic acid compounds according to the method of Example XIV.

The α-hydroxybenzyl adipate diesters are further converted to the corresponding α-dimethylamino and α-monomethylamino derivatives via the tosylates by the procedure described in Example XIV. For this procedure hydroxy substituents other than the α-hydroxy group are avoided by employing the corresponding methyl ethers; likewise, amino substituents are employed in acetlyated form.

The α-amino benzyl adipates obtained in this manner are further converted to the corresponding 1-amino-4-tetralones of structure III by the procedure of Example VI.

EXAMPLE XXXIII

The procedure of Example XXI is repeated to produce the following compounds from corresponding benzoyladipic acid compounds using lower alkylmagnesium halides.

diethyl 3-(α-hydroxy-α-phenethyl)adipate
diethyl 3-[α-hydroxy-α-(2-ethyl-5-hydroxyphenyl)ethyl]adipate
dimethyl 3-[α-hydroxy-α-(2-dimethylamino-5-methoxyphenyl)ethyl]adipate
dimethyl 3-[α-hydroxy-α-(2-amino-5-methoxyphenyl)ethyl]adipate
dimethyl 3-[α-hydroxy-α-(2-acetamido-5-methoxyphenyl)ethyl]adipate
diethyl 3-[α-hydroxy-α-(3-hydroxyphenyl)ethyl]adipate
diethyl 3-[α-hydroxy-α-(2-chloro-5-methoxyphenyl)ethyl]adipate
diethyl 3-[α-hydroxy-α-(3-methyl-5-hydroxyphenyl)ethyl]adipate
diethyl 3-[α-hydroxy-α-(3,5-dimethoxyphenyl)ethyl]adipate
diethyl 3-[α-hydroxy-α-(3-methoxyphenyl)propyl]adipate
diethyl 3-[α-hydroxy-α-(2-chloro-5-methoxyphenyl)propyl]adipate
diethyl 3-[α-hydroxy-α-(2-chloro-5-methoxyphenyl)butyl]adipate
diethyl 3-[α-hydroxy-α-(3-methoxyphenyl)ethyl]adipate In the case of the precursors to the compounds listed above which possess an active hydrogen, 2.5 moles of Grignard reagent are employed.

The compounds containing an amino-substituent are isolated from the reaction mixture by the substitution of saturated aqueous ammonium chloride for 6 N HCl.

EXAMPLE XXXIV

The α-hydroxy group of Example XXXIII compounds is hydrogenolyzed according to the method of Example XXII to afford the following compounds:

diethyl 3-(α-phenethyl)adipate
diethyl 3-[α-(2-ethyl-5-hydroxyphenyl)ethyl]adipate
dimethyl 3-[α-(2-chloro-5-methoxyphenyl)ethyl]adipate
dimethyl 3-[α-(2-dimethylamino-5-methoxyphenyl)ethyl]adipate
dimethyl 3-[α-(2-amino-5-methoxyphenyl)ethyl]adipate
dimethyl 3-[α-(2-acetamido-5-methoxyphenyl)propyl]adipate
diethyl 3-[α-(3-hydroxyphenyl)ethyl]adipate
diethyl 3-[α-(3-methyl-5-hydroxyphenyl)ethyl]adipate
diethyl 3-[α-(3,5-dimethoxyphenyl)ethyl]adipate
diethyl 3-[α-(3-methoxyphenyl)propyl]adipate
diethyl 3-[α-2-chloro-5-methoxyphenyl)propyl]adipate
diethyl 3-[α-2-chloro-5-methoxyphenyl)butyl]adipate
diethyl 3-[α-(3-methoxyphenyl)ethyl]adipate

EXAMPLE XXXV

The following compounds are prepared according to the methods of Example VI by ring closure of corresponding compounds.

2-(2-carbethoxyethyl)-4-tetralone
2-(2-cyanoethyl)-5-methoxy-8-ethyl-4-tetralone 2-(2-carboxyethyl)-5-methoxy-8-dimethylamino-4-tetralone
2-(2-carbobenzyloxyethyl)-5-methoxy-8-amino-4-tetralone
2-(2-carbopropoxyethyl)-5-methoxy-8-acetamido-4-tetralone
2-(2-carbobenzyloxyethyl)-5-hydroxy-8-chloro-4-tetralone
2-(2-carbethoxyethyl)-5-hydroxy-7-methyl-8-chloro-4-tetralone
2-(2-carboxyethyl)-5-hydroxy-7-isopropyl-8-chloro-4-tetralone
2-(2-carboxyethyl)-5-hydroxy-7,8-diethyl-4-tetralone
2-(2-carbethoxyethyl)-5-propoxy-8-methylamino)-4-tetralone
2-(2-carbobenzyloxyethyl)-5-benzyloxy-8-chloro-4-tetralone
2-(2-carboxypropyl)-5-hydroxy-8-chloro-4-tetralone
2-(2-carboxybutyl)-5-hydroxy-8-chloro-4-tetralone
2-(2-carbobenzyloxyethyl)-5-methoxy-7-amino-8-chloro-4-tetralone
2-(2-carbobenzyloxyethyl)-5-methoxy-7-ethyl-8-chloro-4-tetralone
2-(2-carbobenzyloxyethyl)-5-methoxy-7-methyl-8-chloro-4-tetralone
2-(2-carboxyethyl)-5-hydroxy-7-dimethylamino-8-chloro-4-tetralone
2-(2-carboxyethyl)-7,8-dimethyl-4-tetralone
2-(2-carboxyethyl)-5-hydroxy-8-chloro-4-tetralone
1-methyl-2-(2-carboxyethyl)-5-methoxy-8-chloro-4-tetralone
1-ethyl-2-(2-carboxyethyl)-5-methoxy-8-chloro-4-tetralone
1-propyl-2-(2-carboxyethyl)-5-methoxy-8-chloro-4-tetralone
1-methyl-2-(2-carboxypropyl)-5-methoxy-8-chloro-4-tetralone
2-(2-carboxyethyl)-5-hydroxy-8-methyl-4-tetralone
2-(2-carboxyethyl)-5-hydroxy-7,8-dimethyl-4-tetralone
1-propyl-2-(2-carboxyethyl)-5-hydroxy-8-chloro-4-tetralone
2-(2-cyanoethyl)-5-methoxy-8-methyl-4-tetralone
2-(2-carboxyethyl)-5-methoxy-7-methyl-8-chloro-4-tetralone
2-(2-carbethoxyethyl)-5,7-dimethoxy-4-tetralone
2-(2-carbobenzyloxyethyl)-5-hydroxy-7-isopropyl-4-tetralone
2-(2-carbomethoxyethyl)-5-benzyloxy-8-amino-4-tetralone
2-(2-carbomethoxyethyl)-5-propoxy-8-propyl-4-tetralone
2-(2-carbomethoxyethyl)-5-hydroxy-4-tetralone
1-methyl-2-(2-carbomethoxyethyl)-5-methoxy-4-tetralone
1-ethyl-2-(2-carbomethoxyethyl)-5-methoxy-4-tetralone
1-propyl-2-(2-carbomethoxyethyl)-5-methoxy-4-tetralone
2-(2-carbobenzyloxyethyl)-5-hydroxy-8-methyl-4-tetralone
2-(2-carbobenzyloxyethyl)-5-methoxy-4-tetralone
1-methyl-2-(2-carbobenzyloxyethyl)-5-hydroxy-4-tetralone
1-propyl-2-(2-carbobenzyloxyethyl)-5-hydroxy-4-tetralone
1-ethyl-2-(2-carbobenzyloxyethyl)-5-methoxy-4-tetralone
1-ethoxyethyl-2-(2-carbethoxyethyl)-7-propionyloxy-8-methyl-4-tetralone
1-ethyl-2-(2-carbomethoxyethyl)-5-ethoxy-7-acetoxy-8-chloro-4-tetralone
2-(2-carbomethoxyethyl)-7,8-ditrifluoromethyl-5-methoxy-4-tetralone
2-(2-carbethoxyethyl)-5,7-dibutoxy-8-trifluoromethyl-4-tetralone
2-(2-carbethoxyethyl)-5-methoxy-7-ethylamino-8-trifluoromethyl-4-tetralone
2-(2-carbomethoxyethyl)-7-butyrylamido-4-tetralone
2-(2-carbobenzyloxyethyl)-5-hydroxy-8-trifluoromethyl-4-tetralone
2-(2-carbethoxyethyl)-5,7-dihydroxy-8-chloro-4-tetralone
2-(2-carbethoxyethyl)-5-hydroxy-7-acetamido-4-tetralone
2-(2-carbethoxyethyl)-5-hydroxy-7-trifluoromethyl-4-tetralone
1-methyl-2-(2-carbethoxyethyl)-7-hydroxy-4-tetralone
2-(2-carbobenzyloxyethyl)-5-benzyloxy-4-tetralone
2-(2-carbethoxyethyl)-5-hydroxy-4-tetralone
2-(2-carbobenzyloxyethyl)-5-methoxy-7-amino-4-tetralone
2-(2-carbobenzyloxyethyl)-5-methoxy-7-propyl-4-tetralone
2-(2-carbobenzyloxyethyl)-5-methoxy-7-methyl-4-tetralone
2-(2-carbobenzyloxyethyl)-5-hydroxy-7-dimethylamino-4-tetralone
1-methyl-2-(2-carbobenzyloxyethyl)-5-methoxy-4-tetralone
1-ethyl-2-(2-carbobenzyloxyethyl)-5-methoxy-4-tetralone
1-propyl-2-(2-carbobenzyloxyethyl)-5-methoxy-4-tetralone
2-(2-carbobenzyloxyethyl)-8-trifluoromethyl-4-tetralone
2-(2-carbobenzyloxyethyl)-5-benzyloxy-8-chloro-4-tetralone
2-(2-carbobenzyloxyethyl)-5-methoxy-7-ethyl-4-tetralone
2-(2-carbobutoxyethyl)-7-methoxy-8-chloro-4-tetralone
2-(2-carbomethoxyethyl)-5-methoxy-7-acetamido-8-chloro-4-tetralone
1-methyl-2-(2-carbethoxyethyl)-8-trifluoromethyl-4-tetralone
1-methyl-2-(2-carbethoxyethyl)-5-methoxy-8-trifluoromethyl-4-tetralone
1-methyl-2-(2-carbobenzyloxyethyl)-5-ethoxy-4-tetralone
2-(2-carbomethoxyethyl)-5-methoxy-4-tetralone The aromatic chloro compounds can be subsequently hydrogenolyzed to the corresponding deschloro compounds by the procedure of Example XV.

Those compounds of the above list which contain no amino or hydroxy groups are also prepared by the methods of Example V.

EXAMPLE XXXVI

Example XXXV products and other analogous products prepared as described herein, as lower alkyl or benzyl esters or nitrile, are condensed with diethyl oxalate according to the method of Example IX to obtain 3,4,10-trioxoanthracene derivatives. Those compounds having an active hydrogen require the use of an additional mole of sodium hydride.

The reaction mixtures are worked up as follows: After 10 minutes, or when active bubbling ceases if this occurs sooner, the reaction mixture is chilled to 15° C. and carefully acidified with glacial acetic acid. The dimethyl formamide and excess acetic acid are then removed in vacuo and the residue partitioned between water and chloroform. The aqueous phase is re-extracted with chloroform, the combined chloroform extracts treated with activated carbon, dried, and filtered. The chloroform solution is chromatographed on silicic acid or acid-washed Florisil. The highly fluorescent product fraction is collected and evaporated to obtain the desired substance.

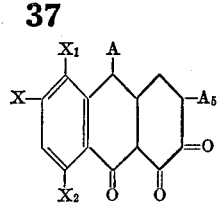

| X | X₁ | X₂ | A | A₅ |
|---|---|---|---|---|
| H | H | H | H | COOEt |
| H | 8-Et | 5-OMe | H | CN |
| H | 8-NMe₂ | 5-OMe | H | COOEt |
| H | 8-NH₂ | 5-OBz | H | COOMe |
| H | 8-NHCOMe | 5-OMe | H | COOPr |
| H | H | 5-OH | H | COOBz |
| 7-Me | H | 5-OH | H | COOEt |
| 7-i-Pr | H | 5-OH | H | COOBz |
| 7-Et | 8-Et | 5-OH | H | COOMe |
| H | H | 5-OCH₂C₆H₅ | H | COOBz |
| H | H | 5-OH | H | COOEt |
| 7-NH₂ | H | 5-OMe | H | COOBz |
| 7-Pr | H | 5-OMe | H | COOBz |
| 7-Me | H | 5-OMe | H | COOBz |
| 7-NMe₂ | H | 5-OH | H | COOBz |
| 7-Me | 8-Me | H | H | COOMe |
| H | 8-NH₂ | 5-OCH₂C₆H₅ | H | COOMe |
| H | 8-Pr | 5-OPr | H | COOMe |
| H | H | 5-OH | H | COOMe |
| H | H | 5-OMe | Me | COOMe |
| H | H | 5-OMe | Et | COOMe |
| H | H | 5-OMe | Pr | COOMe |
| H | 8-Me | 5-OMe | H | CN |
| H | 8-Me | 5-OH | H | COOBz |
| 7-Me | 8-Me | 5-OH | H | COOBz |
| H | H | 5-OH | Me | COOBz |
| H | H | 5-OH | i-Pr | COOBz |
| H | H | 5-OMe | Me | COOBz |
| H | H | 5-OMe | H | COOBz |
| H | H | 5-OMe | Et | COOBz |
| 7-CF₃ | 8-CF₃ | 5-OMe | H | COOMe |
| 7-EtCO₂ | 8-Me | H | EtOCH(Me) | COOEt |
| 7-OBu | 8-CF₃ | 5-OBu | H | COOEt |
| 7-NHEt | 8-CF₃ | 5-OMe | H | COOEt |
| 7-NHCOC₃H₇ | H | H | H | COOMe |
| 7-MeCO₂ | 8-Cl | 5-OEt | Et | COOMe |
| H | 8-CF₃ | H | H | COOBz |
| H | 8-Cl | 5-OH | H | COOBz |
| 7-Me | 8-Cl | 5-OH | H | COOEt |
| H | 8-NHMe | 5-OPr | H | COOEt |
| H | 8-Cl | 5-OBz | H | COOBz |
| 7-Me | 8-Cl | 5-OMe | H | COOBz |
| 7-NH₂ | 8-Cl | 5-OMe | H | COOBz |
| 7-Et | 8-Cl | 5-OMe | H | COOBz |
| H | 8-Cl | 5-OMe | Me | COOMe |
| H | 8-Cl | 5-OMe | Et | COOMe |
| H | 8-Cl | 5-OMe | Pr | COOMe |
| 7-OMe | H | 5-OMe | H | COOEt |
| H | 8-Cl | 5-OMe | MeOCH₂ | COOMe |
| H | 8-Cl | 5-OH | MeOCH(Me) | COOMe |
| 7-Me | 8-Cl | 5-OH | HOCH(C₅H₁₁) | COOMe |
| H | 8-CF₃ | H | Me | COOEt |
| H | 8-CF₃ | 5-OMe | Me | COOEt |
| H | H | 5-OMe | MeOCH₂ | COOEt |
| 7-Et | H | 5-OMe | H | COOBz |
| 7-i-Pr | 8-Cl | 5-OH | H | COOH |
| H | H | 5-OEt | Me | COOBz |
| 7-NME₂ | 8-Cl | 5-OMe | H | COOBu |
| 7-OMe | 8-Cl | H | H | COOBu |
| 7-NHCOCH₃ | 8-Cl | 5-OMe | H | COOMe |
| 7-NHCOCH₃ | H | 5-OH | H | COOEt |
| 7-OH | 8-Cl | 5-OH | H | COOEt |
| H | 8-CF₃ | 5-OH | H | COOBz |
| 7-CF₃ | H | 5-OH | H | COOEt |
| 7-OBz | H | H | Me | COOEt |

In the above table, Me=CH₃; Et=C₂H₅; Pr=C₃H₇; Bz=benzyl. Ether substituents are converted to hydroxy groups by HBr cleavage; and acylamido groups to amino groups by hydrolysis.

EXAMPLE XXXVII 5-methoxy-8-chloro-3,4,10-trioxo-1,2,3,4,4a,9,9a,10-octahydroanthracene

METHOD A

A mixture of 10 g. of the ester product of Example XII, 250 ml. of glacial acetic acid, 125 ml. conc. HCl and 25 ml. of water is heated at 95° C. for 1 hour. During the first 45 minutes considerable effervescence occurs and the suspended matter gradually dissolves to give a deep red-brown solution. The reaction mixture is then poured into 2 liters of cold water and extracted with chloroform. The combined extracts are washed with water, decolorized with activated carbon, dried and evaporated to an orange-crystalline solid (6.9 g.) which melts at 171–172.8° C. After recrystallization from acetone-hexane, the product melts at 172–173° C.

METHOD B

The 2-carbobenzyloxy compound (5 g.) corresponding to that of Example XII is treated with hydrogen gas at room temperature in acetic acid and in the presence of 0.5 g. of 5% palladium on carbon at 50 p.s.i.g. until one molar equivalent of gas is taken up. The product is obtained by filtration and concentration of the reaction mixture after warming to 60° C. for 20 minutes to ensure complete evolution of carbon dioxide.

METHOD C

The product of Example XII (3 g.) is refluxed for 3 hours in 10 ml. of acetic acid, 10 ml. of concentrated sulfuric acid and 1 ml. of water after which chloroform is added to the mixture which is then poured into excess water. The product is obtained by separation of the chloroform layer, washing, drying over sodium sulfate and concentration. A solid residue is obtained and recrystallized from methanol.

If desired, further purification is achieved by chromatography on silicic acid with chloroform elution. The product is contained in the less polar effluent fraction.

EXAMPLE XXXVIII

The products of Example XXXVI are decarboxylated, (benzyl esters by hydrogenolysis according to Method B, Example XXXVII and lower alkyl esters and nitriles by the procedure of Method C, Example XXXVII) to produce the following compounds (Nitriles require a 24-hour reflux period):

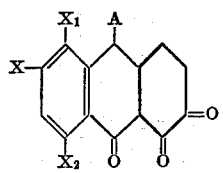

| X | $X_1$ | $X_2$ | A |
|---|---|---|---|
| H | H | H | H |
| H | 8-Et | 5-OMe | H |
| H | 8-NMe$_2$ | 5-OMe | H |
| H | 8-NH$_2$ | 5-OMe | H |
| H | 8-NHCOMe | 5-OMe | H |
| H | H | 5-OH | H |
| 7-Me | H | 5-OH | H |
| 7-i-Pr | H | 5-OH | H |
| 7-Et | 8-Et | 5-OH | H |
| H | H | 5-OCH$_2$C$_6$H$_5$ | H |
| H | H | 5-OH | H |
| 7-NH$_2$ | H | 5-OMe | H |
| 7-Pr | H | 5-OMe | H |
| 7-Me | H | 5-OMe | H |
| 7-NMe$_2$ | H | 5-OH | H |
| 7-Me | 8-Me | H | H |
| H | 8-NH$_2$ | 5-OCH$_2$C$_6$H$_5$ | H |
| H | 8-Pr | 5-OPr | H |
| H | H | 5-OMe | H |
| H | H | 5-OMe | Me |
| H | H | 5-OMe | Et |
| H | H | 5-OMe | Pr |
| H | 8-Me | 5-OH | H |
| 7-Me | 8-Me | 5-OH | H |
| H | H | 5-OH | Me |
| H | H | 5-OH | i-Pr |
| H | H | 5-OMe | H |
| 7-CF$_3$ | 8-CF$_3$ | 5-OMe | H |
| 7-EtCO$_2$ | 8-Me | H | EtOCH(Me) |
| 7-OBu | 8-CF$_3$ | 5-OBu | H |
| 7-NHEt | 8-CF$_3$ | 5-OMe | H |
| 7-NHCOC$_3$H$_7$ | H | H | H |
| 7-MeCO$_2$ | 8-Cl | 5-OEt | Et |
| H | 8-CF$_3$ | H | H |
| H | 8-Cl | 5-OH | H |
| 7-Me | 8-Cl | 5-OH | H |
| H | 8-NHMe | 5-OPr | H |
| H | 8-Cl | 5-OBz | H |
| 7-Me | 8-Cl | 5-OMe | H |
| 7-NH$_2$ | 8-Cl | 5-OMe | H |
| 7-Et | 8-Cl | 5-OMe | H |
| H | 8-Cl | 5-OMe | Me |
| H | 8-Cl | 5-OMe | Et |
| H | 8-Cl | 5-OMe | Pr |
| 7-OMe | H | 5-OMe | H |
| H | 8-Cl | 5-OMe | MeOCH$_2$ |
| H | 8-Cl | 5-OH | MeOCH(Me) |
| 7-Me | 8-Cl | 5-OH | HOCH(C$_5$H$_{11}$) |
| H | 8-CF$_3$ | H | Me |
| H | 8-CF$_3$ | 5-OMe | Me |
| H | H | 5-OMe | MeOCH$_2$ |
| 7-Et | H | 5-OMe | H |
| H | H | 5-OEt | Me |
| 7-NMe$_2$ | 8-Cl | 5-OMe | H |
| 7-OMe | 8-Cl | H | H |
| 7-HNCOCH$_3$ | 8-Cl | 5-OMe | H |
| 7-NHCOCH$_3$ | H | 5-OH | H |
| 7-OH | 8-Cl | 5-OH | H |
| 7-CF$_3$ | H | 5-OH | H |
| 7-OBz | H | H | Me |
| 7-i-Pr | 8-Cl | 5-OH | H |
| H | 8-CF$_3$ | 5-OH | H |
| H | H | 5-OMe | Me |
| H | H | 5-OMe | H |

Those compounds containing basic (amino) groups are isolated by acidification with acetic acid in place of a mineral acid. Amides and esters are reacylated.

EXAMPLE XXXIX

Compounds of structure IX are oxidized using ozone according to the method of Example XXIX to obtain acids of the formula:

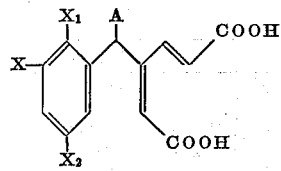

| X | $X_1$ | $X_2$ | A |
|---|---|---|---|
| H | H | H | H |
| H | 2-Et | 5-OMe | H |
| H | 2-NH$_2$ | 5-OMe | H |
| H | 2-NHCOMe | 5-OMe | H |
| H | 2-OMe | H | H |
| H | 2-Me | 5-OH | H |
| 5-i-Pr | H | 3-OH | H |
| 3-Et | 2-Et | 5-OH | H |
| H | H | 3-OCH$_2$C$_6$H$_5$ | H |
| H | H | 3-EtCO$_2$ | H |
| H | H | 3-MeCO$_2$ | H |
| H | H | 3-OH | H |
| 5-NHCOMe | H | 3-OMe | H |
| 5-Et | H | 3-OMe | H |
| 5-Me | H | 3-OMe | H |
| 5-NMe$_2$ | H | 3-OH | H |
| 3-Me | 2-Me | H | H |
| H | 2-Pr | 5-OPr | H |
| H | H | 3-OMe | Et |
| H | H | 3-OMe | Pr |
| H | H | 3-OMe | Me |
| H | 2-Me | 5-OH | H |
| 3-Me | 2-Me | 5-OH | H |
| H | H | 3-OH | Me |
| 5-Me | H | 3-OH | Me |
| H | H | 3-OH | i-Pr |
| 5-CF$_3$ | H | 3-OMe | H |
| 3-Me | 2-Me | 5-OMe | H |
| 5-MeCO$_2$ | H | 3-OMe | H |
| 5-NMe$_2$ | H | 3-OMe | H |
| H | H | 3-OPr | Me |
| H | 2-OMe | 5-OMe | H |
| 5-OMe | H | 3-OMe | H |
| H | 2-NMe$_2$ | 5-OMe | H |
| H | 2-NEt$_2$ | 5-OMe | H |
| 5-Me | H | 3-OEt | H |
| H | H | 3-OEt | H |
| H | 2-OMe | 5-OCH$_2$C$_6$H$_5$ | H |
| H | 2-NHMe | 5-OMe | H |
| 3-CF$_3$ | 2-CF$_3$ | 5-OMe | H |
| 3-EtCOO | 2-Me | H | H |
| 3-OBu | 2-CF$_3$ | 5-OBu | H |
| 3-NHEt | 2-CF$_3$ | 5-OMe | H |
| 3-NHCOMe | H | H | H |
| 3-MeCOO | 2-Cl | 5-OEt | H |
| H | 2-CF$_3$ | H | H |
| 3-CF$_3$ | 2-CF$_3$ | 5-OMe | H |
| 3PrCO$_2$ | 2-Me | H | EtOCH(Me) |
| 3-OBu | 2-CF$_3$ | 5-OBu | H |
| 3-NHEt | 2-CF$_3$ | 5-OMe | H |
| 3-NHCOC$_3$H$_7$ | H | H | H |
| 3-MeCO$_2$ | 2-Cl | 5-OEt | Et |
| H | 2-CF$_3$ | 5-OH | H |
| 3-NHCOCH$_3$ | H | 5-OH | H |
| 3-OH | 2-Cl | 5-OH | H |
| 3-CF$_3$ | H | 5-OH | H |
| 3-OH | H | H | CH$_3$ |

In the above table, Me=CH$_3$; Et=C$_2$H$_5$; Pr=C$_3$H$_7$; Ac=acetyl.

These acids are converted to corresponding lower alkyl or benzyl esters by conventional procedures.

In the case of both oxidation procedures the acidification is effected by means of acetic acid and the product is extracted into n-butanol and recovered therefrom by evaporation.

EXAMPLE XL

Methyl, ethyl and propyl esters of (3-methoxybenzoyl) acetic acid

To a mixture of 16.6 g. (0.1 mole) of methyl 3-methoxybenzoate and 10 g. (0.2 mole) of sodium hydride (48% dispersion in oil) in 300 ml. of dry dimethylformamide is added a solution of 8.0 g. of methyl acetate in 150 ml. of dry dimethylformamide dropwise with stirring at room temperature during a period of 4 hours. The mixture is then stirred for an additional two hours, after which it is acidified slowly with glacial acetic acid. The acidified mixture is poured into excess water which is next extracted with chloroform. The chloroform extract is dried over anhydrous sodium sulfate and then evaporated under reduced pressure to an oil. The residual oil is washed with hexane and distilled in vacuo to obtain 10.57 g. of the methyl ester product, B.P. 128–131° C./0.5 mm.), $n_D^{25}=1.5428$. Infrared analysis shows characteristic peaks at 5.73 and 5.92$\mu$.

Elemental analysis gives the following results:

Calcd. for $C_{11}H_{12}O_4$ (percent): C, 63.45; H, 5.81. Found (percent): C, 63.28; H, 5.89.

The ethyl and propyl esters are prepared in the same manner (but heating at 50° C. for 15 minutes to insure complete reaction) using ethyl or propyl acetate in lieu of methyl acetate.

EXAMPLE XLI t-Butyl ester of (3-methoxybenzoyl)acetic acid

To a stirred suspension of sodamide in liquid ammonia (prepared from 11.5 g. of sodium in 400 ml. of liquid ammonia) is added 54 g. of t-butyl acetate in 50 ml. of dry ether followed by a solution of 41.5 g. of methyl-3-methoxybenzoate in 50 ml. of dry ether. The ammonia is then replaced by 100 ml. of ether and the mixture refluxed for 2 hours. After standing at room temperature for 12 hours, the mixture is poured into 400 ml. of ice water containing 28.8 ml. of acetic acid. The mixture is then extracted with ether, the etherate washed with 2% sodium bicarbonate solution and then dried over anhydrous sodium sulfate. After removal of the ether at reduced pressure, the residual oil is distilled in vacuo to obtain 33.5 g. of product, B.P. 126–128° (0.3 mm.). Infrared absorption of the product shows characteristic maxima at 5.75 and 5.90.

EXAMPLE XLII

Ethyl 3-carbomethoxy-3-(3-methoxybenzoyl)propionate

METHOD A

To a suspension of 26 g. of sodium hydride in 250 ml. of dry dimethylformamide is added dropwise with stirring at room temperature a solution of 108 g. of the Example XL methyl ester in 250 ml. of dry dimethylformamide over a period of 45 minutes. The mixture is stirred for an additional 30 minutes and there is then added dropwise with stirring a solution of 104 g. of ethyl bromoacetate in 250 ml. of dry dimethylformamide. The mixture is allowed to stand for 12 hours and is then evaporated under reduced pressure. The residual oil is dissolved in chloroform and the solid sodium bromide filtered. The chloroform solution, after water-washing and drying over sodium sulfate, is evaporated and the residual oil distilled in vacuo to obtain 112.5 g. of product, B.P. 182–188° C. (1.4–1.5 mm.). Infrared analysis of the product shows characteristic peaks at 5.75 and 5.91 microns.

Elemental analysis gives the following results:

Calcd. for $C_{15}H_{18}O_6$ (percent): C, 61.21; H, 6.17. Found (percent): C, 61.39; H, 6.23.

Ethyl and propyl 3-carbethoxy-3-(3-methoxybenzoyl)-propionate are prepared in similar fashion.

METHOD B

To a mixture of 29 g. of methyl 3-methoxybenzoate and 15 g. of sodium hydride in 75 ml. of dry dimethylformamide is added a solution of 19 g. of dimethyl succinate in 175 ml. of the same solvent dropwise with stirring at room temperature during 12–14 hours. The mixture is carefully acidified with 25 ml. of acetic acid and stirred at room temperature for an additional 3 hours. The filtered reaction mixture is next evaporated to a residue consisting of an oil and solid which is treated with ether to dissolve the oil. The ether solution is filtered and evaporated under reduced pressure to yield 18.29 g. of dimethyl α-(methoxybenzoyl)succinate, B.P. 162.9° C. (0.4–0.5 mm.). Infrared analysis of the product shows characteristic peaks at 5.75 and 5.90 microns.

Elemental analysis gives the following results:

Calcd. for $C_{14}H_{16}O_6$ (percent): C, 59.99; H, 5.75. Found (percent): C, 59.91; H, 5.79.

In similar manner, the corresponding diethyl, dipropyl and di-t-butyl esters are prepared.

EXAMPLE XLIII

Ethyl 3-carbo-t-butoxy-3-(3-methoxybenzoyl)propionate

A mixture of 15.8 g. of the product of Example XLI 10.5 g. of ethyl bromoacetate and 3.02 g. of sodium hydride in 130 ml. of dimethylformamide is treated as in Method A of Example XLII to obtain this product as a yellow oil. Infrared analysis of the product shows characteristic peaks at 5.75 and 5.90$\mu$. The product is used without distillation in the procedure of Example XLVI to produce ethyl 3-[carbo-t-butoxy-3-(2-cyanoethyl)-3-(3-methoxybenzoyl)]-propionate.

EXAMPLE XLIV

Diethyl 3-carbethoxy-3-(3-methoxybenzoyl)adipate

To a mixture of 102 g. of diethyl α-(3-methoxybenzoyl)succinate in 250 ml. dioxane and 10 ml. of a 35% solution of benzyltrimethylammonium hydroxide in methanol maintained at 50° C. is added 167 g. of ethyl acrylate in one portion with stirring. Heating and stirring are continued for 30 minutes, after which 10 ml. of glacial acetic acid is added. The mixture is evaporated under reduced pressure to a dark oil which is distilled in vacuo to yield 80.5 g. of the diethyl ester product, B.P. 197° C. (0.1–0.2 mm.), $n_D^{25}=1.5043$. Infrared analysis shows characteristic peaks at 5.76 and 5.92$\mu$.

Elemental analysis gives the following results:

Calcd. for $C_{21}H_{28}O_8$ (percent): C, 61.75; H, 6.91. Found (percent): C, 61.64; H, 6.90.

Dimethyl and dipropyl β-carbomethoxy-3-(3-methoxybenzoyl)adipate are prepared in similar fashion.

EXAMPLE XLV

Diethyl 3-carbo-t-butoxy-3-(3-methoxybenzoyl)adipate

The product of Example XLIII a yellow oil, is dissolved in 80 ml. of t-butanol containing 0.75 g. of potassium t-butoxide and 19 g. of ethyl acrylate. The mixture is refluxed for 1.3 hours and then concentrated under reduced pressure to obtain the adipate ester product, a yellow viscous oil, which is used without distillation in the procedure of Method B of Example XLVII.

EXAMPLE XLVI

α-(3-methoxybenzoyl)-α-(2-cyanoethyl)succinic acid diethyl ester

This compound is prepared according to the procedure of Example XLIV using acrylonitrile or β-bromopropionitrile in lieu of ethyl acrcylate. The product is vacuum distilled at 212–218° C. (0.45 mm. Hg). This product is hydrolyzed and decarboxylated to 3-(3-methoxybenzoyl) adipic acid by refluxing in aqueous acetic acid containing sulfuric acid by the procedure of Method A of Example XLVII. Corresponding esters are prepared in the usual manner.

EXAMPLE XLVII

Diethyl 3-(3-methoxybenzoyl)adipate

METHOD A

A mixture of 25 g. of diethyl-3-carbethoxy-3-(3-methoxybenzoyl)adipate in 30 ml. of acetic acid, 10 ml. of concentrated sulfuric acid and 10 ml. of water is refluxed for 36 hours. The mixture is then poured into excess water and extracted with chloroform, the extract dried and evaporated under reduced pressure to an oil. The oil is dissolved in a mixture of 50 ml. of ethanol, 1 liter of ethylene dichloride and 6 ml. of concentrated sulfuric acid and refluxed for 12 hours. The mixture is then poured into water. The ethylene chloride layer is separated, dried and evaporated in vacuo to an oil which is distilled to obtain 5.5 g. of product, B.P. 169–172° C. (0.05 mm.), $n_D^{25}=1.5092$.

Elemental analysis gives the following results:

Calcd. for $C_{18}H_{24}O_6$ (percent): C, 64.27; H, 7.19. Found (percent): C, 64.09; H, 7.19.

In similar fashion, the dimethyl and dipropyl esters are prepared.

METHOD B

The product of Example XLV a yellow viscous oil is refluxed in 120 ml. of dry xylene containing 3.0 g. of p-toluenesulfonic acid and cooled and extracted with water. The xylene solution, after drying, is concentrated under reduced pressure and the residual oil vacuum distilled to obtain 6.8 g. of product.

There is also obtained 5.86 g. of the enol lactone:

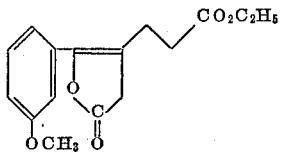

a red oil, which on infrared absorption analysis showed a maximum at 5.58μ.

As is recognized by those in the art, the product of this example is a racemic compound, DL-3-(3-methoxybenzoyl)adipic acid diethyl ester which, as the free acid, lends itself to resolution into its optical active forms by salt formation with optically active bases such as brucine, cinchonine, cinchonidine, morphine and the like to form diastereoisomers. Such procedures are well known to these skilled in the art. Of course, the optically active forms (antipodes) may be converted one to the other, as desired, by racemization and resolution. The present compound, in one of its optically active forms, is racemized by treating it with a strong base in solvent, e.g. sodium hydride, hydroxide or alkoxide in a lower alkanol. After racemization, the desired optical form may be resolved and the procedure repeated to produce more of the desired optical form from its antipode.

EXAMPLE XLVIII

Employing the procedure of Example XL the following compounds are prepared from corresponding starting compounds. Those compounds having an active hydrogen require the use of an additional mole of sodium hydride.

methylbenzoylacetate
ethyl (2-ethyl-5-hydroxybenzoyl)acetate
methyl 2-(5-methoxybenzoyl)propionate
methyl 2-(5-methoxybenzoyl)butanoate
methyl 2-(5-methoxybenzyl)pentanoate
methyl (2-chloro-5-methoxybenzoyl)acetate
methyl (2-dimethylamino-5-methoxybenzoyl)acetate
methyl (2-amino-5-methoxybenzoyl)acetate
methyl (2-acetamido-5-methoxybenzoyl)acetate
ethyl (5-hydroxybenzoyl)acetate
ethyl (2-methoxybenzoyl)acetate
ethyl (3-hydroxybenzoyl)acetate
ethyl (2-methyl-5-hydroxybenzoyl)acetate
ethyl (2,3-dimethyl-5-hydroxybenzoyl)acetate
ethyl (3-isopropyl-5-hydroxybenzoyl)acetate
ethyl (2,3-diethyl-5-hydroxybenzoyl)acetate
ethyl (5-benzyloxybenozyl)acetate
ethyl (3-methyl-5-hydroxybenzoyl)acetate
ethyl (3-dimethylamino-5-hydroxybenzoyl)acetate
methyl (2,3-dimethylbenzoyl)acetate
ethyl (3,5-dimethoxybenzoyl)acetate
ethyl (2,3-diethyl-5-ethoxybenzoyl)acetate
ethyl (3-isopropyl-5-ethoxybenzoyl)acetate
methyl (2-methylamino-5-methoxybenzoyl)acetate
methyl (3-ethyl-5-methoxybenzoyl)acetate
ethyl (2-methoxy-5-benzyloxybenzoyl)acetate
ethyl (2-propyl-5-propoxybenzoyl)acetate
ethyl (3-trifluoromethyl-5-methoxybenzoyl)acetate
ethyl (3-acetoxy-5-methoxybenzoyl)acetate
propyl (3-propoxybenzoyl)acetate
benzyl (2-chloro-5-methoxybenzoyl)acetate
ethyl (3-benzyloxybenzoyl)acetate
ethyl (3-amino-5-benzyloxybenzoyl)acetate
ethyl (3-propyl-5-methoxybenzoyl)acetate
ethyl (2-isopropyl-3-ethyl-5-methoxybenzoyl)acetate
benzoyl 2-(2-methoxy-5-ethoxybenzoyl)acetate
benzyl (2-chloro-3-methyl-5-methoxybenzoyl)acetate
ethyl (2-chloro-3-dimethylamino-5-methoxybenzoyl)acetate
methyl (2-chloro-4-acetamidobenzoyl)acetate
methyl (2-chloro-3-acetamido-5-methoxybenzoyl)acetate
methyl (2,3-ditrifluoromethyl-5-methoxybenzoyl)acetate
methyl (2-methyl-3-propionyloxybenzoyl)acetate
ethyl (2-trifluoromethyl-3,5-dibutoxybenzoyl)acetate
ethyl (2-trifluoromethyl-3-ethylamino-5-methoxybenzoyl)acetate
ethyl (3-butyrylamidobenzoyl)acetate
ethyl (2-chloro-3-acetoxy-5-ethoxybenzoyl)acetate
ethyl (2-chloro-3,5-dihydroxybenzoyl)acetate
ethyl (3-acetamido-5-hydroxybenzoyl)acetate
ethyl (3-trifluoromethyl-5-hydroxybenzoyl)acetate

EXAMPLE XLIX

The following carbalkoxybenzoyl propionates are prepared from corresponding benzoyl acetates by reaction with α-haloacetic acid esters according to the procedure of Method A of Example XLII, as well as by the procedure of Method B, Example XLII.

ethyl 3-carbomethoxy-3-benzoylpropionate
methyl 3-carbethoxy-3-(2-ethyl-5-methoxybenzoyl)propionate
methyl 3-carbomethoxy-3-(3-methoxybenzoyl)butanoate[1]
methyl 3-carbomethoxy-3-(3-methoxybenzoyl)pentanoate[1]
methyl 3-carbomethoxy-3-(3-methoxybenzoyl)hexanoate[1]
methyl 3-carbomethoxy-3-(2-chloro-5-methoxybenzoyl)propionate
methyl 3-carbomethoxy-3-(2-dimethylamino-5-methoxybenzoyl)propionate
benzyl 3-carbomethoxy-3-(2-acetamido-5-methoxybenzoyl)propionate
benzyl 3-carbomethoxy-3-(2-acetamido-5-methoxybenzoyl)propionate
ethyl 3-carbethoxy-3-(3-methoxybenzoyl)propionate
ethyl 3-carbethoxy-3-(2,3-diethyl-5-methoxybenzoyl)propionate
ethyl 3-carbethoxy-3-(3-isopropyl-5-methoxybenzoyl)propionate
ethyl 3-carbethoxy-3-(2-methyl-5-ethoxybenzoyl)propionate
ethyl 3-carbethoxy-3-(3-dimethylamino-5-propoxybenzoyl)propionate
methyl 3-carbomethoxy-3-(2,3-dimethylbenzoyl)propionate
ethyl 3-carbethoxy-3-(3-methoxybenzoyl)proprionate
ethyl 3-carbethoxy-3-(2-methyl-5-methoxybenzoyl)propionate
ethyl 3-carbethoxy-3-(4-methyl-5-methoxybenzoyl)propionate
ethyl 3-carbethoxy-3-(2,3-dimethyl-5-methoxybenzoyl)propionate
ethyl 3-carbethoxy-3-(3-benzyloxybenzoyl)propionate
ethyl 3-carbethoxy-3-(3,5-dimethoxybenzoyl)propionate
ethyl 3-carbethoxy-3-(2,3-diethyl-5-ethoxybenzoyl)propionate

[1] The higher benzoyl alkanoates, e.g. butanoate, pentanoate and hexanoate, are prepared from the next lower homolog by the procedure of Method A, Example XLII.

ethyl 3-carbethoxy-3-(3-isopropyl-5-ethoxybenzoyl)
propionate
methyl 3-carbomethoxy-3-(2-methylamino-5-methoxy-
benzoyl)propionate
methyl 3-carbomethoxy-3-(3-ethyl-5-methoxybenzoyl)
propionate
ethyl 3-carbethoxy-3-(2-methoxy-5-benzyloxybenzoyl)
propionate
ethyl 3-carbethoxy-3-(2-propyl-5-propoxybenzoyl)
propionate
ethyl 3-carbomethoxy-3-(3-trifluoromethyl-5-methoxy-
benzoyl)propionate
ethyl 3-carbomethoxy-3-(3-acetoxy-5-methoxybenzyl)
propionate
propyl 3-carbomethoxy-3-(2-chloro-5-methoxybenzoyl)
propionate
ethyl 3-carbomethoxy-3-(3-benzoyloxybenzoyl)
propionate
ethyl 3-carbomethoxy-3-(3-amino-5-benzyloxybenzoyl)
propionate
ethyl 3-carbomethoxy-3-(3-propyl-5-methoxybenzoyl)
propionate
ethyl 3-carbomethoxy-3-(2-isopropyl-3-ethyl-5-methoxy-
benzoyl)propionate
benzyl 3-carbethoxy-3-(3-methoxy-5-ethoxybenzoyl)
propionate
benzyl 3-carbethoxy-3-(2-chloro-3-methyl-5-methoxy-
benzyl)propionate
ethyl 3-carbethoxy-3-(2-chloro-3-dimethylamino-5-
methoxybenzoyl)propionate
methyl 3-carbomethoxy-3-(2-chloro-4-acetamidobenzoyl)
propionate
methyl 3-carbomethoxy-3-(2-chloro-3-acetamido-5-
methoxybenzoyl)propionate
methyl 3-carbomethoxy-3-(2,3-ditrifluoromethyl-5-
methoxybenzoyl)propionate
methyl 3-carbomethoxy-3-(2-methyl-3-propionyloxyben-
zoyl)propionate
ethyl 3-carbethoxy-3-(2-trifluoromethyl-3,5-dibutoxy-
benzoyl)propionate
ethyl 3-carbethoxy-3-(2-trifluoromethyl-3-ethylamino-5-
methoxybenzyl)propionate
ethyl 3-carbethoxy-3-(3-butyrylamidobenzoyl)propionate
ethyl 3-carbethoxy-3-(2-chloro-3-acetoxy-5-ethoxy-
benzoyl)propionate
ethyl 3-carbethoxy-3-(2-chloro-3,5-dihydroxybenzoyl)
propionate
ethyl 3-carbethoxy-3-(3-acetamido-5-hydroxybenzoyl)
propionate
ethyl 3-carbethoxy-3-(3-trifluoromethyl-5-hydroxy-
benzoyl)propionate

EXAMPLE L

The following compounds are prepared from the products of Example XLIX by the procedure of Examples XLVI and XLIV using corresponding β-bromo or α,β-unsaturated esters or nitriles.

diethyl 3-carbomethoxy-3-benzoyladipate
dimethyl 3-carbethoxy-3-(2-ethyl-5-methoxybenzoyl)
adipate
dimethyl 3-carbomethoxy-3-(2-chloro-5-methoxybenzoyl)
adipate
dimethyl 3-carbomethoxy-3-(2-dimethylamino-5-methoxy-
benzoyl)adipate
dibenzyl 3-carbomethoxy-3-(2-acetamido-5-methoxy-
benzoyl)adipate
diethyl 3-carbethoxy-3-(3-methoxybenzoyl)adipate
diethyl 3-carbethoxy-3-(2-methoxybenzoyl)adipate
diethyl 3-carbethoxy-3-(3-methyl-5-methoxybenzoyl)
adipate
diethyl 3-carbethoxy-3-(3-dimethylamino-5-methoxy-
benzoyl)adipate
dimethyl 3-carbomethoxy-3-(2,3-dimethylbenzoyl)
adipate
diethyl 3-carbethoxy-3-(3-methoxybenzoyl)adipate
diethyl 3-carbethoxy-3-(2-methyl-5-methoxybenzoyl)
adipate
diethyl 3-carbethoxy-3-(4-methyl-5-methoxybenzoyl)
adipate
diethyl 3-carbethoxy-3-(2,3-dimethyl-5-methoxybenzoyl)
adipate
diethyl 3-carbethoxy-3-(3-isopropyl-5-methoxybenzoyl)
adipate
diethyl 3-carbethoxy-3-(2,3-diethyl-5-methoxybenzoyl)
adipate
diethyl 3-carbethoxy-3-(3-benzyloxybenzoyl)adipate
diethyl 3-carbethoxy-3-(3,5-dimethoxybenzoyl)adipate
diethyl 3-carbethoxy-3-(2,3-diethyl-5-ethoxybenzoyl)
adipate
diethyl 3-carbethoxy-3-(3-isopropyl-5-ethoxybenzoyl)
adipate
dimethyl 3-carbomethoxy-3-(2-methylamino-5-methoxy-
benzoyl)adipate
dimethyl 3-carbomethoxy-3-(3-ethyl-5-methoxybenzoyl)
adipate
diethyl 3-carbethoxy-3-(2-methoxy-5-benzyloxybenzoyl)
adipate
diethyl 3-carbethoxy-3-(2-propyl-5-propoxybenzoyl)
adipate
diethyl 3-carbomethoxy-3-(3-trifluoromethyl-5-methoxy-
benzoyl)adipate
diethyl 3-carbomethoxy-3-(3-acetoxy-5-methoxybenzoyl)
adipate
dipropyl 3-carbomethoxy-3-(3-propoxybenzoyl)adipate
dibenzyl 3-carbomethoxy-3-(2-chloro-5-methoxybenzoyl)
adipate
diethyl 3-carbomethoxy-3-(3-benzyloxybenzoyl)adipate
diethyl 3-carbomethoxy-3-(3-amino-5-benzyloxybenzoyl)
adipate
diethyl 3-carbomethoxy-3-(3-propyl-5-methoxybenzoyl)
adipate
diethyl 3-carbomethoxy-3-(2-isopropyl-3-ethyl-5-meth-
oxybenzoyl)adipate
dibenzyl 3-carbethoxy-3-(2-methoxy-5-ethoxybenzoyl)
adipate
dibenzyl 3-carbethoxy-3-(2-chloro-3-methyl-5-methoxy-
benzoyl)adipate
diethyl 3-carbethoxy-3-(2-chloro-3-dimethylamino-5-
methoxybenzoyl)adipate
dimethyl 3-carbethoxy-3-(2-chloro-4-acetamidobenzoyl)
adipate
dimethyl-3-carbomethoxy-3-(2-chloro-3-acetamido-5-
methoxybenzoyl)adipate
dimethyl 3-carbomethoxy-3-(2,3-ditrifluoromethyl-5-
methoxybenzoyl)adipate
dimethyl 3-carbomethoxy-3-(2-methyl-3-propionyloxy-
benzoyl)adipate
diethyl 3-carbethoxy-3-(2-trifluoromethyl-3,5-dibutoxy-
benzoyl)adipate
diethyl 3-carbethoxy-3-(2-trifluoromethyl-3-ethylamino-
5-methoxybenzoyl)adipate
diethyl 3-carbethoxy-3-(3-butyrylamidobenzoyl)adipate
diethyl 3-carbethoxy-3-(2-chloro-3-acetoxy-5-hydroxy-
benzoyl)adipate
diethyl 3-carbethoxy-3-(2-trifluoromethyl-5-hydroxy-
benzoyl)adipate
diethyl 3-carbethoxy-3-(2-chloro-3,5-dihydroxybenzoyl)
adipate
diethyl 3-carbethoxy-3-(3-acetamido-5-hydroxybenzoyl)
adipate
diethyl 3-carboethoxy-3-(3-trifluoromethyl-5-hydroxy-
benzoyl)adipate

EXAMPLE LI

The following compounds are prepared by hydrolysis and decarboxylation of corresponding 3-carbalkoxy compounds according to the procedure of Example XLVII.

methyl 3-(3-methoxybenzoyl)butanoate
methyl 3-(3-methoxybenzoyl)pentanoate
methyl 3-(3-methoxybenzoyl)hexanoate

EXAMPLE LII

Diethyl 3-(3-methoxybenzoyl)adipate 3-(3-methoxybenzoyl)propionic acid ethyl ester (16.7 g.) is dissolved in 100 ml. of a 2.5 M solution of methyl magnesium carbonate in methanol and the resulting mixture refluxed for two hours. After cooling, 25 g. of ethyl β-bromopropionate is added and the mixture allowed to stand for 12 hours, after which it is acidified with concentrated HCl. Chloroform is then added and the entire mixture poured into water. The chloroform layer is separated, dried and concentrated under reduced pressure to give the product which is vacuum-distilled.

EXAMPLE LIII

Dimethyl 2-(3-methoxybenzoyl)glutarate

This compound is prepared according to the methods of Examples XLIV and XLVI using methyl (3-methoxybenzoyl)acetate as the starting compound.

In similar fashion, the following compounds are prepared from corresponding starting compounds using one equivalent of alkylating agent:

diethyl 2-benzoylglutarate
dimethyl 2-(3,5-diethylbenzoyl)glutarate
dimethyl 2-(2-ethyl-5-methoxybenzoyl)glutarate
dimethyl 2-(2-chloro-5-methoxybenzoyl)glutarate
dimethyl 2-(2-dimethylamino-5-methoxylbenzoyl)glutarate
dibenzyl 2-(2-acetamido-5-methoxybenzoyl)glutarate
diethyl 2-(3-methoxybenzoyl)glutarate
diethyl 2-(3-methyl-5-methoxybenzoyl)glutarate
diethyl 2-(3-dimethylamino-5-methoxybenzoyl)glutarate
dimethyl 2-(2,3-dimethylbenzoyl)glutarate
diethyl 2-(3-methoxybenzoyl)glutarate
diethyl 2-(2-methyl-5-methoxybenzoyl)glutarate
diethyl 2-(4-methyl-5-methoxybenzoyl)glutarate
diethyl 2-(2,3-dimethyl-5-methoxybenzoyl)glutarate
diethyl 2-(3,5-dimethoxybenzoyl)glutarate
diethyl 2-(2,3-diethyl-5-ethoxybenzoyl)glutarate
diethyl 2-(3-isopropyl-5-ethoxybenzoyl)glutarate
dimethyl 2-(2-methylamino-5-methoxybenzoyl)glutarate
dimethyl 2-(3-ethyl-5-methoxybenzoyl)glutarate
diethyl 2-(2-methoxy-5-benzyloxybenzoyl)glutarate
diethyl 2-(2-propyl-5-propoxybenzoyl)glutarate
diethyl 2-(3-trifluoromethyl-5-methoxybenzoyl)glutarate
diethyl 2-(3-acetoxy-5-methoxybenzoyl)glutarate
dipropyl 2-(3-propoxybenzoyl)glutarate
dibenzyl 2-(2-chloro-5-methoxybenzoyl)glutarate
diethyl 2-(3-benzyloxybenzoyl)glutarate
diethyl 2-(3-amino-5-benzyloxybenzoyl)glutarate
diethyl 2-(3-propyl-5-methoxybenzoyl)glutarate
diethyl 2-(2-isopropyl-3-ethyl-5-methoxybenzoyl)glutarate
dibenzyl 2-(2-methoxy-5-ethoxybenzoyl)glutarate
dibenzyl 2-(2-chloro-3-methyl-5-methoxybenzoyl)glutarate
diethyl 2-(2-chloro-3-dimethylamino-5-methoxybenzoyl)glutarate
dimethyl 2-(2-chloro-4-acetamidobezoyl)glutarate
dimethyl 2-(2-chloro-3-acetamido-5-methoxybenzoyl)glutarate
dimethyl 2-(2,3-ditrifluoromethyl-5-methoxybenzoyl)glutarate
dimethyl 2-(2-methyl-3-propionyloxybenzoyl)glutarate
diethyl 2-(2-trifluoromethyl-3,5-dibutoxybenzoyl)glutarate
diethyl 2-(2-trifluoromethyl-3-ethylamino-5-methoxybenzoyl)glutarate
diethyl 2-(3-butyrylamidobenzoyl)glutarate
diethyl 2-(2-chloro-3-acetoxy-5-ethoxybenzoyl)glutarate
diethyl 2-(2-trifluoromethyl-5-hydroxybenzoyl)glutarate
diethyl 2-(3-acetamido-5-hydroxybenzoyl)glutarate
diethyl 2-(2-chloro-3,5-dihydroxybenzoyl)glutarate
diethyl 2-(3-trifluoromethyl-5-hydroxybenzoyl)glutarate

EXAMPLE LIV

The compounds of Example LIII are converted to the corresponding adipic acid derivatives described in Example L by reaction with bromacetic acid ester by the procedure of Method A of Example XLII.

EXAMPLE LV

Dimethyl 3-(α-methoxymethyl-2-chloro-5-methoxybenzyl)adipate

The ylid is prepared from chloromethyl ether in the following manner: triphenylphosphine (52.4 g., 0.2 mole) is dissolved in 100 ml. anhydrous benzene and 16.1 g. chloromethyl ether added. The mixture is heated at 50° C. for 16 hours. The resulting heavy crystalline mass is filtered off, washed with ether, dissolved in chloroform, and reprecipitated with ethyl acetate. The precipitate is then separated, washed with ether, and dried at 80° C. in high vacuum.

Triphenylmethoxymethylphosphonium chloride, 6.84 g., 0.02 mole, prepared as described above, is suspended in 65 ml. absolute ether. To this suspension is added 19.6 ml. 1.0 N phenyl lithium solution. With slight warming the mixture turns orange-red and then dark red. After five minutes there is added portionwise 0.02 mole dimethyl 3-(2-chloro-5-methoxybenzoyl)adipate in 50 ml. ether. An exothermic reaction occurs causing the ether to reflux. After stirring for 2 hours, the suspension is filtered and the separated solids washed with ether. The combined ether filtrate and washings are dried over anhydrous sodium sulfate, filtered, and evaporated, to obtain dimethyl 3 - (α - methoxymethylene - 2-chloro-5-methoxybenzyl)adipate as residue. It is further purified by distillation under high vacuum.

The methoxymethylene benzyl adipate, obtained as described, is dissolved in 50 parts by weight dioxane and hydrogenated over 0.1 part 5% palladium on charcoal at 50 p.s.i. and room temperature until one molar equivalent of hydrogen has been absorbed. The hydrogenation mixture is filtered, and the filtrate evaporated to obtain the desired dimethyl 3 - (α - methoxymethyl - 2-chloro-5-methoxybenzyl)adipate as residue. It is further purified by high-vacuum distillation.

Following the described procedure, the following additional adipates are prepared from the corresponding benzoyl adipates. (For these syntheses the necessary chloromethyl ethers of the formula B₃CHClOB₂ are obtained by treatment of aldehyde acetals of the formula $$B_3CH(OB_2)_2$$

with acetyl chloride, as described in Liebig's Annalen, 493, p. 203, and 498, p. 120 (1932).

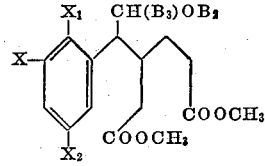

| X | X₁ | X₂ | B₃ | B₂ |
|---|---|---|---|---|
| H | 2-Cl | 5-OH | CH₃ | CH₃ |
| H | 2-NHCOCH₃ | 5-OEt | H | CH₃ |
| 5-Me | H | 3-OMe | H | n-C₃H₇ |
| 3-OMe | H | 5-OMe | H | CH₃ |
| H | 2-OMe | 5-OMe | CH₃ | CH₃ |
| 3-EtCO₂ | 2-OMe | H | CH₃ | C₂H₅ |
| H | 2-Cl | 5-OMe | H | CH₃ |
| H | 2-Cl | 5-OH | CH₃ | CH₃ |
| 3-Me | 2-Cl | 5-OH | C₂H₁₁ | H |
| H | H | 3-OMe | H | CH₃ |

The alkoxy alkyl ethers produced in this manner are converted to the corresponding tetralones and thence to the corresponding 9-alkoxyalkyl-3,4,10-trioxo-1,2,3,4,4a,9,9a,10-octahydroanthracenes by the reaction sequences illustrated and exemplified above for the conversion of compounds of structure II to those of structure I.

The methoxymethylene benzyl adipate is also converted to an aldehyde, in the following manner: dimethyl 3-(α-methoxymethylene - 2 - chloro - 5 - methoxybenzyl) adipate is warmed with a mixture of 1:10 by volume 1% aqueous hydrochloric acid:dioxane for 5 minutes at 60° C. The solvent is then removed by evaporation at reduced pressure, and the residue is converted to the bisulfite addition product by shaking with alcoholic sodium bisulfite as described in Vogel, "A Textbook of Practical Organic Chemistry," Longmans (1948), p. 330. The addition product is then hydrolyzed by treatment with 5% aqueous hydrochloric acid and the resulting dimethyl 5-(α-formyl - 2 - chloro - 5 - methoxybenzyl) adipate is extracted from the aqueous acid into chloroform and recovered by evaporation of the solvent.

The dimethyl 3 - (α - formyl - 2 - chloro - 5 - methoxybenzyl) adipate prepared as described is hydrogenated in ethylene glycol dimethyl ether solvent at room temperature over platinum oxide catalyst until an equimolar proportion of hydrogen is consumed. The catalyst is then separated by filtration and the resulting α-hydroxymethyl benzyl adipate recovered by evaporation of the solvent under reduced pressure.

These α-alkoxyalkyl benzyl adipates are converted to 9 - alkoxyalkyl - 3,4,10 - trioxo - octahydroanthracenes of Structure IV via the corresponding tetralones of Structure III by applying in order the procedures of Examples XXXV and XXXVI.

EXAMPLE LVI 3-carbomethoxy-5-formylisoxazole (A) A solution of 5-styryl-3-carbomethoxyisoxazole (50 g.) in ethylacetate (200 ml.) is cooled to −70° C. At this temperature crystallization of the isoxazole occurs. Ozonized oxygen is bubbled into the mixture at −70° C. until a clear blue solution is produced. The excess ozone is flushed out with nitrogen while the temperature is maintained at −70° C. Two grams of 5% palladium on carbon is added and hydrogen bubbled into the mixture at −70° C. for 30 minutes. The mixture is then allowed to warm to room temperature, filtered and fractionally distilled to give the product; B.P. 123° C. at 17 mm.; M.P. 72–74° C. (from hexane).

The dinitrophenylhydrazone, prepared according to standard procedure, is obtained as yellow needles from ethanol; M.P. 228° C.

(B) The carbomethoxy group is converted to other ester groups by ester interchange as follows. The 3-carbomethoxy-5-formylisoxazole is dissolved in an excess of the alcohol, the ester of which is desired. A few drops of concentrated sulfuric acid are added as catalyst and the mixture allowed to stand at room temperature for 12 hours. The entire mixture is taken up in chloroform, washed with dilute aqueous sodium bicarbonate followed by water, then dried over anhydrous sodium sulfate and stripped of solvents. The residue, the desired product, crystallizes on standing. The following esters are thus prepared:

$Y_5$=methyl, n-propyl, isopropyl, n-butyl, isoamyl, benzyl.

Alternatively, the 3-carboxy-5-formylisoxazole esters are prepared by ozonolysis as described above, of the appropriate 5-styryl-3-carboxyisoxazole ester obtained by the method described in J.C.S. 3663 (1956). The ethyl, isoamyl, n-butyl, benzyl and propyl esters are thus prepared.

EXAMPLE LVII 3-carbethoxy-5-formylisoxazole

To 5-styryl-3-carbethoxyisoxazole (10 g.) in 750 ml. of ethyl acetate at −70° C. is added ozone. A precipitate forms and then re-dissolves. The excess ozone is blown out with nitrogen gas while the temperature is maintained at −70° C. One gram of 5% palladium on carbon is added and hydrogen passed through until destruction of the ozonide is complete as indicated by the starch-iodide test. The filtered reaction mixture is concentrated under reduced pressure to obtain a residual oil which is fractionally distilled to obtain first benzaldehyde and then 3-carbethoxy-5-formylisoxazole.

EXAMPLE LVIII 3,4-dicarbethoxy-5-formylisoxazole

A solution of 21.9 g. of ethyl-γ,γ-diethoxyacetoacetate in dry benzene (100 ml.) is added dropwise to a suspension of sodium hydride (56%) (4.5 g.) in dry benzene (100 ml.). A vigorous evolution of hydrogen occurs and a clear solution of the sodium salt of starting compound is obtained. After 30 minutes, 15.3 g. of ethyl α-chloro-α-oximinoacetate in dry benzene (100 ml.) is added dropwise and the mixture stirred at room temperature for 12 hours. After filtration, the benzene solution is dried by azeotropic distillation. (The β-keto oxime can be obtained from this solution, if desired, and purified by molecular distillation; B.P. 130°–140° C. $2.08 \times 10^{-5}$ mm.) 1.0 g. of p-toluene-sulfonic acid is then added and the mixture refluxed for one hour while water is continuously removed with a Dean-Stark trap. After cooling, the solution is washed with water and then evaporated to give the crude diethyl acetal of 3,4-dicarbethoxy-5-formylisoxazole (29.6 g.) which on fractional distillation (B.P. 118° C. 0.15 mm.) gives 23.5 g. ($n_D^{25}$ 1.4545).

Analysis.—Calc'd for $C_{14}H_{21}NO_7$ (percent): C, 53.32; H, 6.71; N, 4.44; OEt, 57.2. Found (percent): C, 53.52; H, 6.77; N, 4.31; OEt, 55.10.

The diethyl acetal (171.3 g.) and 48% HBr (350 ml.) are mixed and stirred vigorously to produce a homogeneous mixture (10 minutes). The yellow solution is poured into 500 ml. of water and extracted with chloroform (4× 100 ml.). The combined extracts are water-washed and evaporated to an oil (138.4 g.; $n_D^{26}$, 1.4710) which is fractionally distilled under reduced pressure to obtain the product 105 g.). Elemental analysis of the dinitrophenylhydrozone (M.P. 164–165° C.—yellow needles) agrees with the calculated values.

Alternatively, this compound is prepared from the corresponding 5-styryl-3,4-dicarbethoxyisoxazole (prepared from cinnamoyl acetic acid ethyl ester and ethyl α- chloro-α-oximino-acetate) by the procedure of Example LVII.

The following 5-formylisoxazole diesters are similarly obtained from the appropriate reactants:

| $Y_4$ | $Y_5$ |
|---|---|
| COO Me | COO Me |
| COO Pr | COO Pr |
| COO Bu | COO Bu |
| COO-i-Pr | COO-i-Pr |
| COO Bz | COO Bz |
| COO Me | COO Bz |
| COO Bz | COO Et |
| COO Me | COO Pr |

EXAMPLE LIX

Carboxamide derivatives of 5-formylisoxazoles

The diethylacetal of 3,4-dicarbethoxy-5-formylisoxazole (10 g.) in 25 ml. of saturated aqueous ammonia is stirred at room temperature for 16 hours. The original two-phase system changes to a suspension of crystals in the aqueous layer during this period. It is filtered, washed with water and dried; M.P. 129°–130° C. Recrystallization from ethanol raises the melting point to 130°–131.5° C.

Analysis.—Calcd. for $C_{10}H_{15}O_5N_3$ (percent): C, 46.65; H, 5.88; N, 16.35. Found (percent): C, 46.65; H, 5.80; N, 16.12.

The diamide diacetal produced above (2 g.) is dissolved in 5 ml. of 48% hydrobromic acid. Crystals begin to form after two minutes and, after a total of ten minutes the mixture is filtered, with suction. The crystalline product is then washed with water and crystallized from methanol from which it was obtained as the methanol solvate; M.P. 181°–182° C. The dinitrophenylhydrazone, when recrystallized from ethyl acetate, did not melt below 260° C.

*Solvate analysis.*—Calcd. for $C_7H_9O_5N_3$ (percent): C, 39.07; H, 4.22; N, 19.52. Found (percent): C, 38.84; H, 4.29; N, 19.25.

The remaining products of Example LVIII are transformed to their corresponding amides by means of this procedure.

EXAMPLE LX

Hydrazide of 3,4-dicarboxy-5-formylisoxazole 3,4-dicarbethoxy-5-formylisoxazole diethylacetal (10 ml.) and 100 ml. of 40% aqueous hydrazine are stirred at room temperature overnight. The waxy solid which forms is filtered off, washed with water and dried in air. It is purified by recrystallization from chloroform/hexane; M.P. 94–96° C.

Hydrolysis with 48% aqueous HBr produces the desired product.

EXAMPLE LXI

Amide of 3-carboxy-5-formylisoxazole 5-styryl-3-carbethoxyisoxazole (3 g.) in 15 ml. of concentrated aqueous ammonia is stirred at room temperature overnight. The suspension of buff colored solid is filtered, washed with water and dried. It is recrystallized from ethanol as needles; M.P. 218°–219° C. The amide of 5-styryl-3-carboxyisoxazole is then treated with ozone according to the procedure of Example LVI.

Repetition of this procedure but using 40% aqueous hydrazine in place of ammonia produces the hydrazide of 3-carboxy-5-formylisoxazole.

EXAMPLE LXII

2-[$5^1$ - ($3^1$ - carbomethoxy)-isoxazolyl)methylidene]-5-methoxy-8-chloro - 3,4,10 - trioxo - 1,2,3,4,4a,9,9a,10-octahydroanthracene

METHOD A

A mixture of 500 mg. of 5-methoxy-8-chloro-3,4,10-trioxo-1,2,3,4,4a,9,9a,10 - octahydroanthracene, 85 mg. of magnesium methoxide, 300 mg. of 3 - carbomethoxy-5-formylisoxazole in 20 ml. of xylene are stirred and heated at 100–110° C. for one hour on an oil bath. The dark brown reaction mixture is then evaporated to dryness, the residue taken up in chloroform and the chlorform solution extracted with 5–10 ml. of 2 N hydrochloric acid (to decompose magnesium chelates), washed with water and dried. The chloroform solution is decolorized with Darco KB then evaporated to dryness to give a red-brown gum. Trituration of the gum with ethyl acetate produces the crystalline condensation product; M.P. 210–212° C. Recrystallization from ethyl acetate raises the melting point to 222–224° C.

Additional product is obtained by the addition of hexane to the ethyl acetate liquors.

METHOD B

A mixture of the starting tricyclic ketone of method A (3.0 g.), 3-carbomethoxy-5-formylisoxazole (1.8 g.), acetic acid (redistilled from acetic anhydride) and dry hydrogen chloride gas (120 mg. in ether) are combined and refluxed for 7 hours. The solvent is then evaporated to a small volume, the residue diluted with water and extracted with chloroform. Evaporation of the chloroform extract gives the crude product which is purified by recrystallization from ethylacetate; M.P. 223–224° C.

*Analysis.*—Calcd. for $C_{21}H_{15}O_7NCl$ (percent): C, 58.83; H, 3.53; N, 3.27. Found (percent): C, 58.86; H, 4.03; N, 3.03.

As a by-product of the reaction the 3-enol acetate of 5-methoxy-8-chloro-3,4,10-trioxo - 1,2,3,4,4a,9,9a,10-octahydroanthracene is obtained from the aqueous acetic acid liquor. It is purified by partition chromatography and recrystallization from ethylacetate/hexane; M.P. 164–165° C.

The following condensation products are obtained from the proper 3,4,10-trioxooctahydroanthracenes and 5-formylisoxazoles by the above methods.

| X | X₁ | X₂ | A | Y₂ | Y₃ |
|---|---|---|---|---|---|
| H | H | H | H | H | COOEt |
| H | 8-NMe₂ | 5-OMe | H | COOEt | COOEt |
| H | 8-NHCOMe | 5-OMe | H | H | COOEt |
| H | H | 5-OH | H | H | COOEt |
| H | H | 5-OBz | H | H | COOEt |
| H | H | 5-OH | H | COOBz | COOBz |
| 7-NMe₂ | H | 5-OH | H | H | COOMe |
| H | H | 5-OMe | H | H | COOMe |
| H | H | 5-OMe | Me | COOMe | COOMe |
| H | H | 5-OMe | Et | COOMe | COOMe |
| H | H | 5-OMe | Pr | COOMe | COOMe |
| H | 8-Cl | 5-OMe | i-Pr | H | COOMe |
| H | 8-Et | 5-OMe | H | COOMe | COOMe |
| H | 8-NH₂ | 5-OMe | H | COOEt | COOEt |
| 7-Me | H | 5-OMe | H | COOMe | COOMe |
| 7-i-Pr | H | 5-OMe | H | H | COOPr |
| 7-Et | 8-Et | 5-OH | H | H | COOPr |
| 7-NH₂ | H | 5-OMe | H | COOBu | COOBu |
| 7-Pr | H | 5-OMe | H | COOEt | COOEt |
| 7-Me | H | 5-OMe | H | COOMe | COOMe |
| 7-Me | 8-Me | H | H | COOPr | COOPr |
| H | 8-NH₂ | 5-OBz | H | COOEt | COOEt |
| H | 8-Pr | 5-OPr | H | COOEt | COOEt |
| 7-Me | H | 5-OMe | MeOCH₂ | COOEt | COOEt |
| H | 8-Me | 5-OMe | H | H | COOPr |
| 7-Me | 8-Me | 5-OH | H | COOMe | COOMe |
| 7-CF₃ | H | 5-OH | H | COOMe | COOMe |
| 7-i-Pr | 8-Cl | 5-OH | H | COOMe | COOBz |
| H | 8-CF₃ | 5-OH | H | COOEt | COOEt |
| H | H | 5-OMe | H | H | COOBz |
| H | 8-Cl | 5-OMe | Me | H | COOMe |
| 7-CF₃ | 8-CF₃ | 5-OMe | H | COOMe | COOMe |
| 7-EtCO₂ | 8-Me | H | EtOCH(Me) | COOMe | COOMe |
| 7-OBu | 8-CF₃ | 5-OBu | H | COOEt | COOEt |
| 7-NHEt | 8-CF₃ | 5-OMe | H | COOEt | COOEt |
| 7-Me | 8-Cl | 5-OH | H | COOMe | COOMe |
| H | 8-NHMe | 5-OPr | H | COOMe | COOMe |
| H | H | H | H | COOMe | COOMe |

| X | $X_1$ | $X_2$ | A | $Y_2$ | $Y_3$ |
|---|---|---|---|---|---|
| H | H | H | H | H | COO-i-Pr |
| H | 8-Cl | 5-OMe | H | H | COO-i-Pr |
| H | H | 5-OH | Me | H | COOMe |
| 7-NMe$_2$ | 8-Cl | 5-OMe | H | COOEt | COOEt |
| 7-OMe | 8-Cl | H | H | COOMe | COOMe |
| 7-NHCOCH$_3$ | 8-Cl | 5-OMe | H | COOEt | COOEt |
| 7-NHCOCH$_3$ | H | 5-OMe | H | COOEt | COOEt |
| 7-OH | 8-Cl | 5-OH | H | COOAm | COOAm |
| 7-OBz | H | H | Me | COOPr | COOPr |
| H | H | 5-OMe | Me | H | COO-i-Pr |
| H | H | 5-OBz | H | COOMe | COOPr |
| H | H | 5-OH | i-Pr | COOMe | COOMe |
| H | H | 5-OMe | Me | COOMe | COOMe |
| H | B | 5-OMe | Me | COOBz | COOBz |
| H | H | 5-OMe | Et | COOBu | COOBu |
| 7-NHCOC$_3$H$_7$ | H | H | H | COOEt | COOEt |
| 7-MeCO$_2$ | 8-Cl | 5-OEt | Et | COOBu | COOBu |
| H | 8-CF$_3$ | H | Me | H | COOMe |
| H | 8-Cl | 5-OH | H | H | COOBu |
| H | 8-Cl | 5-OMe | H | H | COO-l-amyl |
| H | 8-Cl | 5-OMe | H | H | COOBz |

EXAMPLE LXIII

2-[5$^1$ - (3$^1$ - 4$^1$ - dicarbethoxy - isoxazolyl)methylidene] 5 - methoxy - 8 - chloro - 3,4,10 - trioxo - 1,2,3,4,4a,9, 9a,10-octahydroanthracene 400 mg. of 5-methoxy - 8 - chloro - 3,4,10 - trioxo-1,2,3,4,4a,9,9a,10-octahydroanthracene, 363 mg. of 3,4-dicarbethoxy 5 - formylisoxazole, 60 mg. of magnesium methoxide and 20 ml. of xylene are combined and heated with stirring on an oil bath at 100° C. for one hour. The dark red-brown mixture is evaporated to dryness, the residue dissolved in chloroform and extracted with 5 ml. of 2 N hydrochloric acid to decompose magnesium chelates present. The chloroform solution is then washed with water, dried and evaporated to dryness to give a brown residue. Upon trituration with ethylacetate, yellow needles are obtained. Recrystallization from acetone gives the pure product; M.P. 215–217° C.

As by-product there is obtained 2 - [5' - (3',4' - dicarbethoxy)isoxazolyl)(hydroxymethyl)] - 5 - methoxy-8-chloro - 3,4,10 - trioxo - 1,2,3,4,4a,9,9a,10 - octahydroanthracene; M.P. 200–202° C.

*Analysis.*—Calcd. for C$_{25}$H$_{22}$O$_9$NCl (percent): C, 58.20; H, 4.30; N, 2.72; Cl, 6.87. Found (percent): C, 58.20; H, 4.21; N, 2.61; Cl. 6.94.

Ultraviolet absorption maxima:

MeOH/H$^+$ 325 m$\mu$ ($\epsilon$=2,600); 375 m$\mu$ ($\epsilon$=3,560)
MeOH/OH$^-$ 319 m$\mu$ ($\epsilon$=5,920); 470 m$\mu$ ($\epsilon$=3,080)

Repetition of this procedure under substantially the same conditions gave a crystalline product melting at 232–234° C. and having ultraviolet absorption maxima at:

MeOH/H$^+$ 325 m$\mu$ ($\epsilon$=4,650); 375 m$\mu$ ($\epsilon$=6,150)
MeOH/OH$^-$ 316 m$\mu$ ($\epsilon$=12,300); 470 m$\mu$ ($\epsilon$=6,660)

This product, considered to be an isomer of the above-described product, when employed further in the reaction sequence produces the same ultimate product as does the above compound.

The following condensation products are similarly produced from the appropriate reactants.

| X | $X_1$ | $X_2$ | A | $Y_2$ | $Y_3$ |
|---|---|---|---|---|---|
| H | 8-Cl | 5-OBz | H | H | COOMe |
| H | 8-Cl | 5-OMe | Me | H | COOBz |
| H | 8-Cl | 5-OMe | Et | H | COOMe |
| H | 8-Cl | 5-OMe | Pr | H | COOMe |
| 7-OMe | H | 5-OMe | H | H | COOMe |
| H | 8-Cl | 5-OMe | MeOCH$_2$ | H | COOEt |
| H | H | 5-OMe | MeOCH$_2$ | H | COOMe |
| H | H | 5-OBu | Et | H | COOEt |
| 7-Me | 8-Cl | 5-OMe | H | COOPr | COOPr |
| 7-NH$_2$ | 8-Cl | 5-OMe | H | COOBz | COOBz |
| 7-Et | 8-Cl | 5-OMe | H | COOBz | COOBz |
| H | 8-Cl | 5-OH | MeOCH(Me) | H | COOMe |
| 7-Me | 8-Cl | 5-OH | HOCH(C$_6$H$_{11}$) | COOMe | COOMe |
| H | 8-CF$_3$ | 5-OH | H | H | COOEt |
| H | 8-CF$_3$ | 5-OMe | Me | H | COOMe |
| 7-Et | H | 5-OMe | H | H | COOMe |
| 7-NMe$_2$ | H | 5-OH | H | H | CONH$_2$ |
| H | 8-NHCOMe | 5-OMe | H | H | CONH$_2$ |
| H | H | 5-OBz | H | H | CONH$_2$ |
| H | 8-Et | 5-OMe | H | H | CONH$_2$ |
| H | 8-Cl | 5-OMe | H | H | CONH$_2$ |
| H | H | 5-OMe | H | H | CONH$_2$ |
| H | 8-Cl | 5-OMe | Me | H | CONH$_2$ |
| 7-OMe | H | 5-OMe | H | H | CONH$_2$ |
| H | 8-Cl | 5-OMe | H | COOMe | COOMe |
| H | H | 5-OEt | Me | H | COOMe |
| H | 8-Cl | 5-OMe | Me-OH$_2$ | COOEt | COOEt |
| H | 8-Cl | H | H | COOEt | COOEt |

In the above table, Me=CH$_3$; Et=C$_2$H$_5$; Pr=C$_3$H$_7$; Bu=butyl; Bz=benzyl; Am=amyl. Ether substituents are converted to hydroxy groups by HBr cleavage; and acylamido groups to amino groups by hydrolysis.

EXAMPLE LXIV-A

2 - [5$^1$ - (3$^1$,4$^1$ - di(N - methylcarboxamido)-isoxazolyl) methylidene] - 5 - methoxy - 8 - chloro - 3,4,10 - trioxo-1,2,3,4,4a,9,9a,10-octahydroanthracene The title product of Example LXIII (3.0 g.) is dissolved in monomethylamine (ca. 50 ml.) at —70° C. under an inert atmosphere (nitrogen). The solution is held at —70° C. for 20 hours at the end of which time most of the excess amine is removed by evaporation in vacuo. Final traces of amine are removed by evaporation with chloroform. The residual brown foam is dissolved in chloroform and the solution washed successively with 2 N hydrochloric acid, dilute sodium hydroxide, 2 N hydrochloric acid, water and then dried over anhydrous sodium sulfate. Evaporation of the solvent gives the product as a tan solid which is obtained as yellow prisms by chromatography on acid washed Florisil and crystallization from chloroform:acetone:hexane; M.P. 216–218° C.

By means of this procedure the isoxazole ester products of Examples LXII and LXIII are converted to the corresponding N - methylcarboxamido substituted compounds.

EXAMPLE LXIV-B

2 - [(5$^1$ - (3$^1$ - N - methylcarboxamido - 4$^1$ - carbethoxy) isoxazolyl)methylidene] - 5 - methoxy - 8 - chloro-3,4,10-trioxo-1,2,3,4,4a,9,9a,10-octahydroanthracene The title product of Example LXIII (1.0 g.) is dissolved in monomethylamine (20 ml.) under nitrogen at —70° C. The mixture is stirred for 15 minutes then subjected to reduced pressure in a heavy stream of nitrogen for 45 minutes to remove half the amine. The residue is then poured into ice cold concentrated hydrochloric acid (slight excess) and the aqueous mixture extracted with chloroform. The chloroform extract is washed with 0.5 N sodium hydroxide, then with 0.5 N hydrochloric acid, water and saturated sodium chloride. The clear orange solution is evaporated to dryness and the orange, glass-like solid (0.89 g.) crystallized from ethanol-ether (1–1) to give yellow crystals. Two crystallizations from chloroform-hexane give yellow needles; M.P. 235°–237° C. (dec.).

*Analysis.*—Calcd. for $C_{24}H_{21}O_8N_2Cl$ (percent): C, 57.58; H, 4.25; N, 5.59. Found (percent): C, 57.27; H, 4.68; N, 5.92.

The isoxazole diesters of Examples LXII and LXIII are converted to the corresponding 3-N-methylcarboxamido - 4 - carboxy esters by this procedure.

EXAMPLE LXV

2 - [(5¹ - (3¹ - N,N - dimethylcarboxamido)-isoxazolyl) (N,N - dimethylamino)methyl] - 5 - methoxy - 8-chloro - 3,4,10 - trioxo - 1,2,3,4,4a,9,9a,10 - octahydroanthracene The product of Example LXII (200 mg.) is dissolved in dimethylamine (10 ml.) in a tightly capped polyethylene bottle and maintained at 0° for 16 hours. The red solution becomes amber in color and a yellow crystalline solid separates. The reaction mixture is dissolved in ether at −10° and the amine evaporated in a stream of nitrogen (more dry is ether added to the mixture when necessary). The suspension is filtered under $N_2$, the crystalline residue washed with dry ether, and dried in a stream of $N_2$ at 0° C. M.P.; becomes red at 60° C., finally melts at 215–217° C.

A crystalline dihydrochloride (unstable at room temperature) is prepared in dry ether, HCl; M.P. becomes orange at 100° C., finally melts at 207–209° C.

By means of this procedure the remaining products of Examples LXII and those of LXIII are converted to the following compounds by substituting the appropriate amine $HNR_3R_4$ for dimethylamine.

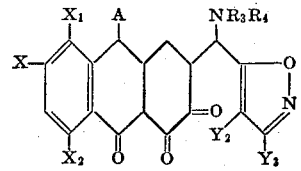

| X | X₁ | X₂ | A | Y₂ | Y₃ | NR₃R₄ |
|---|---|---|---|---|---|---|
| H | H | H | H | H | CONMe₂ | NMe₂ |
| H | 8-Et | 5-OMe | H | H | CONH₂ | NHME |
| H | 8-NMe₂ | 5-OMe | H | H | CONHMe | NHMe |
| H | 8-NH₂ | 5-OMe | H | H | CONMe₂ | NMe₂ |
| H | 8-NHCOMe | 5-OMe | H | H | CONH₂ | NHMe |
| H | H | 5-OH | H | H | CO(piperazyl) | Piperazyl |
| 7-Me | H | 5-OMe | H | CO(piperidyl) | CO(piperidyl) | Piperidyl |
| 7-i-Pr | H | 5-OMe | H | H | CONHMe | NHMe |
| 7-Et | 8-Et | 5-OH | H | H | CONHMe | NHMe |
| H | H | 5-OBz | H | H | CONH₂ | NHMe |
| H | H | 5-OH | H | CO(piperazyl) | CO(piperazyl) | Piperazyl |
| 7-NH₂ | H | 5-OMe | H | CONHMe | CONHMe | NHMe |
| 7-Pr | H | 5-OMe | H | CONHMe | CONHMe | NHMe |
| 7-Me | H | 5-OMe | H | CO(morpholinyl) | CO(morpholinyl) | Morpholinyl |
| 7-NMe₂ | H | 5-OH | H | H | CONHMe | NHMe |
| 7-NMe₂ | H | 5-OH | H | H | CONH₂ | Morpholinyl |
| 7-Me | 8-Me | H | H | CONHMe | CONHMe | NHMe |
| H | 8-NH₂ | 5-OBz | H | CONHMe | CONHMe | NHMe |
| H | 8-Pr | 5-OPr | H | CONHMe | CONHMe | NHMe |
| H | H | 5-OMe | H | H | CO(morpholinyl) | Morpholinyl |
| H | H | 5-OMe | Me | CONHMe | CONHMe | NHMe |
| H | H | 5-OMe | Et | CONHMe | CONHMe | NHMe |
| H | H | 5-OMe | Pr | CONHMe | CONHMe | NHMe |
| H | 8-Cl | 5-OMe | i-Pr | H | CONHMe | NHMe |
| H | H | H | H | CO[N-(methyl)-piperazyl] | CO[N-(methyl)-piperazyl] | [N-(methyl)-piperazyl] |
| H | 8-Cl | 5-OMe | H | H | CO[N-(butyl)-piperazyl] | [N-(butyl)-piperazyl] |
| 7-Me | H | 5-OMe | MeOCH₂ | H | CONH₂ | NHMe |
| H | 8-Cl | 5-OMe | H | CONHMe | CONHMe | NHMe |
| H | 8-Cl | H | H | CONHMe | CONHMe | NHMe |
| H | 8-Cl | 5-OMe | H | CO(morpholinyl) | CO(morpholinyl) | Morpholinyl |
| H | 8-Me | 5-OMe | H | H | do | Do |
| 7-Me | 8-Me | 5-OH | H | CONHMe | CONHMe | NHMe |
| H | H | 5-OH | Me | H | CONHMe | NHMe |
| 7-NMe₂ | 8-Cl | 5-OMe | H | CONHMe | CONHMe | NHMe |
| 7-OMe | 8-Cl | H | H | CONHMe | CONHMe | NHMe |
| 7-NHCOCH₃ | 8-Cl | 5-OMe | H | CONHMe | CONHMe | NHMe |
| 7-NHCOCH₃ | H | 5-OMe | H | CONHMe | CONHMe | NHMe |
| 7-OH | 8-Cl | 5-OH | H | CONHMe | CONHMe | NHMe |
| 7-CF₃ | H | 5-OH | H | CONHMe | CONHMe | NHMe |
| 7-OBz | H | H | Me | CONHMe | CONHMe | NHMe |
| 7-i-Pr | 8-Cl | 5-OH | H | CONHMe | CONHMe | NHMe |
| H | 8-CF₃ | 5-OH | H | H | CONMe₂ | NMe₂ |
| H | H | 5-OMe | H | H | CONH₂ | NHMe |
| H | 8-Cl | 5-OMe | Me | H | Co[N-(ethyl)-piperazyl] | [N-(ethyl)-piperazyl] |
| H | 8-CF₃ | 5-OH | H | H | CO(morpholinyl) | Morpholinyl |
| H | H | 5-OMe | Me | H | CONHMe | NHMe |
| H | H | 5-OBz | H | H | CONHMe | Morpholinyl |
| H | H | 5-OH | i-Pr | CONHMe | CONHMe | NHMe |
| H | H | 5-OMe | Me | CONHMe | CONHMe | NHMe |
| H | H | 5-OMe | H | H | CONMe₂ | NMe₂ |
| H | H | 5-OMe | Et | CONHMe | CONHMe | NHMe |
| 7-CF₃ | 8-CF₃ | 5-OMe | H | EtOCH(Me) | CONH₂ | NHMe |
| 7-EtCO₂ | 8-Me | H | EtOCH(Me) | CONHMe | CONHMe | NHMe |
| 7-OBu | 8-CF₃ | 5-OBu | H | CONHMe | CONH₂ | NHMe |
| 7-NHEt | 8-CF₃ | 5-OMe | H | CONHMe | CONHMe | NHMe |
| 7-NHCOC₃H₇ | H | H | H | CONHMe | CONHMe | NMe₂ |
| 7-OMe | H | 5-OMe | H | H | CONH₂ | NMe₂ |
| 7-MeCO₂ | 8-Cl | 5-OEt | Et | CONHMe | CONHMe | NHMe |
| H | 8-CF₃ | H | Me | H | CO(morpholinyl) | Morpholinyl |
| H | 8-Cl | 5-OH | H | H | CONMe₂ | NMe₂ |
| 7-Me | 8-Cl | 5-OH | H | CO(piperazyl) | CO(piperazyl) | Piperazyl |
| H | 8-NHMe | 5-OPr | H | CO(piperidyl) | CO(piperidyl) | Piperidyl |
| H | 8-Cl | 5-OMe | H | H | CONHMe | NHMe |
| H | 8-Cl | 5-OMe | H | H | CONMe₂ | NMe₂ |
| H | 8-Cl | 5-OBz | H | CONHMe | CONHMe | NHMe |
| 7-Me | 8-Cl | 5-OMe | H | CONHMe | CONHMe | NHMe |
| 7-NH₂ | 8-Cl | 5-OMe | H | CONHMe | CONHMe | NHMe |
| 7-Et | 8-Cl | 5-OMe | H | CONHMe | CONHMe | NHMe |
| H | 8-Cl | 5-OMe | Me | H | CONH₂ | NHMe |
| H | 8-Cl | 5-OMe | Et | CONHMe | CONHMe | NHMe |
| H | 8-Cl | 5-OMe | Pr | CONHMe | CONHMe | NHMe |
| 7-OMe | H | 5-OMe | H | H | CO(piperidyl) | Piperidyl |
| H | 8-Cl | 5-OMe | MeOCH₂ | CONHMe | CONHMe | NHMe |
| H | 8-Cl | 5-OH | MeOCH(Me) | H | CONHMe | NHMe |
| 7-Me | 8-Cl | 5-OH | HOCH(C₅H₁₁) | CONHMe | CONHMe | NHMe |

| X | $X_1$ | $X_2$ | A | $Y_2$ | $Y_3$ | $NR_3R_4$ |
|---|---|---|---|---|---|---|
| H | 8-$CF_3$ | H | Me | H | CONHMe | NHMe. |
| H | H | H | H | CONHMe | CONHMe | NHMe. |
| H | 8-$CF_3$ | 5-OMe | Me | H | $CONMe_2$ | $NMe_2$. |
| H | H | 5-OMe | $MeOCH_2$ | H | CO(piperidyl) | Piperidyl. |
| 7-Et | H | 5-OMe | H | H | CONHMe | $NMe_2$. |
| H | H | 5-OBu | Et | H | CO(morpholinyl) | Morpholinyl. |
| H | H | 5-OMe | H | H | $CONH_2$ | $NMe_2$. |
| H | H | 5-OEt | Me | H | $CONMe_2$ | $NMe_2$. |
| H | 8-Cl | 5-OMe | $MeOCH_2$ | CONHMe | CONHMe | NHMe. |
| H | 8-Cl | 5-OMe | $MeOCH_2$ | CONHMe | CONHMe | Morpholinyl. |
| H | 8-Cl | 5-OMe | $MeOCH_2$ | CONHMe | CONHMe | Piperidyl. |
| H | 8-Cl | 5-OMe | $MeOCH_2$ | CONHMe | CONHMe | [N-methyl-piperazyl]. |

EXAMPLE LXVI

2 - [($5^1$ - ($3^1$ - N,N - dimethylcarboxamido)isoxazolyl) methylidene] - 5 - methoxy - 8 - chloro - 3,4,10 - trioxo-1,2,3,4,4a,9,9a,10-octahydroanthracene The product of Example LXII (150 mg.) is dissolved in liquid dimethylamine (17 ml.) and held at 0° C. for 18 hours. The excess amine is then removed by evaporation under nitrogen at room temperature to give the desired product. For purification, the product is dissolved in hot chloroform and precipitated therefrom as crystals by the addition of hexane; M.P. 211–212° C.

*Analysis.*—Calc. for $C_{22}H_{19}N_2O_6Cl$ (percent): C, 59.60; H, 4.32; N, 6.32. Found (percent): C, 59.34; H, 4.47; N, 6.8.

By this procedure the corresponding carboxamido and N-methylcarboxamido compounds, and the cyclic amides from morpholine, piperidine, piperazine and N-methyl-piperazine are prepared, substituting the desired amine for dimethylamine.

EXAMPLE LXVII

The reactants utilized in the procedure of Example LXVIII are reacted under the conditions of Example LXVII to produce the corresponding unsaturated derivatives having the formula:

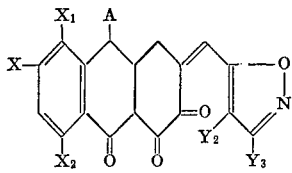

EXAMPLE LXVIII

2 - [($5^1$ - ($3^1$ - N,N - dimethylcarboxamido)-isoxazolyl) N,N - dimethylamino)methyl] - 3 - hydroxy - 5 - methoxy-8-chloro-4,10-dioxo - 1,2,3,4,4a,9,9a,10 - octahydroanthracene A solution of 2.24 g. of the Example LXII title product is dissolved in 50 ml. of liquid dimethylamine in a tightly capped polyethylene bottle and stirred at 0° C. for 18 hours. The initial red solution becomes amber and yellow crystals begin to separate after 1.5 hours. The entire mixture is added to 100 ml. of dry Ansul ether at −5° to −10° C. in a nitrogen atmosphere. 500 mg. of sodium borohydride in Ansul ether is added and the mixture stirred for 2.5 hours. Acetic acid (22 ml.) is added to the mixture which is then diluted to 250 ml. with water and then extracted several times with chloroform. The combined chloroform extracts are washed with water and evaporated to a red gum which is shaken vigorously with 50 ml. of 2 N HCl for 15–20 minutes. The mixture is filtered, the pH adjusted to 6–7 with 2 N KOH and the solution extracted 4 times with chloroform. The extracts are combined, washed with water and concentrated to yield a yellow solid which is dissolved in chloroform and precipitated as the hydrochloride by addition of HCl in ether.

EXAMPLE LXIX

2 - [($5^1$ - ($3^1,4^1$ - di-(N-methylcarboxamido)-isoxazolyl)- (N - methylamino)methyl] - 3 - hydroxy-5-methoxy-8- chloro - 4,10 - dioxo - 1,2,3,4,4a,9,9a,10 - octahydroanthracene 500 mg. of the title product of Example LXIII is added to a 3-neck flask, equipped with a magnetic stirrer, gas inlet and outlet adapters and a rubber cap, and the flask connected to a nitrogen manifold and a tank of monomethylamine. The entire system is evacuated and flushed with nitrogen several times, then monomethylamine (ca. 20 ml.) is distilled into the reaction vessel at −70° C. The mixture is maintained at −70° for 18½ hours during which time yellow crystals separate from the amber solution. Ten milliliters of monoglyme (freshly distilled from $CaH_2$) are injected through the rubber cap (into the reaction vessel), followed by a suspension of $NaBH_4$ (80 mg.) in monoglyme (ca. 5 ml.). Stirring at −70° C. is continued for 50 minutes, then the mixture is removed from the cold bath and warmed to room temperature for ten minutes. The resultant dark brown solution is poured into water (200 ml.) and acidified with acetic acid (25 ml.) to produce a yellow precipitate which is extracted from the aqueous solution with chloroform. Evaporation of the chloroform gives a gum which is dissolved in dry methanol. Hydrogen chloride is bubbled into the methanol solution which is then vigorously boiled for 0.5–1.0 hour and evaporated to a yellow foam.

Extraction of the yellow foam with 2 N HCl at room temperature gives a clear yellow solution which is extracted with chloroform. Evaporation of the washed and dried chloroform extract affords the amine alcohol as its hydrochloride salt. Further quantities are obtained by treatment of the acid insoluble material with 2 N HCl, and by adjusting the pH of the acid extracts to pH 6.0. Extraction of the turbid liquor with chloroform gives the free base.

The hydrochloride salt exhibits maxima in the ultraviolet region at

U.V.:
(260), 345 (0.01 N NCl)
(260), 360 (0.01 N NaOH)

The infrared spectrum shows diamide and β-diketone groups to be present. The product gives a positive (red brown) reaction with ferric chloride.

Repetition of this procedure using 26.24 g. of the product of Example LXIII, 500 ml. mono-methylamine, 6.54 g. sodium borohydride, but no monoglyme gives 26.7 g. of the amino alcohol product.

The sodium borohydride reduction procedures of Examples LXVIII and LXIX are applied to the reaction mixtures of Example LXV to produce the corresponding 3-hydroxy compounds of Formula XVIIa.

EXAMPLE LXX

Modified Michael Reaction—General process for isoxazole amides

2 - [($5^1$ - ($3^1,4^1$ - di-(N-methylcarboxamido)-isoxazolyl)- (N,N - dimethylamino) - methyl] - 3 - hydroxy - 5 - methoxy - 8 - chloro - 4,10 - dioxo - 1,2,3,4,4a,9,9a,10- octahydroanthracene The product of Example LXIV, 2-[($5^1$-($3^1,4^1$-di-(N-methylcarboxamido)isoxazolyl)methylidene] - 5-methoxy- 8 - chloro - 3,4,10 - trioxo - 1,2,3,4,4a,9,9a,10-octahydroanthracene, (200 mg.) is dissolved in freshly distilled dimethylamine (ca. 50 ml.) at 0° C. in an atmosphere of nitrogen, and the solution, maintained at 0° C. for 3 to 4 hours. The mixture is then cooled to −15° C., sodium borohydride (30 mg.) added with careful exclusion of air, and the resultant mixture stirred at −15° C. for 20 minutes to produce a clear brown solution. The solution is then poured into glacial acetic acid in ice and extracted with chloroform. Hydrogen chloride is bubbled into the washed and dried chloroform extracts which is then evaporated to dryness to produce a yellow foam. Extraction of the foam with 2 N HCl gives a clear yellow solution. The aqueous acid solution is extracted twice with chloroform, and the aqueous layer adjusted to pH 60 and extracted twice with chloroform. The extracts are dried with anhydrous sodium sulfate, then HCl gas added to produce a yellow solution. Evaporation of the yellow chloroform solution gives the amino alcohol as the hydrochloride.

Application of this procedure to the remaining products of Examples LXIV and LXV produces the corresponding 3-hydroxy derivatives.

EXAMPLE LXXI

2 - [($5^1$ - ($3^1,4^1$ - di - (N-methylcarboxamido)-isoxazolyl) (N,N - dimethylamino) - methyl]-3-formyloxy-5-methoxy - 8 - chloro-4,10-dioxo-1,2,3,4,4a,9,9a,10-octahydroanthracene To 0.74 g. of the product of Example LXX dissolved in 6 ml. pyridine at 0° is added 3 ml. acetoformic anhydride. The mixture is stirred for ½ hour then poured into CHCl$_3$, washed with water twice and saturated sodium chloride once, and dried over Na$_2$SO$_4$. The filtered solution is treated with activated carbon and concentrated to dryness several times with repeated addition of toluene to remove the pyridine. The residue is then taken up in chloroform, HCl bubbled in, the solution concentrated and the residue triturated with chloroform-ethyl acetate.

The remaining products of Example LXX and the products of Examples LXVIII and LXIX are converted to their formyloxy derivatives by the same procedure.

EXAMPLE LXXII

2 - [($5^1$ - ($3^1,4^1$ - di-(N-methylcarboxamido)-isoxazolyl) (N,N - dimethylamino)methyl] - 5-methoxy-8-chloro-4,10-dioxo-1,2,3,4,4a,9,9a,10-octahydroanthracene Under a nitrogen atmosphere a solution of 5 g. of the title product of Example LXXI and 30 ml. of 98% formic acid is treated for two minutes with 1.5 g. of zinc dust. The reaction mixture is filtered through Supercel and the filtrate is evaporated under reduced pressure with addition of toluene to give a residue. The residue is dissolved in chloroform, the solution saturated with hydrogen sulfide gas, and filtered through Supercel. The filtrate is reduced to a gum, dissolved in chloroform and the solution saturated with dry hydrogen chloride and filtered. The filtrate is evaporated to a gum, redissolved in a small volume of chloroform and chromatographed on Florisil. The first fraction (fluorescent) is collected, evaporated to a gum and redissolved in a small volume of chloroform. It is converted to the hydrochloride by treatment with dry HCl and the solution concentrated. The residual gum is triturated with ethyl acetate to give a crystalline yellow solid. Upon recrystallization from ethyl acetate and chloroform the pure product is obtained; M.P. 243–245° C.

The 3-formyloxy groups of the remaining compounds of Example LXXI are removed by this same procedure to give the corresponding 4,10-dioxooctahydroanthracenes.

The diamide derivatives thus produced are converted to their half lower carbalkoxy esters by refluxing in concentrated HCl followed by esterification of the thus produced half acid with, e.g. methyl, ethyl, n-propyl, isopropyl, n-butyl and benzylalcohol, with concentrated sulfuric acid as catalyst.

For example, the title diamide of this example is taken up in 10 ml. of concentrated hydrochloric acid and heated on the steam bath for three hours at 95°–98° C. The solution is then evaporated under reduced pressure to a clear gum and dried by azeotropic distillation with benzene.

The gum is dissolved in methanol (10 ml.) and chloroform (250 ml.), concentrated sulfuric acid (3 ml.) added and the mixture refluxed overnight. The cooled mixture is neutralized, the chloroform layer separated and dried over anhydrous sodium sulfate. Evaporation to dryness gives a glassy residue which is redissolved in chloroform and converted to the hydrochloride by passage of HCl gas into the solution. Evaporation of the solvent gives a frothy residue which is chromatographed on acid washed Florisil. Elution with chloroform gives a yellow oil (100 mg.) which is converted to the hydrochloride as above. The residue obtained on evaporation of the chloroform is crystallized from acetone/hexane. Infrared absorption shows an ester carbonyl (575$\mu$) and an amide (5.97$\mu$) group to be present.

The monoamides, of course, are converted to their esters by this process.

EXAMPLE LXXIII

2-[($5^1$-($3^1,4^1$-di-(N-methylcarboxamido)isoxazolyl) - N-methyl - N - formylamino)-methyl] - 3 - formyloxy-5-methoxy - 8 - chloro - 4,10 - dioxo-1,2,3,4,4a,9,9a,10-octahydroanthracene Acetoformic anhydride (5 ml.) is added dropwise to a vigorously stirred solution of the precursor amino alcohol of Example LXIX (800 mg.) in dry pyridine (30 ml.) at 0° C. The mixture is held at 0° C. for an additional 30 minutes then poured into 200 ml. of cold water. The aqueous solution is extracted with chloroform, the chloroform extract washed with water, dried with anhydrous sodium sulfate, then evaporated to give the diformylated product as a yellow foam. The product is purified by chromatography on acid washed Florisil using 5% methanol in chloroform as eluant.

The product is characterized by low solubility in acids, a red brown color reaction with ferric chloride, ultraviolet adsorption maxima at 340 m$\mu$ in acid and 355 m$\mu$ in alkaline solution, and a peak at 5.75$\mu$ in the infrared region which is not present in the infrared curve of the starting amino alcohol.

Upon repetition of this procedure using 26.7 g. of the amino alcohol of Example LXIX, 240 ml. pyridine, 120 ml. of acetoformic anhydride and 1 liter of water there is obtained 29.0 g. of crude diformyl product.

The [(N - monosubstituted amino)methyl]3-hydroxy-substituted octahydroanthracenes of Examples LXIX and LXX are converted to their diformyl derivatives in like manner.

EXAMPLE LXXIV

2-[($5^1$-($3^1,4^1$-di-(N-methylcarboxamido)isoxazolyl) - N-methyl-N-formylamino) - methyl]-5-methoxy-8-chloro-4,10-dioxo-1,2,3,4,4a,9,9a,10-octahydroanthracene (A) The diformylated product of Example LXXIII (750 mg.) is dissolved in methanol (75 ml.) and zinc chloride (230 mg.) added. Zinc dust (750 mg.) and formic acid (98%; 1.2 ml.) are added to the amber solution and the mixture stirred for 17.5 hours. It is then filtered and the filtrate evaporated. The residue is shaken with chloroform and 2 N hydrochloric acid (20 ml.) to decompose the zinc chelate. Evaporation of the chloroform gives the product as a yellow foam. It is insoluble in aqueous acid, produces a red brown color with ferric chloride and exhibits maxima in the ultra-violet region at 345 and 350 m$\mu$ in acid and alkaline solutions, respectively. It exhibits no absorption at 5.75$\mu$ in the infrared region.

For purification, the crude reaction product, free of zinc, is dissolved in chloroform and chromatographed on acid washed Florisil. The column is developed with chloroform and then eluted successively with chloroform, 1% methanol in chloroform and 1.5% methanol in chloroform; several aliquots being collected at each dilution. All aliquots are examined by descending paper chromatography in the system carbon tetrachloride saturated with formamide as mobile phase and, as stationary phase, paper dipped in a solution of 40% formamide in methanol then blotted dry. Each aliquot having material of $R_f$ value 0.2–0.25 is collected, combined and evaporated to dryness to give a yellow foam composed chiefly of the desired v-desoxy product contaminated with products of $R_f$ 0.85–0.9 and the 3-hydroxy derivative with $R_f$ 0.00.

The Florisil column is then stripped with methanol to give, upon evaporation, a dark yellow foam consisting mainly of 2 - [($5^1$ - $3^1$,$4^1$ - di(N - methylcarboxamido) isoxazolyl)-(N-methyl - N - formylamino)methyl]-3-hydroxy-5-methoxy-8-chloro - 4,10 - dioxo1,2,3,4,4a,9,9a,10-octahydroanthracene.

The 3-desoxy compound is chromatographed on a partition column in the following manner. A suspension of SuperCel in a mixture of 40 parts formamide-60 parts methanol is packed into a column under a positive nitrogen pressure to give a hard packed column. A solution of the 3-desoxy compound, dissolved in the minimum volume of formamidemethanol is added to the top of the column then washed down the column about 4 mm. The top of the column is covered with sand. The mobile phase, carbon tetrachloride saturated with formamide, is added and under a positive nitrogen pressure the column is run at a fast rate until the mobile phase overtakes the compound. The aliquots collected are examined by paper chromatography. Those containing the product with $R_f$ 0.2–0.25 and characterized by a blue-green fluorescence in the ultraviolet, a red-brown color reaction with ferric ions, are combined, shaken with water then with saturated sodium chloride solution. The carbon tetrachloride solution is dried with anhydrous sodium sulfate then evaporated to a yellow foam which is crystallized from acetone-hexane to give the pure 3-desoxy product as pale yellow prisms and clusters; M.P. 278–280° dec.

Ultraviolet absorption maxima (H+/MeOH): 345 m$\mu$, $\epsilon$=13,500; (OH−) 351 m$\mu$, $\epsilon$=13,800. The infrared curve shows 3 amide groups: 2 secondary amides and formamide.

*Analysis.*—Calcd. for $C_{25}H_{27}O_7N_4Cl$ (percent): C, 56.50; H, 5.13; N, 10.5; Cl, 6.68. Found (percent): C, 56.37; H, 5.21; N, 10.48; Cl, 6.74.

The product is hydrolyzed to the corresponding 5-hydroxy compound by treatment with 48% HBr (950 mg. in 10 ml.) on a steam bath until a clear solution results. The cooled solution is extracted with chloroform, the extract washed with water, dried and evaporated. The residue is chromatographed on acid washed Florisil, eluted with 1% methanol/$CHCl_3$ to give a yellow gum which is crystallized from acetone; M.P. sinters at 295° C., does not melt below 300° C.

The 3-0 formyl group of the products of Examples LXXI and LXXIII are removed in like manner to produce the corresponding 3-desoxy-isoxazolyl amide and ester compounds.

(B) A solution of the diformylated product of Example LXXIII (29.0 g.), fused zinc chlordie (13.1 g.) and acetic acid (700 ml.) is vigorously stirred for 15 minutes. Zinc dust (29.0 g.) is then added and the mixture stirred at room temperature for one hour. The excess zinc is removed by filtration, the filter cake washed with acetic acid and the combined filtrate and washings evaporated to dryness. The residue is shaken with 50 ml. chloroform and 50 ml. of 2 N hydrochloric acid to decompose the zinc chelate. The chloroform solution is washed several times with acid, followed by water, then evaporated to produce a yellow foam. Purification by partition chromatography as described above on a SuperCel column ($CCl_4$/DMF) gives 9.76 g. of product in the main fraction. The corresponding desdimethylamino compound (1.0 g.) is also obtained M.P. 178–180° C., from ethyl acetate.

Further purification of the remaining combined eluates affords an additional 1.6 g. of the desired product, plus 1.2 g. of the 4-desdimethylamino compound and 600 mg. of the geometric isomer of the desired product which has the reverse stereochemistry at C-4a (M.P. 306°–308° C.). An amorphous residue (6.5 g.) of the two isomers is also obtained. The isomers have identical ultraviolet and infrared spectra but are distinguishable by paper chromatography in the system carbon tetrachloride:acetic acid:water (10:7:3). The desired product has $R_f$ 0.55 and its isomer $R_f$ 0.4.

EXAMPLE LXXV 2-(5′-3′,4′-di-(N - methylcarboxamido)isoxazolyl) - (N-methylamino)-methyl]-5-methoxy - 8 - chloro-4,10-dioxo-1,2,3,4,4a,9,9a,10-octahydroanthracene The title product of Example LXXIV (500 mg.) dissolved in 60 ml. anhydrous methanol is saturated with dry hydrogen chloride then refluxed for 18 hours under nitrogen. The mixture is evaporated to dryness, the residue taken up in water and extracted with chloroform. The extract is washed with water, dried with anhydrous sodium sulfate and evaporated to give the hydrochloride salt of the N-monomethyl amine product. It is purified by crystallization from methanol as yellow prisms. Ultraviolet absorption maxima (H+) 345 m$\mu$: (OH−) 350 m$\mu$, $\epsilon$=13,600; M.P. 244–246° dec.

*Analysis.*—Calcd. for $C_{24}H_{27}O_6N_4Cl.HCl.CH_3OH$ (percent): C, 52.54; H, 5.65; N, 9.80; Cl, 12.41. Found (percent): C, 52.29; H, 5.69; N, 9.86; Cl, 12.50.

This product is acetylated by conversion to the free base by treatment with aqueous sodium bicarbonate. The free base is separated, dissolved in 30 ml. of acetic anhydride and the mixture refluxed for one hour. Evaporation to dryness gives the crude N-acetyl derivative which is purified by chromatography on acid washed Florisil and elution with 1% methanol/chloroform. The eluate is taken to dryness, the residue dissolved in 30 ml. warm benzene and the product precipitated therefrom by the slow addition of hexane. M.P. 200–206° C.

By means of this procedure the remaining N-formyl derivatives of Example LXXIV are converted to the corresponding N-monosubstituted amines and N-acetyl derivatives. Substitution of acetic anhydride by the anhydrides of propionic and butyric acids affords the corresponding N-propionyl and N-butyryl derivatives. Similarly, the secondary amines of Examples LXV, LXIX and LXXI are acylated.

EXAMPLE LXXVI

2-[(5′-(3′,4′-di-(N - methylcarboxamido)isoxazolyl)-(N, N-dimethyl-amino)-methyl] - 5 - methoxy-8-chloro-4, 10-dioxo-1,2,3,4,4a,9,9a,10-octahydroanthracene The hydrochloride salt of the N-monomethylamino product of Example LXXV (1.5 g.) is dissolved in 75 ml. of ethylacetate-water (2–1) with stirring. Sodium bicarbonate (1.5 g.) is then added followed by the dropwise addition under nitrogen of dimethylsulfate (660 mg.) in 15 ml. ethylacetate over a one hour period at room temperature. The reaction mixture is stirred vigorously throughout the addition and for 45 minutes thereafter. The two layers are separated, the ethylacetate phase washed once with saturated sodium bicarbonate then water and evaporated to dryness. The residue is purified by chromatography on Florisil using chloroform as eluant. The free base has the $R_f$ value 0.65–0.7 in the system: cyclohexane (4): benzene (1): saturated with formamide as mobile phase and paper dipped in a solution of 40% formamide in methanol then blotted dry as the stationary phase. (The unchanged N-mono-methylamine compound has $R_f$ value of 0.25–0.3 in this system.)

The desired product, M.P. 168–171° C. from acetone, and its geometrical isomer, M.P. 286–287° C. (dec.)

from acetone, are obtained in 55% and 8% yield, respectively.

*Analysis.*—Calcd. for $C_{25}H_{29}O_6N_4Cl$ (percent): C, 58.08; H, 5.65; N, 10.93; Cl, 6.86. Found (percent) (desired product): C, 58.30; H, 5.77; N, 10.61; Cl, 6.65. (Geometrical isomer) (percent): C, 57.85; H, 5.98; N, 10.53; Cl, 6.79.

The dimethylamino product exhibits absorption maxima in the ultraviolet (H+) 345 mμ; (OH−) 352 mμ. The infrared curve shows two secondary amide groups and β-diketone groups to be present. M.P. 144–146° dec.

The remaining N-monosubstituted amines of Example LXXV are methylated in like manner.

EXAMPLE LXXVII

3'-carbethoxy-6-demethyl-6,12a-dideoxy - 7 - chloro-2,3-tetracycline-4',5'-isoxazole-10-methyl ether (A) 2-[2'-(3',4'-dicarbethoxy-isoxazolyl) (N,N - dimethylamino)-methyl]-5-methoxy - 8 - chloro-4,10-dioxo-1,2,3,4,4a,9,9a,10-octahydroanthracene (prepared according to the procedure of Example LXXII) (500 mg.) dissolved in 5 ml. of dry redistilled dimethylformamide is treated with an excess (290 mg. of 50% dispersion in oil) of sodium hydride. Immediate vigorous effervescence of hydrogen occurs with formation of a red-brown solution of the sodium salt. The mixture is warmed on an oil bath to 92–100° C. for three minutes. The reaction is vigorous with evolution of hydrogen and formation of a light amber solution. When gas evolution ceases, the mixture is sealed and stirred at room temperature for 2 hours during which time an amber solution with a green fluoresence develops, and yellow crystals separate. The mixture is acidified with 5 ml. of acetic acid then evaporated to dryness in vacuo. The crude product is dissolved in chloroform, the chloroform solution washed twice with water then dried and evaporated to dryness. The crude cyclized product crystallizes and is dissolved in methanol. The methanol solution is extracted with hexane and the hexane extract back extracted with methanol. The combined methanol solutions are concentrated, diluted with ether and seeded. The product separates as red prisms and is removed by filtration. Evaporation of the filtrate gives additional product.

The remaining isoxazolyl octahydroanthracene esters of Examples LXXII, LXXIV and LXXVI wherein $Y_2$ is other than hydrogen are cyclized to their corresponding tetracycline isoxazole derivative in like manner.

(B) Octahydroanthracene amide products of Examples LXXII, LXXIV and LXXVI are converted to their tetracyclino isoxazolyl derivatives by the procedure exemplified below using triethyloxonium fluoborate and sodium hydride.

The methanol solvate of 2-[5'-(3',4-di-(N-methylcarboxamido)-isoxazolyl)-(N-methyl - amino)-methyl]-5-methoxy-8-chloro - 4,10 - dioxo-1,2,3,4,4a,9,9a,10-octahydroanthracene hydrochloride the product of Example LXXV) (300 mg.) is suspended in chloroform (50 ml.). Triethyloxonium fluoborate (224 mg.) is added under dry nitrogen and the mixture refluxed overnight. A yellow crystalline solid having a very intense green-blue fluorescence separated from the hot mixture. Sodium hydride (4 milliequivalents) is added and the mixture refluxed an additional 30 minutes. After the initial reaction subsides more sodium hydride (4 meq.) followed by methanol is added. A vigorous reaction occurred and the yellow solid dissolved. A white solid then separates. This becomes brown accompanied by a vigorous evolution of gas. The reaction mixture is poured into acetic acid, diluted with water and extracted with chloroform. (A very strong odor of methyl isonitrile is noted at this point.) The chloroform extract is washed with water, dried and evaporated to dryness to give 303 mg. of an amber solid. It is purified by thin layer chromatography using silica gel and ethylacetate. Crystallization from methanol gives yelloworange needles of 3'-N-methylcarboxamido-4-(N-methyl-N-ethylamino) - 6 - demethyl-6,12a-dideoxy-7-chloro-2,3-tetraclino-4',5'-isoxazole-10-methyl ether.

Alternatively, substitution of other trialkyl-oxonium fluoborates for triethyloxonium fluoborate produces the corresponding 4-(N-alkyl-N-methylamino) compound. Trimethyl-, tri-n-butyl-, tripropyloxonium fluoborates produce the corresponding N,N-dimethyl-, N-methyl-N-butyl- and N-methyl-N-propyl-amino compounds.

In the case of compounds containing active hydrogen, one additional molar proportion of sodium hydride is added per mole of active hydrogen.

The following fused isoxazole compounds are thus produced.

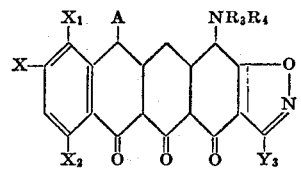

| X | $X_1$ | $X_2$ | A | $Y_3$ | $NR_3R_4$ |
|---|---|---|---|---|---|
| 7-NMe₂ | 8-Cl | 5-OMe | H | CONHMe | NME₂ |
| 7-i-Pr | H | 5-OMe | H | CONHMe | EtNMe |
| 7-Et | 8-Et | 5-OH | H | CONHMe | NME₂ |
| H | H | 5-OBz | H | CONHMe | NMe₂ |
| 7-NMe₂ | H | 5-OH | H | CONHMe | MeNBu |
| 7-NMe₂ | H | 5-OH | H | CONHMe | NME₂ |
| H | 8-Et | 5-OMe | H | COOMe | NMe₂ |
| H | 8-NMe₂ | 5-OMe | H | COOEt | NMe₂ |
| H | 8-NH₂ | 5-OMe | H | COOEt | NMe₂ |
| H | 8-NHCOMe | 5-OMe | H | COOEt | NMe₂ |
| H | H | 5-OMe | H | COOMe | Piperidyl |
| H | H | 5-OH | H | COOBz | Piperazyl |
| 7-NH₂ | H | 5-OMe | H | COOBu | NMe₂ |
| 7-Pr | H | 5-OMe | H | COOEt | NMe₂ |
| 7-Me | H | 5-OMe | H | COOMe | Morpholinyl |
| 7-Me | 8-Me | H | H | COOPr | NHMe |
| H | 8-NH₂ | 5-OBz | H | COOEt | NMe₂ |
| H | 8-Pr | 5-OPr | H | COOEt | NHMe |
| H | H | 5-OMe | Me | COOMe | NMe₂ |
| H | H | 5-OMe | Et | COOMe | NMe₂ |
| H | H | 5-OMe | Pr | COOMe | NMe₂ |
| H | H | H | H | COOMe | NMe₂ |
| H | 8-Cl | 5-OMe | H | COOMe | NHMe |
| 7-Me | 8-Me | 5-OH | H | COOMe | NMe₂ |
| H | H | 5-OH | Me | COOMe | NHMe |
| 7-NMe₂ | 8-Cl | 5-OMe | H | COOEt | NMe₂ |
| 7-OMe | 8-Cl | H | H | COOMe | Morpholinyl |
| 7-NHCOCH₃ | 8-Cl | 5-OMe | H | COOEt | NMe₂ |
| 7-NHCOCH₃ | 8-Cl | 5-OMe | H | COOEt | NMe₂ |
| 7-OH | 8-Cl | 5-OH | H | COOAm | Piperazyl |

| X | X₁ | X₂ | A | Y₃ | NR₃R₄ |
|---|---|---|---|---|---|
| 7-CF₃ | H | 5-OH | H | COOMe | NMe₂ |
| 7-OBz | H | H | Me | COOPr | NMe₂ |
| 7-i-Pr | 8-Cl | 5-OH | H | COOBz | NHMe |
| H | 8-CF₃ | 5-OH | H | COOEt | Morpholinyl |
| H | H | 5-OBz | H | COOPr | NMe₂ |
| H | H | 5-OH | i-Pr | COOMe | NMe₂ |
| 7-CF₃ | 8-CF₃ | 5-OMe | H | COOMe | NMe₂ |
| 7-EtCO₂ | 8-Me | H | EtOCH(Me) | COOMe | NMe₂ |
| 7-OBu | 8-CF₃ | 5-OBu | H | COOEt | NHMe |
| 7-NHEt | 8-CF₃ | 5-OMe | H | COOEt | NHMe |
| 7-NHCOC₃H₇ | H | H | H | COOEt | NHMe |
| 7-MeCO₂ | 8-Cl | 5-OEt | Et | COOBu | NMe₂ |
| 7-Me | 8-Cl | 5-OH | H | COOMe | NMe₂ |
| H | 8-NHMe | 5-OPr | H | COOMe | NMe₂ |
| H | 8-Cl | 5-OBz | H | COOMe | NMe₂ |
| 7-Me | 8-Cl | 5-OMe | H | COOPr | NMe₂ |
| 7-NH₂ | 8-Cl | 5-OMe | H | COOBz | NMe₂ |
| 7-Et | 8-Cl | 5-OMe | H | COOBz | NMe₂ |
| H | 8-Cl | 5-OMe | Me | COOBz | Morpholinyl |
| H | 8-Cl | 5-OMe | Et | COOMe | NMe₂ |
| H | 8-Cl | 5-OMe | Pr | COOMe | NMe₂ |
| 7-Me | 8-Cl | 5-OH | HOCH(C₅H₁₁) | COOMe | NMe₂ |
| H | 8-CF₃ | H | Me | COOMe | NMe₂ |
| H | 8-CF₃ | 5-OMe | Me | COOPr | NMe₂ |
| H | 8-Cl | 5-OMe | H | COOMe | Morpholinyl |
| H | 8-Cl | 5-OMe | MeOCH₂ | COOEt | NMe₂ |
| H | 8-Cl | H | H | COOEt | NMe₂ |
| H | 8-Et | 5-OMe | H | CONHMe | NMe₂ |
| H | 8-NMe₂ | 5-OMe | H | CONHMe | NHMe |
| H | 8-NH₂ | 5-OMe | H | CONMe₂ | NMe₂ |
| H | 8-NHCOMe | 5-OMe | H | CONH₂ | NMe₂ |
| 7-Me | H | 5-OMe | H | CO(piperidyl) | Piperidyl |
| H | H | 5-OH | H | CO(piperazyl) | Piperazyl |
| 7-Me | H | 5-OMe | H | CO(morpholinyl) | Morpholinyl |
| 7-Me | 8-Me | H | H | CONHMe | NHMe |
| H | 8-Pr | 5-OPr | H | CONHMe | NHMe |
| H | H | 5-OMe | Me | CONHMe | NHMe |
| H | H | 5-OMe | Et | CONHMe | NHMe |
| H | H | 5-OMe | Pr | CONHMe | NHMe |
| H | H | H | H | CO[N-(methyl)-piperazyl] | [N-(methyl)-piperazyl] |
| H | H | H | H | CO[N-(butyl)-piperazyl] | [N-(butyl)-piperazyl] |
| H | 8-Cl | 5-OMe | H | CONH₂ | NMe₂ |
| H | 8-Cl | 5-OMe | H | CONHMe | NHMe |
| 7-OMe | 8-Cl | H | H | CONHMe | NHMe |
| 7-NHCOCH₃ | 8-Cl | 5-OMe | H | CONHMe | NHMe |
| 7-NHCOCH₃ | H | 5-OMe | H | CONHMe | NHMe |
| H | H | 5-OMe | H | CONH₂ | EtNH |
| H | H | 5-OH | i-Pr | CONHMe | NHMe |
| H | H | 5-OMe | Me | CONHMe | NHMe |
| 7-OBu | 8-CF₃ | 5-OBu | H | CONH₂ | NMe₂ |
| 7-NHEt | 8-CF₃ | 5-OMe | H | CONHMe | NMe₂ |
| 7-MeCO₂ | 8-Cl | 5-OEt | Et | CONHMe | NHMe |
| H | 8-CF₃ | H | Me | CO(morpholinyl) | Morpholinyl |
| 7-Me | 8-Cl | 5-OH | H | CO(piperazyl) | Piperazyl |
| H | 8-NHMe | 5-OPr | H | CO(piperidyl) | Piperidyl |
| 7-NH₂ | 8-Cl | 5-OMe | H | CONHMe | NMe₂ |
| 7-Et | 8-Cl | 5-OMe | H | CONHMe | NMe₂ |
| H | 8-Cl | 5-OMe | Me | CONH₂ | NMe₂ |
| H | 8-Cl | 5-OMe | Et | CONHMe | NMe₂ |
| 7-Me | 8-Cl | 5-OH | HOCH(C₅H₁₁) | CONHMe | NMe₂ |
| H | 8-CF₃ | 5-OMe | Me | CONMe₂ | NMe₂ |
| H | 8-Cl | 5-OMe | MeOCH₂ | CONHMe | NHMe |
| H | 8-Cl | H | H | CONMe₂ | NMe₂ |
| H | 8-Cl | 5-OMe | MeOCH₂ | CONHMe | Morpholinyl |
| H | 8-Cl | 5-OMe | MeOCH₂ | CONHMe | Piperidyl |
| H | 8-Cl | 5-OMe | MeOCH₂ | CONHMe | N-methylpiperazyl |

The amido substituted isoxazolyl octahydroanthracenes of Example LXV are similarly converted to their corresponding fused isoxazoles. For convenience, however, these products are not tabulated.

EXAMPLE LXXVIII

3¹-carboxy-6-demethyl-6,12a-dideoxy-7-chloro-2,3-tetracyclino-4¹-5¹-isoxazole-10-methyl ether

METHOD A

3¹ - carbethoxy - 6 - demethyl-6,12a-dideoxy-7-chloro-2,3-tetracyclino-4¹,5¹-isoxazole-10-methyl ether, 2 g., is refluxed in 50 ml. of a 1:5:2 mixture of sulfuric acid:acetic acid:water for 9 hours. The mixture is then poured into 10 volumes of water, neutralized to Congo red and concentrated to dryness under reduced pressure. The product is extracted from the resulting salt mixture with boiling ethanol and recovered by concentrating the separated extract at reduced pressure until crystallization occurs.

METHOD B 2 g. of the Method A ester starting compound is stirred for one hour at room temperature in 50 ml. of 1:3 by volume 48% HBr:acetic acid, and the mixture is then concentrated in vacuum to obtain the product in the form of a hydrobromide salt.

METHOD C

The procedure of Method B is repeated but using a temperature of at least 70° C. Concomitant cleavage of the 10-methyl ether group occurs to give the phenol.

The remaining products of Example LXXVII are similarly hydrolyzed to give the corresponding free carboxy acids.

EXAMPLE LXXIX 2-decarboxamido-6-demethyl-6,12a-dideoxy-7-chloro-tetracycline-2-nitrile-10-methyl ether

METHOD A

One gram of 3¹-carbethoxy-6-demethyl-6,12a-dideoxy-7-chloro-2,3-tetracyclino-4¹,5¹-isoxazole-10-methyl ether, (Example LXXVII) in 40 ml. of 50% ethanol containing 4 ml. of conc. NH₄OH and 2 g. of copper powder is refluxed under nitrogen for 15 minutes. The resulting copper chelate precipitate is filtered and then dissolved in aqueous sulfuric acid. Extraction of the mixture with chloroform followed by water-washing, drying and concentration gives the product.

METHOD B

A solution of 4.87 g. (0.01 mole) of 3¹-(N-methylcarboxamido) - 6 - demethyl-6,12a-dideoxy-7-chloro-2,3-tetracylino - 4¹,5¹ - isoxazole-10-methyl ether together with 3.36 g. (0.06 mole) potassium hydroxide, 2.68 g. ZnCl₂ in methanol is heated under reflux for one hour. During this period the starting compound is hydrolyzed and the carboxylate anion loses carbon dioxide with concomitant cleavage of the isoxazole ring. The reaction mixture is then neutralized by addition of 1.8 g. (0.03 mole) of glacial acetic acid, and evaporated under reduced pressure. The residue is shaken with a mixture of chloroform and water, the chloroform layer is separated, and the water layer is exhaustively extracted with fresh chloroform. All chloroform extracts are combined, and dried over anhydrous sodium sulfate. After filtration, the chloroform is evaporated to obtain the desired product as residue. It is purified by recrystallization from hot aqueous methanol.

Any 1,2-tetracyclino isomer present in the starting compound is also converted to the desired product in the foregoing procedure.

METHOD C

The $3^1$ - (N-methylcarboxamido)-6-demethyl-6,12a-dideoxy - 2,3-tetracyclino-$4^1$,$5^1$-isoxazole-10-methyl ether of Example LXXVII is dissolved in 5% ethanolic magnesium ethoxide containing 10% water, three molar equivalents of base being used. The mixture is warmed at 50° C. for one hour and is then carefully acidified and worked up as in Method A to give the corresponding tetracycline derivative.

METHOD D

The analogous 7-chloro-10-benzyl ether and other derivatives are also prepared following the above procedures, substituting the corresponding fused isoxazoles of Example LXXVII and LXXVIII for the above-employed starting compounds.

METHOD E

The product of Example LXXVII is dissolved in dimethoxyethane and treated with 3 equivalents of LiN(CH₃)₂ at 50° C. for one hour. The mixture is then worked according to Method C.

EXAMPLE LXXX

3 - hydroxy - 5 - methoxy-8-chloro-4,10-dioxo-1,2,3,4,4a-9,9a,10 - octahydroanthracene - 2 - [α-(N,N-dimethylamino)acetonyl-γ-nitrile]

This compound is prepared from the product of Example XLXX 2 - [($5^1$ - ($3^1$,$4^1$ - di-(N-methylcarboxamido) - isoxazolyl)(N,N-dimethylamino)methyl]-3-hydroxy - 5-methoxy-8-chloro-4,10-dioxo-1,2,3,4,4a,9,9a,10-octahydroanthracene by the procedure of Example LXXIX–A. The remaining products of Example LXX and those of Examples LXVIII and LXIX are similarly converted to their corresponding derivatives by the procedures of Example LXXIX.

EXAMPLE LXXXI

5 - methoxy - 8-chloro-4,10-dioxo-1,2,3,4,4a,9,9a,10-octahydroanthracene - 2-[α-(N,N-dimethylamino)acetonyl-γ-nitrile]

This product is prepared from 2-[($5^1$-($3^1$-carbethoxy)-isoxazolyl) - (N,N-dimethylamino)methyl]-5-methoxy-8-chloro - 4,10 - dioxo - 1,2,3,4,4a,9,9a,10-octahydroanthracene (prepared by the procedure of Example LXXII) by hydrolysis to the carboxylic acid and cleavage of the isoxazole ring by the methods of Example LXXIX.

Application of this procedure to the remaining products of Example LXXII produces the corresponding derivatives of Formula XXII wherein $Y_1$ and $Y_2$ are hydrogen.

Alternatively, this product is prepared from 2-[(5'-(3'-(N - methylcarboxamido) - isoxazolyl) - (N,N-dimethylamino)methyl] - 5 - methoxy-8-chloro-4,10-dioxo-1,2,3,4,4a,9,9a,10-octahydroanthracene by hydrolysis to the 3-carboxylic acid by the procedure of Example LXXVIII–A followed by cleavage of the isoxazole ring by the method of Example LXXIX–A.

EXAMPLE LXXXII

5 - methoxy - 8-chloro-4,10-dioxo-1,2,3,4,4a,9,9a,10-octahydroanthracene - 2 - [α-(N-formyl-N-methylamino) acetonyl-γ-N-methylcarboxamide-γ-nitrile]

The title product of Example LXXIV (2.0 g. dissolved in 40 ml. of dry redistilled dimethylformamide is treated with an excess (360 mg. of 50% dispersion in oil) of sodium hydride. Immediate vigorous effervescence of hydrogen occurs with formation of a red-brown solution of the sodium salt. The mixture is stirred at 20° C. for 10 minutes then warmed on an oil bath to 90° C. for 25 minutes. The reaction is vigorous with evolution of hydrogen and formation of a light amber solution. When gas evolution ceases, the mixture is cooled, acidified with 2 N HCl and extracted with chloroform. The chloroform solution is evaporated and the residue chromatographed on acid washed Florosil. Elution of the column with 1% methanol in chloroform gives 640 mg. of reactant. Elution with 5–10% methanol in chloroform produces 1.12 g. of the desired acyl malonate as an amorphous solid. It is obtained in crystal form by chromatography on silicic acid with the above solvents, followed by crystallization from ethylacetate/hexane; M.P. 249–250° C.

The use of an excess of sodium hydride produces the tetracyclic product 5' - (acetyl-β-cyano-β-N-methyl carboxamido) - 6-demethyl-6,12a-dideoxy-7-chloro-2,3-tetracyclino-3',4'-Δ²'-pyrroline-10-methyl ether as its sodium salt.

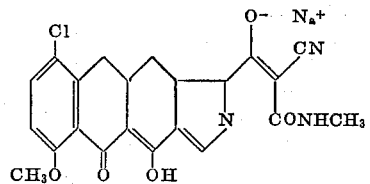

A chloroform solution of the acyl malonate (500 mg.) when saturated with HCl, refluxed overnight then evaporated to dryness produces 2-[(5'(2'-amino-3'-N-methyl-carboxamido - 4' - oxo) 1'-(N-methyl)Δ²'-pyrrolinyl]5-methoxy - 8 - chloro-4,10-dioxo-1,2,3,4,4a,9,9a,10-octahydroanthracene.

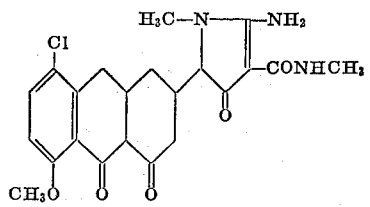

The residue is taken up in chloroform, the solution washed with water then chromatographed on acid washed Florisil. Elution with 5% methanol in chloroform gives 375 mg. of a yellow gum which is obtained as crystals from ethylacetate; M.P. 287–288° C.

Analysis.—Calcd. for $C_{22}H_{24}O_5N_3Cl$ (percent): C, 59.10; H, 5.42; N, 9.41. Found (percent): C, 59.00; H, 5.39; H, 9.51.

The remaining isoxazolyl octahydroanthracene amides and esters of Examples LXXII, LXXIV, LXXV, LXXVI and LXXVII are converted to their corresponding acyl malonate derivatives in like manner.

In the case of compounds containing active hydrogen, one additional molar proportion of sodium hydride is added per mole of active hydrogen.

The following acyl malonate compounds are thus produced.

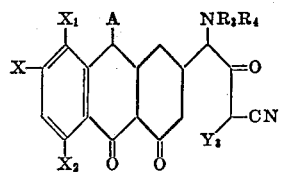

| X | X₁ | X₂ | A | Y₃ | NR₃R₄ |
|---|---|---|---|---|---|
| H | 8-Et | 5-OMe | H | COOMe | NMe₂. |
| H | 8-NMe₂ | 5-OMe | H | COOEt | NMe₂. |
| H | 8-NH₂ | 5-OMe | H | COOEt | NMe₂. |
| H | 8-NHCOMe | 5-OMe | H | COOEt | NMe₂. |
| H | H | 5-OMe | H | COOME | Piperidyl. |
| H | H | 5-OH | H | COOBz | Piperazyl. |
| 7-NH₂ | H | 5-OMe | H | COOBu | NMe₂. |
| 7-Pr | H | 5-OMe | H | COOEt | NMe₂. |
| 7-Me | H | 5-OMe | H | COOMe | Morpholinyl. |
| 7-Me | 8-Me | H | H | COOPr | NHMe. |
| H | 8-NH₂ | 5-OBz | H | COOEt | NMe₂. |
| H | 8-Pr | 5-OPr | H | COOEt | NHMe. |
| H | H | 5-OMe | Me | COOMe | NMe₂. |
| H | H | 5-OMe | Et | COOMe | NMe₂. |
| H | H | 5-OMe | Pr | COOMe | NMe₂. |
| H | H | H | H | COOMe | NMe₂. |
| H | 8-Cl | 5-OMe | H | COOMe | NHMe. |
| 7-Me | 8-Me | 5-OH | H | COOMe | NMe₂. |
| H | H | 5-OH | Me | COOMe | NHMe. |
| 7-NMe₂ | 8-Cl | 5-OMe | H | COOEt | NMe₂. |
| 7-OMe | 8-Cl | H | H | COOMe | Morpholinyl. |
| 7-NHCOCH₃ | 8-Cl | 5-OMe | H | COOMe | NMe₂. |
| 7-NHCOCH₃ | H | 5-OMe | H | COOEt | NMe₂. |
| 7-OH | 8-Cl | 5-OH | H | COOAm | Piperazyl. |
| 7-CF₃ | H | 5-OH | H | COOMe | NMe₂. |
| 7-OBz | H | H | Me | COOPr | NMe₂. |
| 7-i-Pr | 8-Cl | 5-OH | H | COOBz | NHMe. |
| H | 8-CF₃ | 5-OH | H | COOEt | Morpholinyl. |
| H | H | 5-OBz | H | COOPr | NMe₂. |
| H | H | 5-OH | i-Pr | COOMe | NMe₂. |
| 7-CF₃ | 8-CF₃ | 5-OMe | H | COOMe | NMe₂. |
| 7-EtCo₂ | 8-Me | H | EtOCH(Me) | COOMe | NMe₂. |
| 7-OBU | 8-CF₃ | 5-OBu | H | COOEt | NHMe. |
| 7-NHEt | 8-CF₃ | 5-OMe | H | COOEt | NHMe. |
| 7-NHCOC₃H₇ | H | H | H | COOEt | NHMe. |
| 7-MeCO₂ | 8-Cl | 5-OEt | Et | COOBu | NMe₂. |
| 7-Me | 8-Cl | 5-OH | H | COOMe | NMe₂. |
| H | 8-NHMe | 5-OPr | H | COOMe | NMe₂. |
| H | 8-Cl | 5-OBz | H | COOMe | NMe₂. |
| 7-Me | 8-Cl | 5-OMe | H | COOPr | NMe₂. |
| 7-NH₂ | 8-Cl | 5-OMe | H | COOBz | NMe₂. |
| 7-Et | 8-Cl | 5-OMe | H | COOBz | NMe₂. |
| H | 8-Cl | 5-OMe | Me | COOBz | Morpholinyl. |
| H | 8-Cl | 5-OMe | Et | COOMe | NMe₂. |
| H | 8-Cl | 5-OMe | Pr | COOMe | NMe₂. |
| 7-Me | 8-Cl | 5-OH | HOCH-(C₅H₁₁) | COOMe | NMe₂. |
| H | 8-CF₃ | H | Me | COOMe | NMe₂. |
| H | 8-CF₃ | 5-OMe | Me | COOPr | NMe₂. |
| H | 8-Cl | 5-OMe | H | COOMe | Morpholinyl. |
| H | 8-Cl | 5-OMe | MeOCH₂ | COOEt | NMe₂. |
| H | 8-Cl | H | H | COOEt | NMe₂. |
| H | 8-Et | 5-OMe | H | CONH₂ | NMe₂. |
| H | 8-NMe₂ | 5-OMe | H | CONHMe | NHMe. |
| H | 8-NH₂ | 5-OMe | H | CONMe₂ | NMe₂. |
| H | 8-NHCOMe | 5-OMe | H | CONH₂ | NMe₂. |
| 7-Me | H | 5-OMe | H | CO(piperidyl) | Piperidyl. |
| H | H | 5-OH | H | CO(piperazyl) | Piperazyl. |
| 7-Me | H | 5-OMe | H | CO(morpholinyl) | Morpholinyl. |
| 7-Me | 8-Me | H | H | CONHMe | NHMe. |
| H | 8-Pr | 5-OPr | H | CONHMe | NHMe. |
| H | H | 5-OMe | Me | CONHMe | NHMe. |
| H | H | 5-OMe | Et | CONHMe | NHMe. |
| H | H | 5-OMe | Pr | CONHMe | NHMe. |
| H | H | H | H | CO[N-(methyl)-piperazyl] | [N-(methyl)-piperazyl]. |
| H | H | H | H | CO[N-(butyl)-piperazyl] | [N-(butyl)-piperazyl]. |
| H | 8-Cl | 5-OMe | H | CONH₂ | NMe₂. |
| H | 8-Cl | 5-OMe | H | CONHMe | NHMe. |
| 7-OMe | 8-Cl | H | H | CONHMe | NHMe. |
| 7-NHCOCH₃ | 8-Cl | 5-OMe | H | CONHMe | NHMe. |
| 7-NHCOCH₃ | H | 5-OMe | H | CONH₂ | EtNMe. |
| H | H | 5-OH | i-Pr | CONHMe | NHMe. |
| H | H | 5-OMe | Me | CONHMe | NHMe. |
| 7-OBu | 8-CF₃ | 5-OBu | H | CONH₂ | NMe. |
| 7-NHEt | 8-CF₃ | 5-OMe | H | CONHMe | NMe₂. |
| 7-MeCO₂ | 8-Cl | 5-OEt | Et | CONHMe | NHMe. |
| H | 8-CF₃ | H | Me | CO(morpholinyl) | Morpholinyl. |
| 7-Me | 8-Cl | 5-OH | H | CO(piperazyl) | Piperazyl. |
| H | 8-NHMe | 5-OPr | H | CO(piperidyl) | Piperidyl. |
| 7-NH₂ | 8-Cl | 5-OMe | H | CONHMe | NMe₂. |
| 7-Et | 8-Cl | 5-OMe | H | CONHMe | NMe₂. |
| H | 8-Cl | 5-OMe | Me | CONH₂ | NMe₂. |
| H | 8-Cl | 5-OMe | Et | CONHMe | NMe₂. |
| 7-Me | 8-Cl | 5-OH | HOCH(C₅H₁₁) | CONHMe | NMe₂. |
| H | 8-CF₃ | 5-OMe | Me | CONMe₂ | NMe₂. |
| H | 8-Cl | 5-OMe | MeOCH₂ | CONHMe | NHMe. |
| H | 8-Cl | H | H | CONMe₂ | NMe₂. |
| H | 8-Cl | 5-OMe | MeOCH₂ | CONHMe | Morpholinyl. |
| H | 8-Cl | 5-OMe | MeOCH₂ | CONHMe | Piperidyl. |
| H | 8-Cl | 5-OMe | MeOCH₂ | CONHMe | N-methylpiperazyl. |
| 7-NMe₂ | 8-Cl | 5-OMe | H | CONHMe | NMe₂. |
| 7-i-Pr | H | 5-OMe | H | CONHMe | EtNMe. |
| 7-Et | 8-Et | 5-OH | H | CONHMe | NMe₂. |
| H | H | 5-OBz | H | CONHMe | NMe₂. |
| 7-NMe₂ | H | 5-OH | H | CONHMe | MeNBu. |
| 7-NMe₂ | H | 5-OH | H | CONH₂ | NMe₂. |

71

The amido substituted isoxazolyl octahydroanthracenes of Example LXV are similarly converted to their corresponding acyl malonates. For convenience, however, these products are not tabulated.

EXAMPLE LXXXIII

5 - methoxy-8-chloro-4,10-dioxo-1,2,3,4,4a,9,9a,10-octahydroanthracene - 2 - [α-(N,N-dimethylamino)acetonyl-γ-N-methylcarboxamide-γ-nitrile]

This product is prepared from the title product of Example LXXII by the procedure of Method A, Example LXXIX.

EXAMPLE LXXXIV

5 - benzyloxy - 4,10 - dioxo - 1,2,3,4,4a,9,9a,10-octahydroanthracene - 2 - [α-(N,N-dimethylamino)-acetonyl-γ-nitrile-γ-N-methylcarboxamide]

This product is prepared from the corresponding product of Example LXXII by treatment with copper and ammonium hydroxide (Method A, Example LXXIX).

EXAMPLE LXXXV

2 - decarboxamido - 6 - demethyl - 6,12a-dideoxy-7-chlorotetracycline-2-nitrile-10-methyl ether A solution of (0.01 mole) of 5-methoxy-8-chloro-4,10-dioxo - 1,2,3,4,4a,9,9a,10 - octahydroanthracene - 2-(α-dimethylaminoacetonyl)-γ-carbomethoxy-γ - nitrile and 25 cc. of dry N,N-dimethylformamide is cautiously treated with (0.10 mole) of sodium hydride as a 50% dispersion in mineral oil. When the exothermic reaction has subsided, the reaction mixture is heated on a steam bath until 15 minutes after hydrogen evolution ceases. 50 cc. of glacial acetic acid is then carefully added and the dimethylformamide is removed from the reaction mixture by evaporation at 1 mm. pressure (bath temperature 50–75°). The residue is taken up in chloroform, the chloroform solution washed with water and brine. The organic solution is dried and evaporated under reduced pressure to give the desired product. Alternatively, the product is purified by chromatography on Florisil using chloroform as solvent and eluting therefrom with chloroform containing 2% methanol. The fractions containing the desired product are identified by their deep green fluorescence.

Following the same procedure, the corresponding octahydroanthracene-2-(α - dimethylaminoacetonyl)-γ,γ-dinitrile is converted to 2-decarboxamido-1-imido-6-dimethyl-6,12a-dideoxy - 7 - chlortetracycline - 2 - nitrile-10-methyl ether; the corresponding γ-carboxamido, γ-carbethoxy compound is converted to 6-demethyl-6,12a-dideoxy-7-chlortetracycline-10-methyl ether; and the corresponding γ-cyano, γ-carbethoxy compound is converted to 2-decarboxamido-6-demethyl - 6,12a - dideoxy-7-chlortetracycline-2-nitrile-10-methyl ether.

EXAMPLE LXXXVI 3,4-cyclic carbonate of 2-[(5¹-(3¹,⁴'-dicarbethoxy)-isoxazolyl)(N,N - dimethylamino)methyl]-3-hydroxy-5-methoxy-8-chloro - 4,10 - dioxo-1,2,3,4,4a,9,9a,10-octahydroanthracene (A) A solution of 0.01 mole of the product of Example LXX in 25 ml. of anhydrous pyridine is treated with 10 ml. of a solution of 0.011 mole phosgene in 5 cc. of toluene at 0° C. and the temperature allowed to reach room temperature. After two hours at room temperature, three volumes of water are added and the mixture then extracted with chloroform, the chloroform extract washed with water and brine, then dried and evaporated to dryness in vacuo. The cyclic carbonate product having the formula

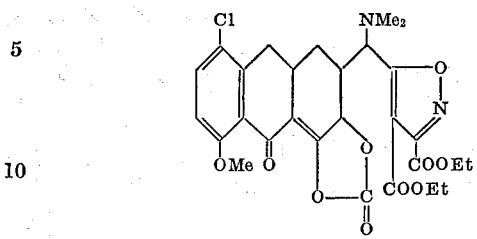

is purified by chromatography on acid washed Florisil and is the major product of the less polar eluate.

By means of this procedure, the products of Example LXIX and the remaining ester products of Example LXX are converted to their corresponding cyclic carbonates.

(B) Alternatively, 0.01 mole of the product of Example LXX is dissolved in 25 ml. of chloroform. Triethanolamine (0.04 mole) is added, the mixture cooled to 0° C. and 0.025 mole phosgene added. The mixture is allowed to reach and to stand at room temperature for 4 hours. It is then washed successively with three volumes of water and brine, dried and evaporated to dryness in vacuo to give the cyclic carbonate. Purification is accomplished according to Method A above.

EXAMPLE LXXXVII 2-decarboxamido-6-deoxy-6-dimethyl-7-chloro-tetracycline-2-nitrile-10-methyl ether The cyclic carbonate of Example LXXXVI (0.01 mole) is dissolved in 25 cc. of dry dimethylformamide and then cautiously treated with 0.02 mole of sodium hydride (as a 50% dispersion in mineral oil). When the exothermic reaction has subsided, the reaction mixture is heated on a steam bath until hydrogen evolution ceases. Following an additional 15 minutes heating, 20 cc. of glacial acetic acid is added and the solvent removed by evaporation in vacuo (bath temperature 50–75° C.). The residue is taken up in butanol, the butanol solution washed with water then extracted twice with 5% hydrochloric acid. The aqueous acid extracts are warmed at 50° C. for 5 minutes then cooled, neutralized and evaporated to dryness. The crude fused isoxazole product is then cleaved to the desired tetracycline by the procedure of Example LXXIX-B.

The crude fused isoxazole is, if desired, purified by chromatography of a chloroform solution on acid washed silicic acid.

This procedure is adapted to the remaining products of Example LXXXVI to produce the corresponding tetracyclines.

In the case of those reactants which contain other active hydrogens, one additional molar proportion of sodium hydride is added per mole of active hydrogen.

EXAMPLE LXXXVIII 2-(decarboxamido)-6-demethyl-6,12a-dideoxy-tetracycline-2-nitrile-10-methyl ether A solution of 0.01 mole of 5-methoxy-4,10-dioxo-1,2, 3,4,4a,9,9a,10-octahydroanthracene-2-(α - dimethylaminoacetonyl)-γ-(N-methylcarboxamido)-γ-nitrile and 25 cc. of dry N,N-dimethylformamide is cautiously treated with 0.10 mole of sodium hydride as a 50% dispersion in mineral oil. When the exothermic reaction has subsided, the reaction mixture is heated on a steam bath until 15 minutes after hydrogen evolution ceases. 50 cc. of glacial acetic acid is then carefully added and the dimethylformamide is removed from the reaction mixture by evaporation at 1 mm. pressure (bath temperature 50–75°). The residue is extracted with hexane, then water. The product is purified by chromatography on acid washed Florisil using chloroform then chloroform-5% methanol as eluant. The deep green fluorescent material collected is the desired product.

Following the same procedure, the corresponding acetonyl-γ-nitrile derivatives of Example LXXX are converted to the corresponding 1-imidotetracyclines and then to the corresponding tetracyclines by warming with two equivalents of magnesium chloride at 60° C. in aqueous solution for one hour. The mixture is then acidified to pH 4, extracted with n-butanol and the n-butanol solution evaporated to dryness to yield the product.

The octahydroanthracene reactants bearing a hydroxy group in the 3-position are first converted to their 3-formate or acetate derivatives prior to cyclization according to the procedures presented below. The resulting 12a-(O-acetate)tetracyclines are converted to the corresponding tetracyclines by mild hydrolysis with 1 N to 2 N NaOH at about 40° C. in the presence of a metal; e.g. zinc, which forms a chelate with the tetracycline (0.01 mole acetate, 0.02 mole zinc chloride in 200 ml. 2 N NaOH at 80° C. for 5–10 minutes). The metal is removed by treatment with hydrogen sulfide at pH 3.5 followed by filtration. The tetracycline product is recovered by extraction with n-butanol.

The 12a-(O-formates) are hydrolyzed under mild acid conditions (1–2 N HCl) at 40°–60° C. for 5–10 minutes and isolated as described above.

3-formate derivatives

To a solution of the desired 3-hydroxy-4,10-dioxo-1,2,3,4,4a,9,9a,10-octahydroanthracene 2-[α-(amino)acetonyl-γ-nitrile] (0.05 mole) in pyridine (0.2 mole) at 0° C. there is added 0.1 mole acetoformic anhydride. The mixture is stirred for ½ hour then poured into chloroform. The resulting solution is washed with water followed by brine and dried over anhydrous sodium sulfate. The dried solution is treated with charcoal then evaporated to dryness several times with repeated addition of toluene to remove pyridine. The residue is taken up in chloroform, hydrogen chloride bubbled in and the solution concentrated. The residue is triturated with chloroformethylacetate to give the product.

3-acetate derivatives

To 0.05 equivalent of the appropriate 3-hydroxy-4,10-dioxo - 1,2,3,4,4a,9,9a,10 - octa - hydroanthracene 2-[α-(amino)acetonyl-γ-nitrile] compound dissolved in 0.2 mole of anhydrous pyridine there is added 0.1 equivalent of acetic anhydride. The mixture is stirred for 15 minutes at 60°–100° C. then poured into an excess of ice water. The acetyl derivative is separated by filtration if solid, washed thoroughly with water and dried. When the product is not a solid, it is separated by chloroform extraction, the extract washed with water, dried and evaporated to dryness.

EXAMPLE LXXXIX

The procedure of Example LXXXVIII is applied to the products of Examples LXXXI–LXXXIII (wherein $Y_1$ and $Y_2$ of Formulae XXI are hydrogen) to produce the corresponding 1-imido-2-decarboxamido tetracyclines which are then hydrolyzed to the corresponding 1-keto compounds.

EXAMPLE XC 6,12a-dideoxy-6-demethyltetracycline-10-methyl ether (A) To a well-stirred mixture of 10 g. (0.025 mole) of 2 - decarboxamido - 6,12a - dideoxy-6-demethyltetracycline-2-nitrile - 10-methyl ether (product of Example LXXXVIII) in 100 ml. of glacial acetic acid is added 18 ml. of concentrated $H_2SO_4$. After cooling the solution to 15° C., 9 g. (0.160 mole) of isobutylene is bubbled into the mixture. Constant agitation is maintained throughout this procedure and is continued for 16 hours after its completion, during which time the mixture is maintained at 5° C. The mixture is then extracted with petroleum ether. The acetic acid layer is then poured into one liter of ice-water and the solution then neutralized with dilute sodium hydroxide solution, extracted with three 250 ml. portions of chloroform, the combined extracts water-washed and dried over anhydrous sodium sulfate. The product, N-t-butyl - 6,12a - dideoxy-6-demethyltetracycline-10-methyl ether is obtained crystalline by evaporation of the solvent.

The product (0.4 g.) is dissolved in 2 ml. of 85 percent sulfuric acid and the solution allowed to stand for one hour at room temperature, after which it is carefully diluted with 2 volumes of water, employing external cooling to control the exothermic reaction. Upon standing for an additional 16 hours, a crystalline precipitate forms and is collected. The product is a mixture of predominantly 6-demethyl-6,12a-dideoxytetracycline - 10 - methyl ether together with a small amount of starting compound which is separated using chromatographic techniques.

(B) The 10-methyl ether is converted to 6,12a-dideoxy-6-demethyltetracycline as follows: 2 g. are heated at 100° C. in 50 ml. 48% HBr for 45 minutes. Concentration of the mixture yields the desired product as a hydrobromide, which may be converted to the amphoteric compound by treatment in aqueous solution with an equivalent proportion of sodium bicarbonate.

Resolution of the racemate is accomplished by fractional crystallization of the camphorsulfonic acid salt from aqueous alcohol. The crops of crystals of the desired antipode are identified by virtue of their enhanced antibacterial potency.

EXAMPLE XCI 12a-hydroxylation of 12a-deoxytetracyclines

A solution of about 30 g. of the 12a-deoxytetracycline in 350 ml. of methanol containing 26.6 grams of cerium chloride heptahydrate is treated by passing oxygen gas through the solution for 30 hours.

The product is isolated by passing the reaction mixture through a column consisting of two layers, the first, an anion exchange resin (an amine anion resin prepared by the method of the example of U.S. Pat. 2,630,429, which is converted to the acetate salt by treatment with aqueous acetic acid and subsequent water washing to remove excess acetic acid) and the second, a cation exchange resin (a carboxylic acid resin-H+ cycle, prepared by polymerizing methacrylac acid with 5% divinylbenzene in the presence of 1% benzoyl peroxide catalyst at 60° C. for 24 hours). The eluate from the column contains unreacted 12a-deoxy starting compound as acetate salt. Elution of the carboxylic acid resin with dilute hydrochloric acid followed by concentration of the eluate yields the tetracycline product as the hydrochloride salt.

EXAMPLE XCII 2-decarboxamido-6-deoxy-6-demethyltetracycline-2-nitrile

This product is prepared from the corresponding 6,12a-dideoxy compound of Example LXXXVIII by the 12a-hydroxylation procedure of the previous example and the hydrolysis procedure of Example XC–B.

In like manner, the products of Examples LXXIX, LXXXV, LXXXVII and LXXXVIII are converted to the corresponding 12a-hydroxy compounds.

EXAMPLE XCIII 6-deoxy-6-demethyltetracycline

Following the procedure of Example XC, a well-stirred mixture of 10 g. (0.025 mole) of 2-decarboxamido-6-deoxy - 6-demethyltetracycline-2-nitrile-10-methyl ether in 100 ml. of glacial acetic acid is reacted with isobutylene and worked up to produce a mixture of predominantly 6- deoxy - 6 - demethyltetracycline together with a small amount of starting compound which is separated using chromatographic techniques.

The diastereoisomeric amide products thus obtained are separated by paper partition chromatography using the following system:

Mobile phase:
20:3 toluene-pyridine saturated with pH 4.2 buffer (citric acid—$Na_2HPO_4$)
Immobile phase:
pH 4.2 buffer saturated with toluene-pyridine.

The less polar fraction possesses high biological activity and has infrared and ultraviolet characteristics identical with those of 6-deoxy-6-demethyltetracycline. It is purified by crystallization of the sulfate salt from aqueous solution.

Resolution of the racemate is accomplished by fractional crystallization of the decamphorsulfonic acid salt from aqueous alcohol. The crops of crystals of the desired antipode are identical by virtue of their enhanced antibacterial potency.

EXAMPLE XCIV 6-deoxy-6-demethyl-7-chlortetracycline (A) 6 - deoxy - 6 - demethyl-7-chlortetracycline-10-methyl ether, 2 g., is heated at 100° C. with 50 ml. 48% hydrobromic acid for 45 minutes. Concentration of the mixture yields the desired product in the form of the hydrobromide salt. It is converted to the amphoteric compound by treatment with an equivalent of sodium bicarbonate in aqueous solution.

(B) 6 - deoxy - 6 - demethyl - 7 - chlortetracycline-10-benzyl ether, 2 g., is dissolved in 150 ml. glacial acetic acid and hydrogenated at about 40 p.s.i. hydrogen pressure at room temperature in the presence of 2 g. 5% palladium on carbon catalyst until an equimolar proportion of hydrogen has been consumed. The mixture is then filtered and concentrated at reduced pressure to obtain the product as residue.

The racemic mixture obtained by the foregoing procedures are resolved as described in the preceding example.

EXAMPLE XCV 6-deoxy-6-demethyltetracycline-10-methyl ether

6 - deoxy - 6 - demethyl - 4 - aminotetracycline-10-methyl ether hydrochloride, 2 g. (prepared as described in Example XCIII) is dissolved in 10 cc. of water containing 2 g. of sodium bicarbonate at 25–30° C. The solution is blanketed with nitrogen and 2.1 g. of dimethyl sulfate in 10 cc. of ethyl acetate is added over a period of three hours with good stirring. After an additional two hours stirring, the solution is made acid to Congo red, concentrated under reduced pressure, and the residue extracted with hot ethanol. Evaporation of the ethanol extract gives the desired product.

EXAMPLE XCVI 6-deoxy-6-demethyltetracycline 6,12a-dideoxy-6-demethyltetracycline (250 mg.) and 25 ml. of dimethylformamide are vigorously stirred in a 250 ml. round bottom flask under nitrogen. After 5 minutes cerous chloride (308 mg.) is added to the suspension and stirring continued under nitrogen for an additional 10 minutes. Methanol (55 ml.) is then added in one portion to the clear solution of the cerous chelate. Seventeen ml. of a buffer solution (pH 10.40, comprising 9 ml. of 0.1 N glycine/0.1 N sodium chloride and 8 ml. of 0.1 N sodium hydroxide) is added in one portion to produce a clear light yellow to amber solution. The apparent pH of the resulting solution is 5.7.

The flow of nitrogen gas is discontinued and oxygen then bubbled in at a vigorous rate for 30 minutes. The reaction mixture becomes progressively darker in color during the oxidation. At the end of this time 9.5 ml. of concentrated hydrochloric acid is introduced into the reaction mixture to give a clear yellow/amber color. The mixture is then evaporated to dryness.

To the residue in the still warm flask there is added 5.0 ml. concentrated HCl and the mixture warmed on a steam bath to effect solution. 60 ml. of n-butanol, previously saturated with 1 N HCl, is added to give a completely clear solution. Water (50 ml.) is added and the mixture vigorously shaken and allowed to separate into two layers. The butanol layer is collected and shaken with 25 ml. of 1 N HCl previously saturated with butanol. The aqueous HCl extract is combined with the original HCl liquor and extracted twice with 20 ml. volumes of butanol which had been previously saturated with 1 N HCl. The three n-butanol extracts are combined and run through a partition column, which had been previously prepared according to the following method.

Partition column I n-Butanol and 1.0 N HCl are shaken together until each is saturated with the other. Acid washed Super-Cel is mixed with the aqueous acid layer to produce a thin slurry which is packed into a column under a 5 p.s.i. pressure of $N_2$, to produce a Super-Cel column (1.300 mm.; I.D. 28 mm.). n-Butanol saturated with 1 N HCl is run through this column to displace the excess stationary phase.

The butanol solution of the reaction mixture is run slowly through this column and the entire yellow eluate evaporated to dryness. Toluene is added and this solvent removed in vacuo until no odor of solvents remain. The residue, a friable, yellow/orange solid is chromatographed on a partition column prepared in a manner similar to that above using the system

$CHCl_3:HCOOH:HCOOC_2H_5:H_2O$ (2:1:1:1)

(Upper phase=stationary; Lower phase=Mobile.)

The acid wash Super-Cel column is prepared with the stationary phase (1. 280 mm.; I.D. 28 mm.). It is not necessary to replace excess stationary phase. Instead, the mixture to be chromatographed is dissolved in the minimium amount of stationary phase and pressed into the column with 5 p.s.i. pressure of $N_2$.

The mobile phase is cautiously added to the column, and a pressure of 8–10 p.s.i. $N_2$ applied. The mobile phase overtakes the layer of applied solids, and displaces excess stationary phase. The developed column is extruded from the column, and the bands eluted from the Super-Cel with methanol and evaporated to dryness. In this manner, 6-deoxy-6-demethyltetracycline and a mixture containing 6-deoxy-6-demethyltetracycline, its $C_4$ epimer and a presently unidentified substance are obtained. The $C_4$ epimer is converted to 6-deoxy-6-demethyltetracycline by equilibration of its calcium chelate as described below.

The mixture containing 6-deoxy-6-demethyltetracycline and its $C_4$ epimer (119 mg.) is combined with anhydrous calcium chloride (75 mg.), 0.1 ml. water and 3 ml. n-butanol under nitrogen and swirled to produce a clear solution. The pH is adjusted to 8.5 with an ethanolamine solution (10% v./v. in n-butanol) and the mixture refluxed for 3.5 hours under nitrogen in the dark. After one hour yellow crystals separate. The final amber mixture is acidified with 3 ml. of 1 N HCl saturated with butanol, the mixture shaken vigorously, and the butanol layer separated and extracted with a further 3 ml. of 1 N HCl saturated with butanol. The combined HCl liquors are extracted three times with 5 ml. portions of butanol, and the butanol solutions combined and run through a partition column (1. 110 mm.; I.D. 29 mm.; n-butanol/1.0 N HCl —See partition column 1 above). The yellow eluate is evaporated to dryness, toluene added, and the mixture again evaporated until free of solvents. The product, a yellow foam, is purified further by countercurrent extraction with the system methanol:water:chloroform:carbontetrachloride (4:4:3:1). The upper layer is the stationary phase and the lower layer the mobile phase.

25 ml. of the stationary phase is placed into each of eleven 50 ml. separatory funnels. Then 25 ml. of the mobile phase is put into tubes 1 and 2.

The yellow foam is dissolved in the contents of tube 1 (pH of the upper phase of tube 1=pH 3.2). 5% $NH_3$ solution is cautiously added to tube 1, until the pH of the upper layer is pH 8.0. The tube is shaken vigorously after each addition of base. If the pH should accidently rise above pH 8.0, it is brought back to the required pH by addition of 5% HCl.

Tubes 1 and 2 are shaken vigorously and allowed to separate. Then the lower phase of tube 2 is transferred to tube 3, and the lower phase of tube 1 to tube 2. 25 ml. of fresh mobile phase is added to tube 1.

Tubes 1, 2 and 3 are shaken, allowed to separate, and transferred, 3 to 4, 2 to 3, 1 to 2, and 25 ml. of fresh mobile phase to 1, etc.

A very rapid way to run this countercurrent is as follows. Before the pH of tube 1 is adjusted to 8.0, the contents of tube 2 (being 25 ml. of each, Mobile and Stationary phases) are shaken, allowed to separate, and the lower phase transferred to tube 3. This is in turn shaken, allowed to separate, and the lower phase transferred to tube 4, and so on along the countercurrent train and then the lower (mobile phase) discarded. This process assures that the mobile and stationary phases are mutually saturated, and removes any impurities present in the separatory funnels.

Then tube 1 is adjusted to pH 8.0 as described above. Tube 1 is equilibrated, separated and the mobile phase transferred to 2. Fresh mobile phase (25 ml.) is added to 1. 1 and 2 are shaken, allowed to separate, and then 2 is transferred to 3; 1 is transferred to 2. These two separatory funnels contain ca. 80% of the 6-demethyl-6-deoxytetracycline. Their mobile phases are run along the countercurrent train, transferring 3 to 4, 2 to 3, then 4 to 5, and 3 to 4, etc., until the first portion of mobile phase arrives at tube 9. Tube 9 is adjusted to pH 2–3 with 5% HCl, and then equilibrated—most of the color is now in the upper stationary phase. Then the lower phase from 9 is transferred to 10, and 8 to 9, etc., and the mobile phases run through tubes 10 and 11 and finally collected in an Erlenmeyer flask. Compounds which pass through this countercurrent are non-basic. The desired 6-demethyl-6-deoxytetracycline, as the stable hydrochloride salt is in the upper (stationary) phase of tube 9.

Meanwhile, in a second operation 25 ml. of fresh mobile phase is added to tube 1, the mixture equilibrated, the lower layer separated and transferred to tube 2. Then a further 25 ml. portion of the mobile phase is added to tube 1. The process is continued as described above to carry the mobile phases of these tubes through the countercurrent system. A third such operation is also carried out making a total of six tubes (21 changes) which normally is sufficient to remove all the 6-demethyl-6-deoxytetracycline from tubes 1, 2 and 3. Tubes 1, 2 and 3 contain the unidentified product and any trace amounts of epi 6-demethyl-6-deoxytetracycline. Tubes 1+2+3 are acidified and evaporated to produce mostly unidentified product and ammonium chloride (71 mg.). The Erlenmeyer flask at the end of the train contains a non-basic impurity and tube 9 contains 6-demethyl-6-deoxytetracycline (49 mg.). Evaporation of tube 9 produces a pale yellow solid which can be crystallized from a small volume of methanol.

A more effective method of purification involves thin layer chromatography on buffered silica gel plates (pH 4.2) and elution therefrom with methanol. The methanol eluates containing the desired product (determined by paper chromatography) are combined, evaporated to dryness and run through a countercurrent system as described above but using only 5 separatory funnels. Tube 1 is adjusted to pH 8.0, and tube 5 is acidic. This is necessary to separate the 6-demethyl-6-deoxytetracycline from the materials used to buffer the silica gel plate. Tube 5 is evaporated to dryness to give almost pure 6-demethyl-6-deoxytetracycline (14 mg.) which is recrystallized from methanol. Bioassay 860 (Control 860), paper chromatography shows only one spot.

ULTRAVIOLET ABSORPTION DATA

| | Maximum, mμ | ε | ε | Percent purity |
|---|---|---|---|---|
| (0.01 N HCl MeOH) | 267 | 18,700 | 418 | 96.5 |
| | 346 | 15,300 | 342 | 102 |
| (0.01 N NaOH MeOH) | 247 | 16,700 | 372 | 99.5 |
| | 384 | 18,500 | 413 | 102 |

Following the above procedure, racemic 6,12a-dideoxy-6-demethyltetracycline is converted to racemic 6-deoxy-6-demethyltetracycline. The quantities of materials used in the various stages are summarized below.

Oxidation step:
   D.L. 6-demethyl:6-12a-dideoxytetracycline _____ 250 mg.
   Dimethylformamide _____ 25 ml.
   Cerous chloride heptahydrate _____ 308 mg.
   Methanol _____ 44 ml.
   Buffer (9 ml. 0.1 N glycine/0.1 N NaCl)
     (8 ml. 0.1 N NaOH) _____ pH 10.4.

Epimerization step:
   D.L. 6-deoxy-6-demethyltetracycline-$C_4$ epi mixture _____ 99.5 mg.
   $CaCl_2$ (anhydrous) _____ 63 mg.
   n-Butanol _____ 3 ml.
   Water _____ 0.1 ml.
   Ethanolamine solution (10% v./v. in butanol) _____ Apparent pH 8.5.

What is claimed is:
1. A compound of the formula

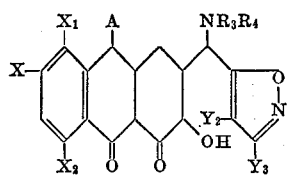

wherein X is selected from the group consisting of hydrogen, hydroxy, trifluoromethyl, amino, mono and di-lower alkylamino, alkanoylamino containing 2 to 4 carbon atoms, lower alkyl, alkanoyloxy containing 2 to 4 carbon atoms; and OR wherein R is selected from the group consisting of lower alkyl and benzyl; $X_1$ is selected from the group consisting of hydrogen, chloro, lower alkyl and trifluoromethyl; $X_2$ is selected from the group consisting of hydrogen, hydroxy and OR in which R is as previously defined; A is selected from the group consisting of hydrogen, lower alkyl, and $B_2OCH(B_3)$— wherein $B_2$ is lower alkyl and $B_3$ is selected from the group consisting of hydrogen and lower alkyl; $R_3$ and $R_4$ when taken together with the nitrogen atom to which they are attached form a nitrogen heterocyclic ring selected from the group consisting of piperazyl, N-(lower alkyl)piperazyl, piperidyl and morpholinyl; $R_3$ is selected from the group consisting of hydrogen, alkanoyl containing 1 to 4 carbon atoms and methyl; $R_4$ is alkyl containing 1 to 4 carbon atoms; $Y_2$ is selected from the group consisting of hydrogen, carbobenzoxy, carboxy, lower carbalkoxy and $CONH(CH_3)$ and $Y_3$ is selected from the group consisting of carboxy, lower carbalkoxy, carbobenzoxy, CONH₂ and CONH(CH₃) and, when Y₂ is hydrogen,

CON(CH₃)₂

2. The compound of claim 1, wherein X₁ and R₃ are hydrogen; X is lower alkyl; X₂ is lower alkoxy; A is lower alkoxymethyl and Y₂ and Y₃ are CONH(CH₃).

3. 2 - [5' - (3',4'-di(N-methylcarboxamido)isoxazolyl) (N - methylamino)methyl]-3-hydroxy-5-methoxy-7-methyl - 9 - methoxymethyl-4,10-dioxo-1,2,3,4,4a,9,9a,10-octahydroanthracene, a compound according to claim 2 wherein X₁ and R₃ are hydrogen; X₂ is methoxy; A is methoxymethyl; X and R₄ are methyl; Y₂ and Y₃ are

CONH(CH₃).

4. The compound of claim 1, wherein X₁, A and Y₂ are hydrogen; X is trifluoromethyl; X₂ is hydroxy; Y₃ is CON(CH₃)₂ and R₃ is methyl.

5. 2-[5'-(3' - (N,N - dimethylcarboxamido)isoxazolyl) (N,N-dimethylamino)methyl]-3,5-dihydroxy - 7 - trifluoromethyl - 4,10 - dioxo - 1,2,3,4,4a,9,9a,10 - octahydroanthracene, a compound according to claim 4, wherein X₁, A and Y₂ are hydrogen; X₂ is hydroxy; X is trifluoromethyl; R₃ and R₄ are methyl and Y₃ is CON(CH₃)₂.

6. A compound of the formula

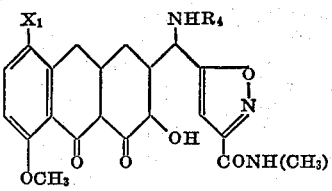

wherein X₁ is di-lower alkylamino and R₄ is alkyl containing 1 to 4 carbon atoms.

7. 2-[5'-(3' - N - methylcarboxamidoisoxazolyl) - (N-methylamino)methyl]-3-hydroxy-5-methoxy - 8 - dimethylamino - 4,10 - dioxo - 1,2,3,4,4a,9,9a,10 - octahydroanthracene.

References Cited
UNITED STATES PATENTS
3,502,660    3/1970    Butler et al. _____ 260—240

ALEX MAZEL, Primary Examiner
R. V. RUSH, Assistant Examiner

U.S. Cl. X.R.
260—268 TRI

PO-1050
(5/69)

UNITED STATES PATENT OFFICE
CERTIFICATE OF CORRECTION

Patent No. 3,699,117                               Dated    October 17, 1972

Inventor(s)    Butler et al.

It is certified that error appears in the above-identified patent and that said Letters Patent are hereby corrected as shown below:

Col. 1, line 3, "1,2,3,4,4,9,9,10-" should read -- 1,2,3,4,4a,9,9a,10- --.
    line 12, should read -- filed Sept. 2, 1965, --.
    line 62, "Set." should read -- Sept. --.
Col. 2, line 22, "4-(CH$_3$)$_2$" should read -- 4-N(CH$_3$)$_2$ --.
Col. 16, formula IIa under Flow Sheet IV should read

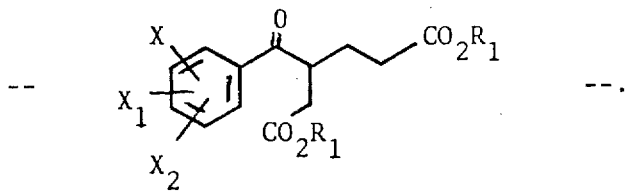

Col. 59, line 13, "pH 60" should read -- pH 6.0 --.
Col. 60, line 20, "(575 μ)" should read -- (5.75 μ) --.
Col. 67, line 48, "XLXX" should read -- LXX --.
Col. 71, line 53, "6-dimethyl-" should read -- 6-demethyl- --.
Col. 72, line 30, "6-dimethyl-" should read -- 6-demethyl- --.
Col. 75, line 19, "decamphorsulfonic" should read -- d-camphorsulfonic --.

Signed and sealed this 10th day of April 1973.

(SEAL)
Attest:

EDWARD M. FLETCHER, JR.
Attesting Officer

ROBERT GOTTSCHALK
Commissioner of Patents